(12) United States Patent
Sakumoto et al.

(10) Patent No.: US 8,522,033 B2
(45) Date of Patent: *Aug. 27, 2013

(54) AUTHENTICATION DEVICE, AUTHENTICATION METHOD, PROGRAM, AND SIGNATURE GENERATION DEVICE

(75) Inventors: Koichi Sakumoto, Tokyo (JP); Taizo Shirai, Kanagawa (JP); Harunaga Hiwatari, Kanagawa (JP)

(73) Assignee: Sony Corporation, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 13/111,696

(22) Filed: May 19, 2011

(65) Prior Publication Data
US 2011/0296188 A1   Dec. 1, 2011

(30) Foreign Application Priority Data

| | | |
|---|---|---|
| May 31, 2010 | (JP) | P2010-125026 |
| Oct. 4, 2010 | (JP) | P2010-224753 |
| Feb. 9, 2011 | (JP) | P2011-026401 |

(51) Int. Cl.
*H04L 9/00*   (2006.01)

(52) U.S. Cl.
USPC ............................................. 713/176; 380/30

(58) Field of Classification Search
USPC ....................................................... 713/176
See application file for complete search history.

(56) References Cited

U.S. PATENT DOCUMENTS 7,773,747 B2 *   8/2010   Akiyama et al. ................ 380/30

OTHER PUBLICATIONS

J Patarin. "Asymmetric Cryptography with a Hidden Monomial", CRYPTO, 1998, pp. 45-60, Springer-Verlag.
J. Patarin, et al., "Quartz, 128-Bit Long Digital Signatures", http://www.minrank.org/quartz/, 2001, pp. 282-297, Springer-Verlag, Berlin, Heidelberg.
J. Ding, et al., "Multivariate Public Key Cryptosystems", Advances in Information Security, 2006, pp. xv-xviv, 2-3, 63-113, Springer Verlag, New York, Inc., Secaucus, NJ.
J. Stern, "A New Identification Scheme Based on Syndrome Decoding", CRYPTO, 1998, pp. 13-21, Springer-Verlag.
Yuichi Komano, et al., "ASS-CC: Provably Secure Algebraic Surface Signature Scheme". 2010, pp. 1-6, The Instruments of Electronics, Information and Communication Engineers.
A. Fiat, et al., "How to Prove Yourself" Practical Solutions to Identification and Signature Problems, CRYPTO, 1998, p. 186-194, Springer-Verlag.

* cited by examiner

*Primary Examiner* — Longbit Chai
(74) *Attorney, Agent, or Firm* — Finnegan, Henderson, Farabow, Garrett & Dunner, L.L.P.

(57) ABSTRACT

Provided is an authentication device including a key setting unit for setting $s \in K^n$ to a secret key and setting a multi-order polynomial $f_i(x_1, \ldots, x_n)$ ($i=1$ to $m$) on a ring $K$ and $y_i = f_i(s)$ to a public key, a message transmission unit for transmitting a message c to a verifier, a verification pattern reception unit for receiving information on one verification pattern selected by the verifier from k ($k \geq 3$) verification patterns for one message c, and a response transmission unit for transmitting, to the verifier, response information, among k types of response information, corresponding to the information on the verification pattern received by the verification pattern reception unit, where the response information is information that enables calculation of the secret key s in a case all of the k verification patterns for the message c performed by using the k types of response information have been successful.

18 Claims, 28 Drawing Sheets

FIG.27

TABLE: EFFICIENCY COMPARISON BETWEEN 3-PASS AND 5-PASS

| | 3-PASS | 5-PASS | | | | |
|---|---|---|---|---|---|---|
| | | $q=2^4$ | $q=2^5$ | $q=2^6$ | $q=2^7$ | $q=2^8$ |
| NUMBER OF ELEMENTS q OF RING | — | | | | | |
| FALSIFICATION SUCCESS PROBABILITY PER INTERACTIVE PROTOCOL | 0.667 | 0.531 | 0.516 | 0.508 | 0.504 | 0.502 |
| NUMBER OF REPETITIONS NECESSARY FOR n-bit SECURITY | 1.710n | 1.096n | 1.046n | 1.023n | 1.011n | 1.006n |
| NUMBER OF REPETITIONS NECESSARY FOR 80-bit SECURITY | 137 | 88 | 84 | 82 | 81 | 81 |
| NUMBER OF REPETITIONS NECESSARY FOR 128-bit SECURITY | 219 | 141 | 134 | 131 | 130 | 129 |

AUTHENTICATION DEVICE, AUTHENTICATION METHOD, PROGRAM, AND SIGNATURE GENERATION DEVICE

BACKGROUND OF THE INVENTION

1. Field of the Invention

The present invention relates to an authentication device, an authentication method, a program, and a signature generation device 2. Description of the Related Art With a rapid development of information processing technology and communication technology, digitisation of documents, official and private, is rapidly advancing. Accordingly, many individuals and companies are greatly interested in security management of electronic documents. With the increase in the interest, security against tampering, such as eavesdropping and forgery of electronic documents, has come to be hotly debated in many fields. The security against eavesdropping on an electronic document is ensured by encrypting the electronic document, for example. Also, the security against forgery of an electronic document is ensured by using a digital signature, for example. However, encryption and the digital signature have to be sufficiently tamper-resistant.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic, document is forged by the malicious third party. Various opinions have been expressed regarding the security of the digital signature to prevent such forgery. As digital signature schemes that are currently widely used, schemes that use a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public key authentication schemes that are currently used also take difficulty of the prime factorisation problem or the discrete logarithm problem as a basis for security. Thus, if the quantum computer is put to practical use, security of such digital signature schemes and public key authentication schemes will not be ensured. Accordingly, new digital signature schemes and public key authentication schemes are desired that take as a basis for security a problem different from problems such as the prime factorisation problem and the discrete logarithm problem that can be easily solved by the quantum computer. As a problem which is not easily solved by the quantum computer, there is a difficulty of solving a multivariate polynomial (hereinafter, multivariate polynomial problem), for example.

For example, as digital signature schemes that take the multivariate polynomial problem as a basis for security, those based on Matsumoto-Imai (MI) cryptography, Hidden Field Equation (HFE) cryptography, Oil-Vinegar (OV) signature scheme, and Tamed Transformation Method (TTM) cryptography are known. For example, a digital signature scheme based on the HFE is disclosed in Jacques Patarin, Asymmetric Cryptography with a Hidden Monomial, CRYPTO 1996, pp. 45-60 and Patarin, J., Counois, N., and Goubin, L., QUARTZ, 128-Bit Long Digital Signatures, In Naccache, D., Ed. Topics in Cryptology—CT-RSA 2001 (San Francisco, Calif., USA, April 2001), vol. 2020 of Lecture Notes in Computer Science, Springer-Verlag., pp. 282-297.

SUMMARY OF THE INVENTION

As described above, the multivariate polynomial problem is an example of a problem called NP-hard problem which is difficult to solve even when using the quantum computer. Normally, a public key authentication scheme that uses the multivariate polynomial problem typified by the HFE or the like uses a multi-order multivariate simultaneous equation with a special trapdoor. For example, a multi-order multivariate simultaneous equation $F(x_1, \ldots, x_n)=y$ related to $x_1, \ldots, x_n$, and linear transformations A and B are provided, and the linear transformations A and B are secretly managed. In this case, the multi-order multivariate simultaneous equation F and the linear transformations A and B are the trapdoors.

An entity that knows the trapdoors F, A, and B can solve an equation $B(F(A(x_1, \ldots, x_n)))=y'$ related to $x_1, \ldots, x_n$. On the other hand, the equation $B(F(A(x_1, \ldots, x_n)))=y'$ related to $x_1, \ldots, x_n$ is not solved by an entity that does not know the trapdoors F, A, and B. By using this mechanism, a public key authentication scheme and a digital signature scheme that take the difficulty of solving a multi-order multivariate simultaneous equation as a basis for security can be realised.

As described, to realise such public key authentication scheme and digital signature scheme, it is necessary to use a special multi-order multivariate simultaneous equation that satisfies $B(F(A(x_1, \ldots, x_n)))=y$. However, according to existing schemes, it is necessary to solve the multi-order multivariate simultaneous equation F at the time of signature generation, and thus only those that can be easily solved can be used as F. That is, according to such existing schemes, only multi-order multivariate simultaneous equations $B(F(A(x_1, \ldots, x_n)))=y$ that are formed by combining three functions (trapdoors) B, F, and A that can be comparatively easily solved can be used, and thus it is difficult to ensure sufficient security. As a result, a large number of attack methods are proposed in relation to the public key authentication scheme and digital signature scheme that use a multi-order multivariate simultaneous equation for which there is means (trapdoor) for efficient solution, and a refinement that enables a multi-order multivariate simultaneous equation for which there is no means (trapdoor) for efficient solution to be used for the public key authentication scheme and digital signature scheme is desired.

In light of the foregoing, it is desirable to provide an authentication device, an authentication method, a program, and a signature generation device which are novel and improved, and which are capable of realising a public key authentication scheme or a digital signature scheme whose security is enhanced by the use of a multi-order multivariate simultaneous equation for which there is no means (trapdoor) for efficient solution.

According to an embodiment of the present invention, there is provided an authentication device which includes a key setting unit for setting $s \in K^n$ to a secret key and setting a multi-order polynomial $f_i(x_1, \ldots, x_n)$ (i=1 to m) on a ring K and $y_i=f_i(s)$ to a public key, a message transmission unit for transmitting a message c to a verifier, a verification pattern reception unit for receiving information on one verification pattern selected by the verifier from k (k≧3) verification patterns for one message c, and a response transmission unit for transmitting, to the verifier, response information, among k types of response information, corresponding to the information on the verification pattern received by the verification pattern reception unit. The response information is information that enables calculation of the secret key s in a case all of the k verification patterns for the message c performed by using the k types of response information have been successful.

The authentication device may be configured such that authentication is successful if, when performing a first step of transmitting one or more messages c by the message transmission unit, a second step of receiving, for each message c, the information on the verification pattern from the verifier by the verification pattern reception unit, and a third step of transmitting the response information for each piece of the information on the verification pattern by the response transmission unit, verification is successfully performed by the verifier with all pieces of the response information.

The authentication device may be configured such that processing of performing the first step of transmitting one or more messages c by the message transmission unit, the second step of receiving, for each message c, the information on the verification pattern from the verifier by the verification pattern reception unit, and the third step of transmitting the response information for each piece of the information on the verification pattern by the response transmission unit is repeated, and the authentication is successful if, when performing the first to third steps a predetermined number of times, verification is successfully performed each time by the verifier with all pieces of the response information.

In a case of the message $c=(c_1, \ldots c_m)$, the message transmission unit may calculate a new message c'=H(c) by using a one-way function H and transmit the message c' to the verifier, and the response transmission unit may transmit, together with the response information, an element of the message c that the verifier is not capable of restoring even when using the response information.

According to another embodiment of the present invention, there is provided an authentication device which includes a message reception unit for receiving a message c from a prover, a verification pattern selection unit for selecting one verification pattern from k (k≧3) verification patterns for one message c, a verification pattern transmission unit for transmitting information on the verification pattern selected by the verification pattern selection unit to the prover, a response reception unit for receiving, from the prover, response information, among k types of response information, corresponding to the information on the verification pattern transmitted by the verification pattern transmission unit, and a verification unit for verifying a legitimacy of the prover by using the message c received by the message reception unit and the response information received by the response reception unit. $s \in K^n$ is set to a secret key and a multi-order polynomial $f_i(x_1, \ldots, x_n)$ (i=1 to m) on a ring K and $y_i=f_i(s)$ are set to a public key. The response information is information that enables calculation of the secret key s in a case all of the k verification patterns for the message c performed by using the k types of response information have been successful.

According to another embodiment of the present invention, there is provided an authentication device which includes a key setting unit for setting $S \in K^n$ to a secret key and setting a multi-order polynomial $f_i(x_1, \ldots, x_n)$ (i=1 to m) on a ring K and $y_i=f_i(s)$ to a public key, a message transmission unit for transmitting a message c to a verifier, a reply reception unit for receiving a reply α from the verifier, a polynomial generation unit for generating a polynomial f" to be used for verification for the message c by using the reply α received by the reply reception unit, a polynomial transmission unit for transmitting the polynomial f" generated by the polynomial generation unit to the verifier, a verification pattern reception unit for receiving information on one verification pattern selected by the verifier from k (k≧2) verification patterns for one message c, and a response transmission unit for transmitting, to the verifier, response information, among k types of response information, corresponding to the information on the verification pattern received by the verification pattern reception unit. The response information is information that enables calculation of the secret key s in a case all of total 2 k combinations of reply and verification pattern for the message c performed by using two types of replies α, the polynomial f", and the k types of response information have been successful.

The authentication device may be configured such that authentication is successful if, when performing a first step of transmitting one or more messages c by the message transmission unit, a second step of receiving the reply α by the reply reception unit for each message c, a third step of generating the polynomial f" by the polynomial generation unit by using each reply α received in the second step and transmitting the polynomial f" by the polynomial transmission unit, a fourth step of receiving, for each message c, the information on the verification pattern from the verifier by the verification pattern reception unit, and a fifth step of transmitting the response information by the response transmission unit for each piece of the information on the verification pattern, verification is successfully performed by the verifier with all pieces of the response information.

The authentication device may be configured such that processing of performing the first step of transmitting one or more messages c by the message transmission unit, the second step of receiving the reply α by the reply reception unit for each message c, the third step of generating the polynomial f" by the polynomial generation unit by using each reply α received in the second step and transmitting the polynomial f" by the polynomial transmission unit, the fourth step of receiving, for each message c, the information on the verification pattern from the verifier by the verification pattern reception unit, and the fifth step of transmitting the response information by the response transmission unit for each piece of the information on the verification pattern is repeated, and the authentication is successful if, when performing the first to fifth steps a predetermined number of times, verification is successfully performed each time by the verifier with all pieces of the response information.

According to another embodiment of the present invention, there is provided an authentication device which includes a message reception unit for receiving a message c from a prover, a reply transmission unit for transmitting a reply α to the prover, a polynomial reception unit for receiving a polynomial f" that is generated by the prover by using the reply α transmitted by the reply transmission unit and that is used for verification for the message c, a verification pattern selection unit for selecting one verification pattern from k (k≧2) verification patterns for one message c, a verification pattern transmission unit for transmitting, to the prover, information on the verification pattern selected by the verification pattern selection unit, a response reception unit for receiving, from the prover, response information, among k types of response information, corresponding to the information on the verification pattern transmitted by the verification pattern transmission unit, and a verification unit for verifying a legitimacy of the prover by using the message c received by the message reception unit, the polynomial f" received by the polynomial reception unit, and the response information received by the response reception unit. $s \in K^n$ is set to a secret key and a multi-order polynomial $f_i(x_1, \ldots, x_n)$ (i=1 to m) on a ring K and $y_i=f_i(s)$ are set to a public key. The response information is information that enables calculation of the secret key s in a case all of total 2 k combinations of reply and verification pattern for the message c performed by using two types of replies α, the polynomial f", and the k types of response information have been successful.

According to another embodiment of the present invention, there is provided an authentication method which includes the steps of setting $s \in K^n$ to a secret key and setting a multi-order polynomial $f_i(x_1, \ldots, x_n)$ (i=1 to m) on a ring K and $y_i=f_i(s)$ to a public key, transmitting a message c to a verifier, receiving information on one verification pattern selected by the verifier from k (k≧3) verification patterns for one message c, and transmitting, to the verifier, response information, among k types of response information, corresponding to the information on the verification pattern received in the step of receiving. The response information is information that enables calculation of the secret key s in a case all of the k verification patterns for the message c performed by using the k types of response information have been successful.

According to another embodiment of the present invention, there is provided an authentication method which includes the steps of receiving a message c from a prover, selecting one verification pattern from k (k≧3) verification patterns for one message c, transmitting information on the verification pattern selected in the step of selecting to the prover, receiving, from the prover, response information, among k types of response information, corresponding to the information on the verification pattern transmitted in the step of transmitting, and verifying a legitimacy of the prover by using the message c received in the step of receiving the message c and the response information received in the step of receiving the response information. $s \in K^n$ is set to a secret key and a multi-order polynomial $f_i(x_1, \ldots, x_n)$ (i=1 to m) on a ring K and $y_i=f_i(s)$ are set to a public key. The response information is information that enables calculation of the secret key s in a case all of the k verification patterns for the message c performed by using the k types of response information have been successful.

According to another embodiment of the present invention, there is provided an authentication method which includes the steps of setting $s \in K^n$ to a secret key and setting a multi-order polynomial $f_i(x_1, \ldots, x_n)$ (i=1 to m) on a ring K and $y_i=f_i(s)$ to a public key, transmitting a message c to a verifier, receiving a reply α from the verifier, generating a polynomial f" to be used for verification for the message c by using the reply α received in the step of receiving the reply α, transmitting the polynomial f" generated in the step of generating to the verifier, receiving information on one verification pattern selected by the verifier from k (k≧2) verification patterns for one message c, and transmitting, to the verifier, response information, among k types of response information, corresponding to the information on the verification pattern received in the step of receiving the information on the verification pattern. The response information is information that enables calculation of the secret key s in a case all of total 2 k combinations of reply and verification pattern for the message c performed by using two types of replies α, the polynomial f", and the k types of response information have been successful.

According to another embodiment of the present invention, there is provided an authentication method which includes the steps of receiving a message c from a prover, transmitting a reply α to the prover, receiving a polynomial f" that is generated by the prover by using the reply α transmitted in the step of transmitting the reply α and that is used for verification for the message c, selecting one verification pattern from k (k≧2) verification patterns for one message c, transmitting, to the prover, information on the verification pattern selected in the step of selecting the verification pattern, receiving, from the prover, response information, among k types of response information, corresponding to the information on the verification pattern transmitted in the step of transmitting the information on the verification pattern, and verifying a legitimacy of the prover by using the message c received in the step of receiving the message c, the polynomial f" received in the step of receiving the polynomial f", and the response information received in the step of receiving the response information. $s \in K^n$ is set to a secret key and a multi-order polynomial $f_i(x_1, \ldots, x_n)$ (i=1 to m) on a ring K and $y_i=f_i(s)$ are set to a public key. The response information is information that enables calculation of the secret key s in a case all of total 2 k combinations of reply and verification pattern for the message c performed by using two types of replies α, the polynomial f", and the k types of response information have been successful.

According to another embodiment of the present invention, there is provided a program for causing a computer to realise a key setting function of setting $s \in K^n$ to a secret key and setting a multi-order polynomial $f_i(x_1, \ldots, x_n)$ (i=1 to m) on a ring K and $y_i=f_i(s)$ to a public key, a message transmission function of transmitting a message c to a verifier, a verification pattern reception function of receiving information on one verification pattern selected by the verifier from k (k≧3) verification patterns for one message c, and a response transmission function of transmitting, to the verifier, response information, among k types of response information, corresponding to the information on the verification pattern received by the verification pattern reception function. The response information is information that enables calculation of the secret key s in a case all of the k verification patterns for the message c performed by using the k types of response information have been successful.

According to another embodiment of the present invention, there is provided a computer-readable recording medium in which the program is recorded.

According to another embodiment of the present invention, there is provided a signature generation device which includes a key setting unit for setting $s \in K^n$ to a secret key and setting a multi-order polynomial $f_i(x_1, \ldots x_n)$ (i=1 to m) on a ring K and $y_i=f_i(s)$ to a public key, a message generation unit for generating N messages c based on the multi-order polynomial $f_i(x_1, \ldots, x_n)$ and the secret key s, a verification pattern selection unit for selecting a verification pattern from $k^N$ (k≧3) verification patterns based on information obtained by applying a document M and the message c to a one-way function, and a signature generation unit for generating, according to the verification pattern selected by the verification pattern selection unit, a digital signature σ that will pass verification that uses the message c and the document M. The digital signature σ is information that enables calculation of the secret key s in a case verifications performed using the digital signature σ corresponding to $(k-1)^N+1$ verification patterns have all been successful.

It may be m<n for the m and the n. It may also be $2^{m-n} \ll 1$ for the m and the n.

According to the embodiments of the present invention described above, it is possible to realise a public key authentication scheme or a digital signature scheme whose security is enhanced by the use of a multi-order multivariate simultaneous equation for which there is no means (trapdoor) for efficient solution.

BRIEF DESCRIPTION OF THE DRAWINGS

FIG. 27 is a chart comparing the efficiency of the public key authentication schemes according to the first and second embodiments of the present invention.

DETAILED DESCRIPTION OF THE EMBODIMENT(S)

Figure 1:
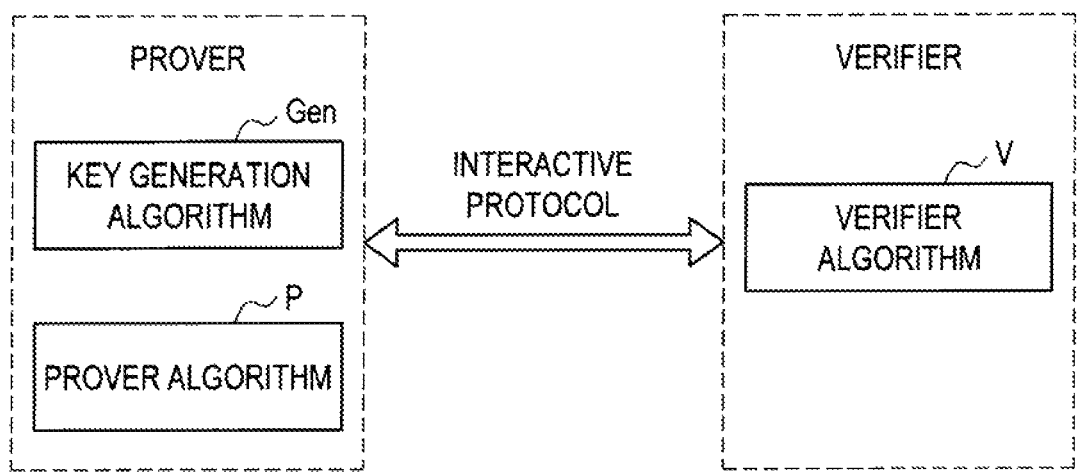
FIG. 1 is an explanatory diagram for describing an algorithm structure of a public key authentication scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of a description related to embodiments of the present invention described later will be briefly mentioned here. First, an algorithm structure of a public key authentication scheme will be described with reference to FIG. 1. Next, an algorithm structure of a digital signature scheme will be described with reference to FIG. 2. Then, an n-pass public key authentication scheme will be described with reference to FIG. 3. Additionally, a general HFE signature scheme will also be briefly described prior to the description of the present embodiments.

Figure 4:
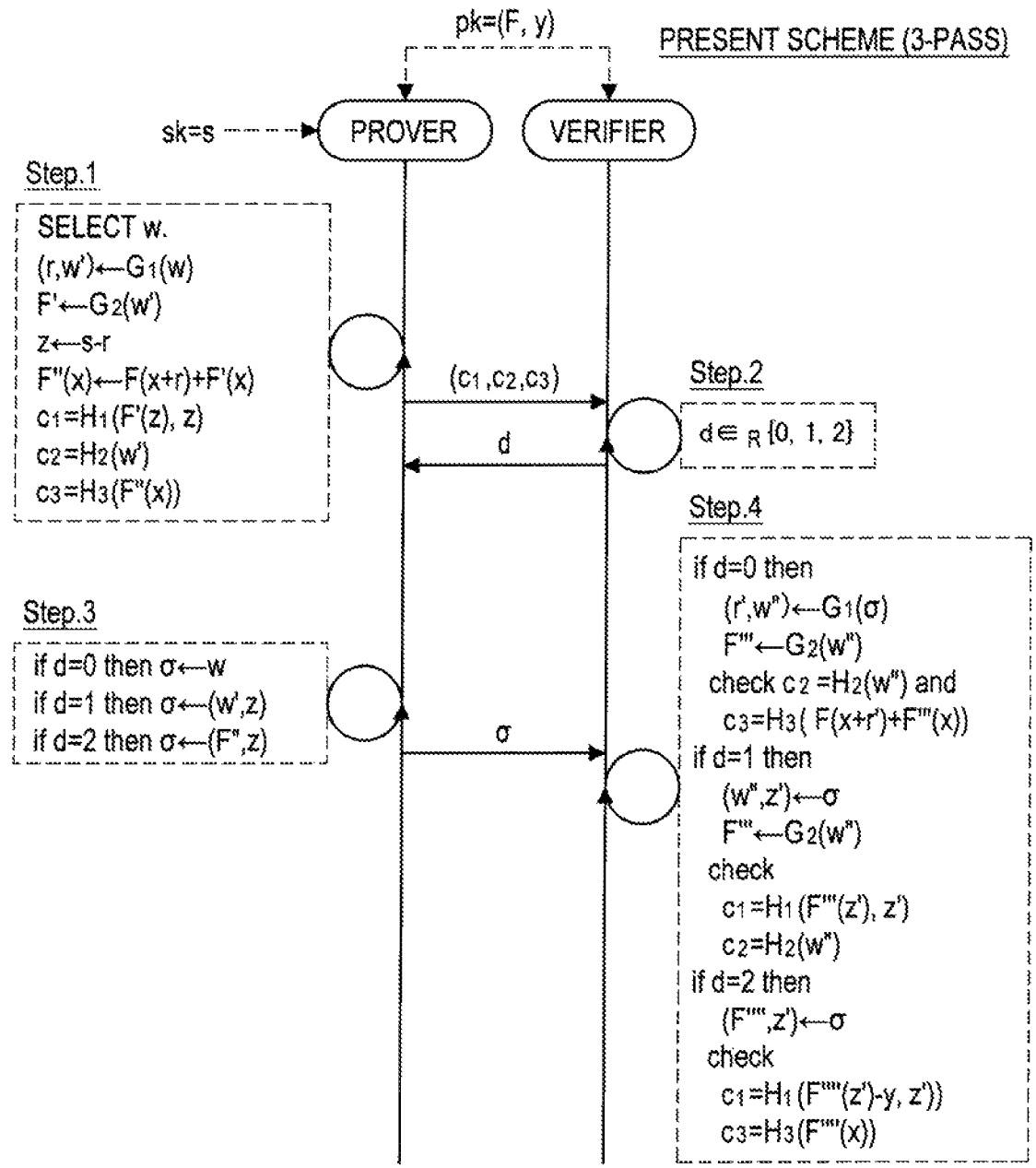
FIG. 4 is an explanatory diagram for describing an algorithm for a public key authentication scheme according to a first embodiment (3-pass) of the present invention.

Next, an algorithm for a public key authentication scheme according to a first embodiment (3-pass) of the present invention will be described with reference to FIG. 4. Then, an extended algorithm for the public key authentication scheme according to the embodiment will be described with reference to FIG. 5. Then, a parallel algorithm for the public key authentication scheme according to the embodiment will be described with reference to FIG. 6. Next, a non-interactive algorithm for the public key authentication scheme according to the embodiment will be described with reference to FIG. 7. Then, a concrete algorithm for the public key authentication scheme according to the embodiment will be described with reference to FIG. 8. Then, efficient algorithms for the public key authentication scheme according to the embodiment will be described with reference to FIGS. 9 to 11.

Figure 12:
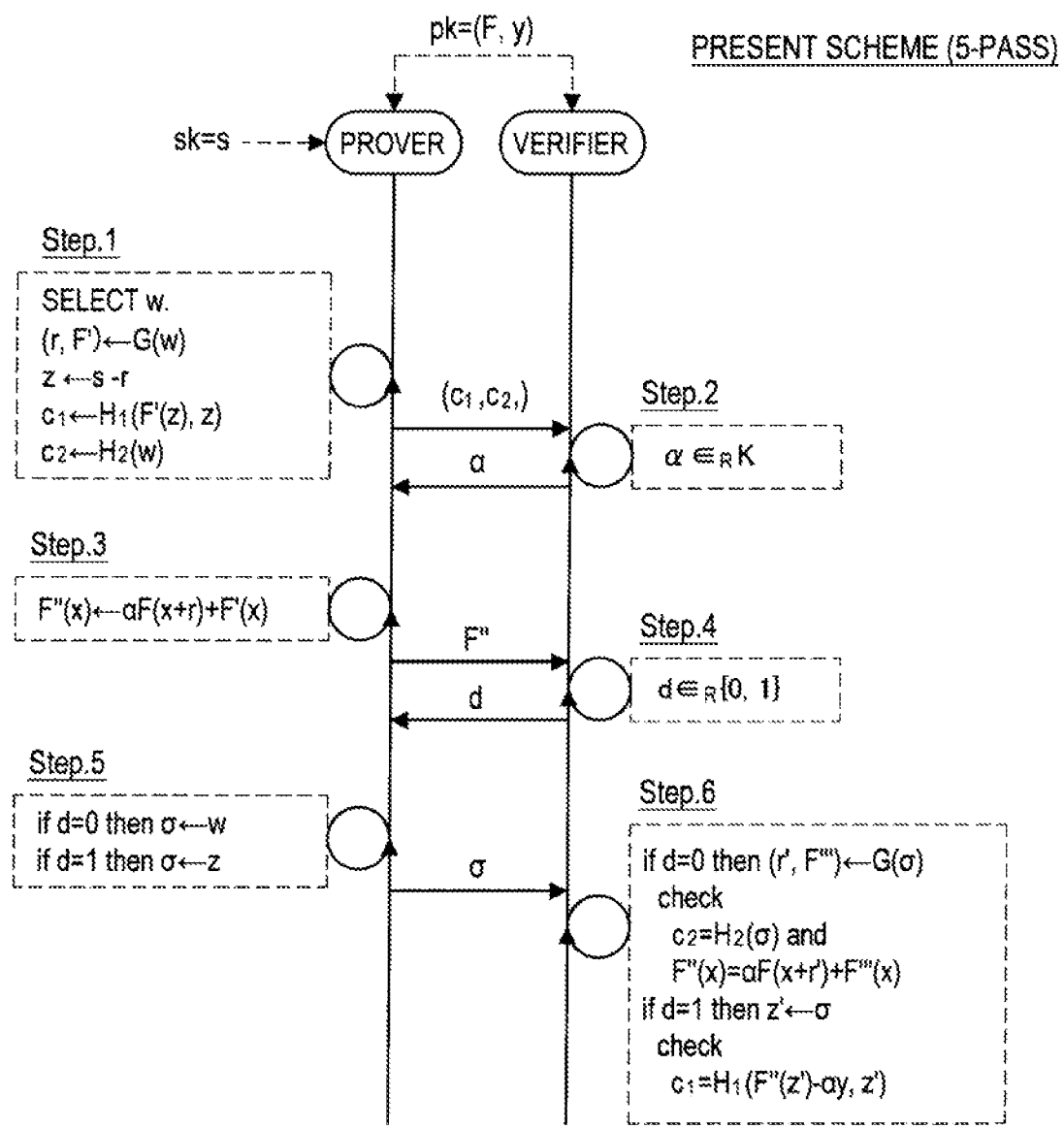
FIG. 12 is an explanatory diagram for describing an algorithm for a public key authentication scheme according to a second embodiment (5-pass) of the present invention.

Next, an algorithm for a public key authentication scheme according to a second embodiment (5-pass) of the present invention will be described with reference to FIG. 12. Then, an extended algorithm for the public key authentication scheme according to the embodiment will be described with reference to FIG. 13. Then, a parallel algorithm for the public key authentication scheme according to the embodiment will be described with reference to FIGS. 14 and 15. Next, a non-interactive algorithm for the public key authentication scheme according to the embodiment will be described with reference to FIG. 16. Then, a concrete algorithm for the public key authentication scheme according to the embodiment will be described with reference to FIG. 17. Then, efficient algorithms for the public key authentication scheme according to the embodiment will be described with reference to FIGS. 18 to 25.

Next, an extension method of applying the efficient algorithms according to the first and second embodiments of the present invention to a multivariate polynomial of second or higher order will be described. Then, an example hardware configuration of an information processing apparatus capable of realising each algorithm of the first and second embodiments of the present invention will be described with reference to FIG. 26. Lastly, the technical ideas of the embodiment will be summarized and effects obtained by the technical ideas will be briefly described.

(Description Items)
1: Introduction
   1-1: Algorithm Structure of Public Key Authentication Scheme
   1-2: Algorithm Structure of Digital Signature Scheme
   1-3: N-Pass Public Key Authentication Scheme
   1-4: HFE Digital Signature Scheme
   1-4-1: Property of HFE Function
   1-4-2: Algorithm for HFE Digital Signature Scheme
2: First Embodiment
   2-1: Algorithm for Public Key Authentication Scheme
   2-2: Extended Algorithm
   2-1: Parallel Algorithm
   2-4: Non-Interactive Algorithm
   2-5: Modification into Digital Signature Scheme
   2-6: Concrete Example
   2-7: Efficient Algorithm
   2-8: Form of Multi-Order Multivariate Simultaneous Equation
   2-8-1: Form Related to Common Key Block Cipher
   2-8-2: Form Related to Hash Function
   2-8-3: Form Related to Stream Cipher
3: Second Embodiment
   3-1: Algorithm for Public Key Authentication Scheme
   3-2: Extended Algorithm
   3-3: Parallel Algorithm
   3-4: Non-Interactive Algorithm
   3-5: Modification into Digital Signature Scheme
   3-6: Concrete Example
   3-7: Efficient Algorithm
4: Generalisation of Efficient Algorithm
5: Example Hardware Configuration
6: Summary
   <1: Introduction>

First, before describing the embodiments of the present invention in detail, an algorithm structure of a general public key authentication scheme, an algorithm structure of a general digital signature scheme, and an n-pass public key authentication scheme will be briefly described.

[1-1: Algorithm Structure of Public Key Authentication Scheme]

First, an algorithm structure of a general public key authentication scheme will be described with reference to FIG. 1. FIG. 1 is an explanatory diagram for describing an algorithm structure of a general public key authentication scheme.

(Overview)

A public key authentication scheme is an authentication scheme where a person (prover) convinces another person (verifier) that she is the prover herself by using a public key pk and a secret key sk. For example, a public key $pk_A$ of a prover A is made known to the verifier. On the other hand, a secret key $sk_A$ of the prover A is secretly managed by the prover. According to the public key authentication scheme, a person who knows the secret key $sk_A$ corresponding to the public key $pk_A$ is regarded as the prover A herself.

In the case the prover A attempts to prove to a verifier B that she is the prover herself, the prover A can perform an interactive protocol with the verifier B and prove that she knows the secret key $sk_A$ corresponding to the public key $pk_A$. Then, in the case it is proved by the verifier B, by the interactive protocol, that the prover A knows the secret key $sk_A$, the legitimacy of the prover A (that she is the prover herself) is proved.

Additionally, to ensure security of the public key authentication scheme, two conditions set forth below are to be satisfied.

The first condition is to lower as much as possible the probability of falsification being established, at the time the interactive protocol is performed, by a falsifier not having the secret key sk. That this first condition is satisfied is called "soundness." In other words, with a sound interactive protocol, falsification is not established by a falsifier not having the secret key sk with a non-negligible probability. The second condition is that, even if the interactive protocol is performed, information on the secret key $sk_A$ of the prover A is not at all leaked to the verifier B. That this second condition is satisfied is called "zero knowledge."

The security of the public key authentication scheme is ensured by using an interactive protocol having the soundness and zero knowledge as described above.

(Model)

In a model of the public key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Figure 26:
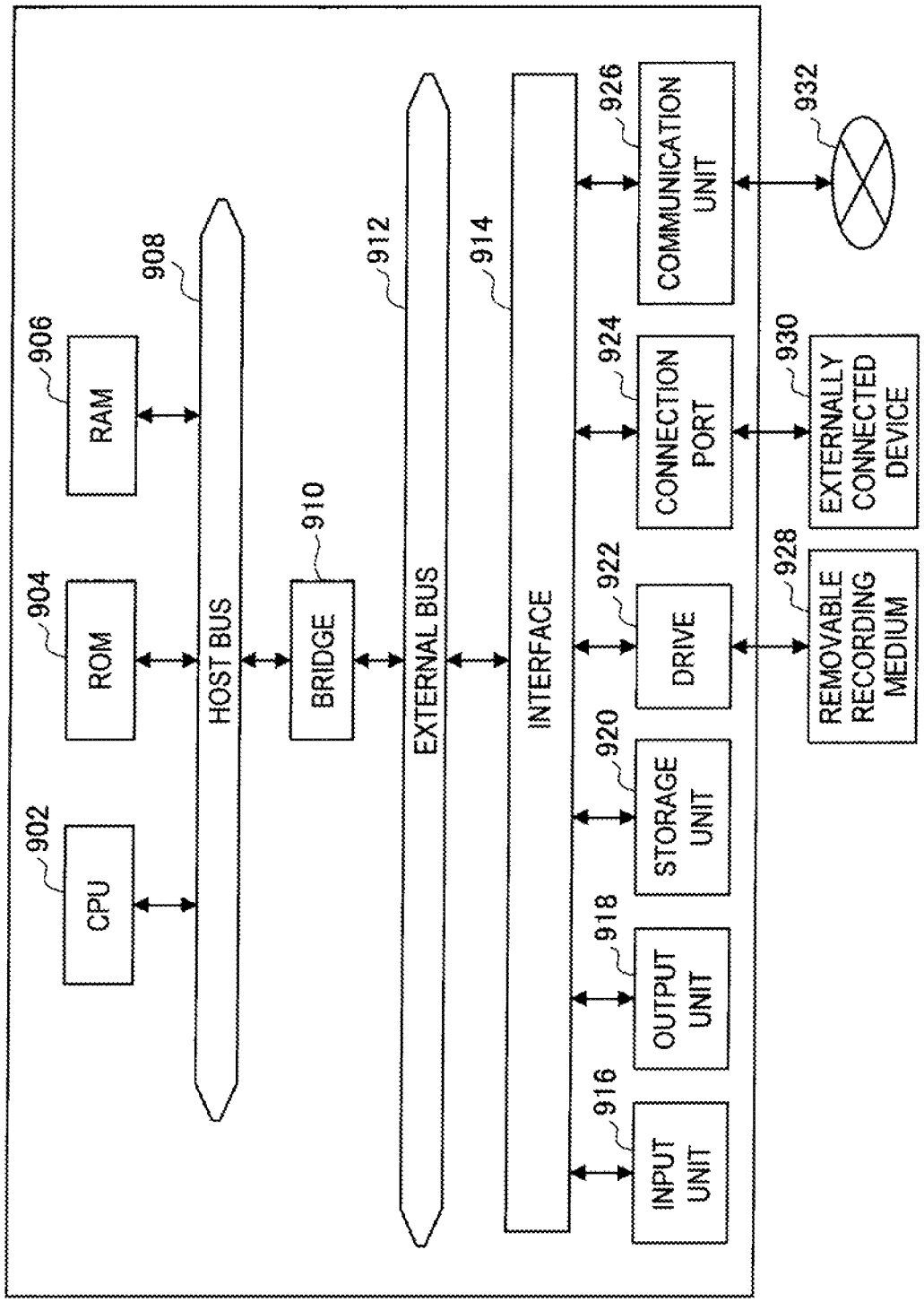
FIG. 26 is an explanatory diagram for describing an example hardware configuration of an information processing apparatus capable of performing the algorithm according to each embodiment of the present invention.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 26, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed is used to prove to the verifier of possession of the secret key sk corresponding to the public key pk. Formally, the key generation algorithm Gen is represented as formula (1) below as an algorithm that takes security parameter $1^\lambda$ ($\lambda$ is an integer of 0 or more) as an input and outputs the secret key sk and the public key pk.

[Expression 1]

$$(sk, pk) \leftarrow Gen(1^\lambda) \qquad (1)$$

(Prover Algorithm P)

The prover algorithm P is used by a prover. The prover algorithm P is an algorithm for proving possession of the secret key sk corresponding to the public key pk. The prover algorithm P is defined as an algorithm that takes the public key pk and the secret key sk of a prover as inputs and performs the interactive protocol with a verifier.

(Verifier Algorithm V)

The verifier algorithm V is used by a verifier. The verifier algorithm V is an algorithm for verifying, in the interactive protocol, whether or not a prover possesses the secret key sk corresponding to the public key pk. The verifier algorithm V is defined as an algorithm that takes the public key pk of a prover as an input, and that outputs 0 or 1 (1 bit) after performing the interactive protocol with the prover. Moreover, in the case of output 0, the prover is assumed to be illegitimate, and in the case of output 1, the prover is assumed to be legitimate. Formally, the verifier algorithm V is represented as formula (2) below.

[Expression 2]

$$0/1 \leftarrow V(pk, m, \sigma) \qquad (2)$$

(Supplement)

As described above, the public key authentication scheme has to satisfy two conditions, i.e. soundness and zero knowledge, to ensure security. However, in order to make a prover prove that she possesses the secret key sk, it is necessary that the prover perform a procedure dependent on the secret key sk, notify the verifier of the result and make the verifier perform verification based on the notified contents. Execution of the procedure dependent on the secret key sk is necessary to guarantee the soundness. On the other hand, it is necessary that information on the secret key sk is not at all leaked to the verifier even when the result of the procedure is notified to the verifier. Accordingly, it is necessary that the key generation algorithm Gen, the prover algorithm P, and the verifier algorithm V are designed so as to satisfy these terms.

In the foregoing, the algorithm structure of a general public key authentication scheme has been described.

[1-2: Algorithm Structure of Digital Signature Scheme]

Figure 2:
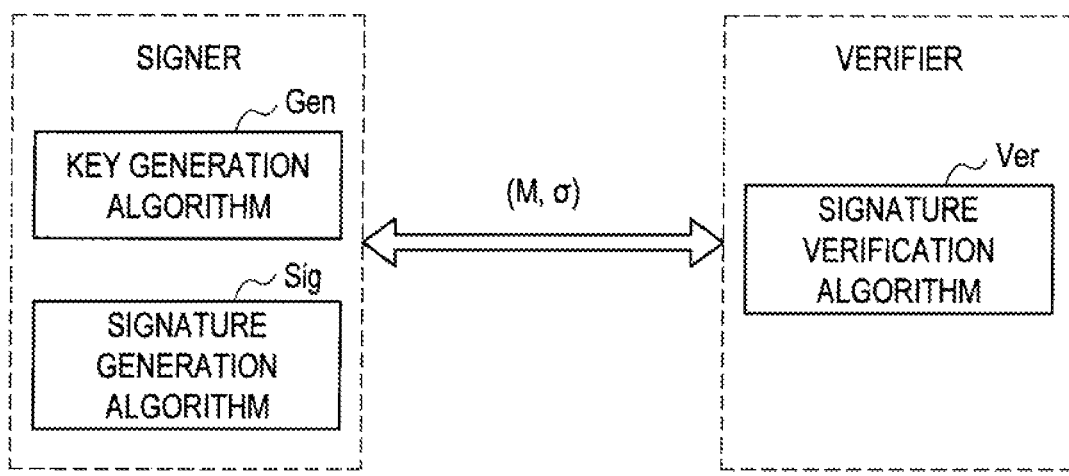
FIG. 2 is an explanatory diagram for describing an algorithm structure of a digital signature scheme.

Next, an algorithm structure of a general digital signature scheme will be described with reference to FIG. 2. FIG. 2 is an explanatory diagram for describing an algorithm structure of a general digital signature scheme.

(Overview)

Unlike a paper document, it is not possible to seal or sign digitised data. Thus, to prove the legitimacy of the author of digitised data, an electronic mechanism that produces an effect equal to sealing or signing a paper document becomes necessary. This mechanism is the digital signature. For example, a mechanism of providing signature data that only the author of data knows to a receiver in association with the data and verifying the signature data on the receiver side is called the digital signature scheme.

(Model)

In a model of the digital signature scheme, two entities, namely a signer and a verifier, are present, as shown in FIG. 2. Also, the model of the digital signature scheme is configured from three algorithms, namely a key generation algorithm Gen, a signature generation algorithm Sig, and a signature verification algorithm Ver.

The signer generates a pair of verification key pk and signature key sk unique to the signer by using the key generation algorithm Gen. Also, the signer generates a digital signature $\sigma$ that is to be added to a document M, by using the signature generation algorithm Sig. That is, the signer is an entity that adds a digital signature to the document M. On the other hand, the verifier verifies the digital signature $\sigma$ that is added to the document M, by using the signature verification algorithm Ver. That is, the verifier is an entity that verifies the digital signature $\sigma$ to check whether the author of the document M is the signer or not.

Additionally, expressions "signer" and "verifier" are used in the following description, but these expressions strictly mean entities. Therefore, the subject that performs the key generation algorithm Gen and the signature generation algorithm Sig is an information processing apparatus corresponding to the entity "signer". Similarly, the subject that performs the signature verification algorithm Ver is an information processing apparatus. The hardware configuration of these information processing apparatuses is as shown in FIG. 26, for example. That is, the key generation algorithm Gen, the signature generation algorithm Sig, and the signature verification algorithm Ver are performed by a CPU 902 based on a program recorded on a ROM 904, a RAM 906, a storage unit 920, a removable recording medium 928, or the like.

(Key Generation Algorithm Gen)

The key generation algorithm Gen is used by a signer. The key generation algorithm Gen is an algorithm for generating a pair of verification key pk and signature key sk unique to the signer. The verification key pk generated by the key generation algorithm Gen is published. On the other hand, the signature key sk generated by the key generation algorithm Gen is secretly managed by the signer. The signature key sk that is secretly managed by the signer is used to generate the digital signature $\sigma$ to be added to the document M. Formally, the key generation algorithm Gen is represented as formula (3) below as an algorithm that takes security parameter $1^\lambda$ ($\lambda$ is an integer of 0 or more) as an input and outputs a secret key sk and a public key pk.

[Expression 3]

$$(sk, pk) \leftarrow Gen(1^\lambda) \qquad (3)$$

(Signature Generation Algorithm Sig)

The signature generation algorithm Sig is used by a signer. The signature generation algorithm Sig is an algorithm for generating the digital signature $\sigma$ to be added to the document M. Formally, the signature generation algorithm Sig is represented as formula (4) below as an algorithm that takes the document M and the signature key sk of a signer as inputs and outputs the digital signature $\sigma$.

[Expression 4]

$$\sigma \leftarrow Sig(sk, M) \quad (4)$$

(Signature Verification Algorithm Ver)

The signature verification algorithm Ver is used by a verifier. The signature verification algorithm Ver is an algorithm for verifying whether or not the digital signature σ is a valid digital signature of the document M. Formally, the signature verification algorithm Ver is represented as formula (5) below as an algorithm that takes the verification key pk, the document M, and the digital signature σ of a signer as inputs and outputs 0 or 1 (1 bit). Moreover, in the case 0 is output (in the case the public key pk denies the document M and the digital signature σ), the digital signature σ of the document M is invalid. In the case 1 is output (in the case the public key pk accepts the document M and the digital signature σ), the digital signature σ of the document M is valid.

[Expression 5]

$$0/1 \leftarrow Ver(pk, M, \sigma) \quad (5)$$

In the foregoing, the algorithm structure of a general digital signature scheme has been described.

[1-3: N-Pass Public Key Authentication Scheme]

Figure 3:
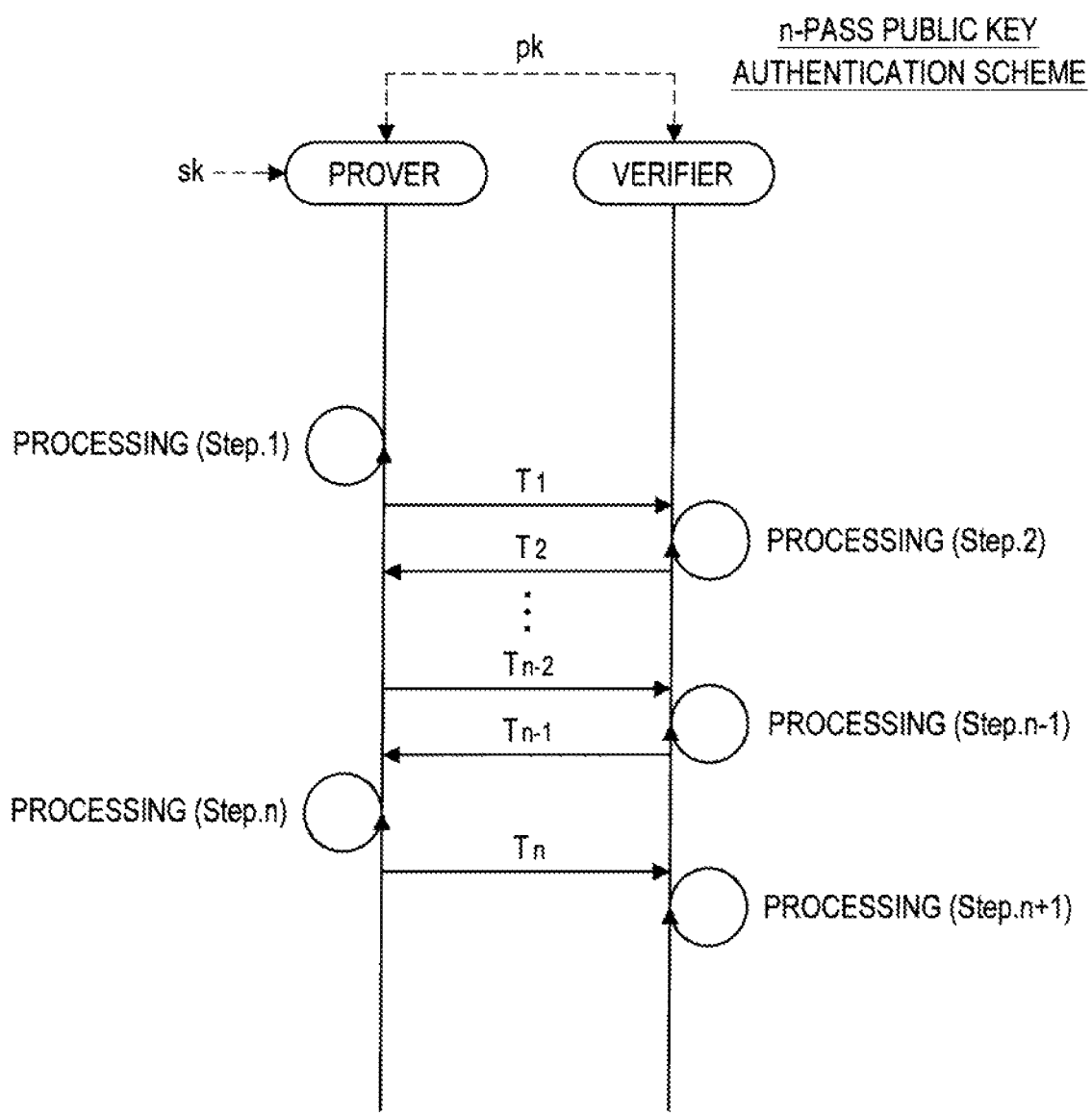
FIG. 3 is an explanatory diagram for describing an n-pass public key authentication scheme.

Next, an n-pass public key authentication scheme will be described with reference to FIG. 3. FIG. 3 is an explanatory diagram for describing an n-pass public key authentication scheme.

As described above, the public key authentication scheme is an authentication scheme for proving to a verifier, in an interactive protocol, that a prover possesses a secret key sk corresponding to a public key pk. Moreover, to guarantee the security of the public key authentication scheme, two conditions, namely soundness and zero knowledge, have to be satisfied. Accordingly, as shown in FIG. 3, in the interactive protocol, information exchange is performed n times between the prover and the verifier while execution of processes is being performed by both prover and verifier.

In the case of the n-pass public key authentication scheme, a process is performed by the prover using the prover algorithm P (Step 1), and information $T_1$ is transmitted to the verifier. Next, a process is performed by the verifier using the verifier algorithm V (Step 2), and information $T_2$ is transmitted to the prover. Processes (Step 3, . . . , Step n) are performed in a similar manner and pieces of information $T_3, \ldots T_n$ are transmitted, and a process (Step n+1) is performed. Such public key authentication scheme based on an interactive protocol where pieces of information are transmitted/received n times is called the "n-pass" public key authentication scheme.

In the foregoing, the n-pass public key authentication scheme has been described.

[1-4: HFE Digital Signature Scheme]

Here, a HFE digital signature scheme will be briefly described as an example of a digital signature scheme that uses a multi-order multivariate simultaneous equation.

(1-4-1: Property of HFE Function)

First, definition of a HFE function $F_t$ and the property of the HFE function $F_t$ will be briefly described.

<<Definition of Symbols>>

K: Finite ring formed from elements including q numbers $K^n$: N direct products of K $F_t: K^n \to K^n$ A: N number of elements of finite ring K (number of elements $q^n$)

B: M-th order extension of finite ring K (number of elements $q^m$)

φ: Linear mapping $A \to K^n$ (see formula (6) below)

S: Invertible Affine transformation on $K^n$

T: Invertible Affine transformation on $K^n$ f: Centre mapping (see formula (7) below)

Trapdoor: S, T, $a_{ij}$, $b_i$, c

[Expression 6]

$$\phi(x_0 + x_1 X + \ldots + x_{n-1} X^{n-1}) = (x_0, \ldots, x_{n-1}) \quad (6)$$

$$f: A \to A, \ X \mapsto \sum_{i=0}^{n-1} \sum_{j=0}^{n-1} a_{ij} X^{q^i + q^j} + \sum_{i=0}^{n-1} b_i X^{q^i} + c \quad (7)$$

Additionally, when d is an integer that is not so large, then $a_{ij}$, $b_i$, c∈A, "if $q^i + q^j > d$, then $a_{ij}=0$" and "if $q^i > d$, then $b_j=0$".

<<Structure of HFE Function $F_t$>>

The HFE function $F_t$ is expressed by composite mapping $F_t = T*F*S$ of mapping by transformation S, centre mapping F ($F = \phi^{-1}*f*\phi$), and mapping by transformation T (* is composition of mappings). An algorithm for calculating $y = F_t(x)$ is as follows.

(Step 1) Transform given $x = (x_0, \ldots, x_{n-1}) \in K^n$ into $x' = (x_0', \ldots, x_{n-1}') \in K^n$ by transformation S.

(Step 2) Transform $x' \in K^n$ into $X' \in A$ by $\phi^{-1}$.

(Step 3) Transform $X' \in A$ into $Y' = f(X') \in A$ by centre mapping f.

(Step 4) Transform $Y' \in A$ into $y' = (y_0', \ldots, y_{n-1}') \in K^n$ by φ.

(Step 5) Transform $y' \in K^n$ into $y = (y_0', \ldots, y_{n-1}) \in K^n$ by transformation T.

(Step 6) Output $y \in K^n$.

As shown in formula (7) above, the HFE function Ft includes a centre mapping f based on a non-linear polynomial of one variable. Accordingly, there is a possibility that there are different numbers of pieces of elements of a preimage $\{Z \in A | f(Z) = Y'\}$ corresponding to a set of roots of the single-variable polynomial for element Y' of a codomain A. In this case, the number of pieces of elements of a preimage related to the FIFE function $F_t$ will be plural for element y of a range.

There is also a possibility that there exists no element of the preimage $\{Z \in A | f(Z) = Y'\}$ for element Y' of a codomain A. In this case, the element of a codomain for which there exists no element of the preimage $\{Z \in A | f(Z) = Y'\}$ is not included in the range, and thus the codomain and the range are different.

In the following, a calculation algorithm for the HFE function $F_t$ will be described in greater detail.

<<Forward Calculation Algorithm>>

A forward calculation algorithm for the HFE function $F_t$ is formed from a step of substituting given $x \in K^n$ into HFE function $F_t(x)$ and obtaining $y = F_t(x) \in K^n$. When one element x of a domain is input to this forward calculation algorithm, one element y of the range is output.

<<Backward Calculation Algorithm>>

A backward calculation algorithm related to the HFE function $F_t$ is formed from Step 1 to Step 7 below.

(Step 1) Obtain $y' = (y_0', \ldots, y_{n-1}') \in K^n$ by applying given $y = (y_0, \ldots, y_{n-1}) \in K^n$ to inverse transformation $T^{-1}$ of transformation T.

(Step 2) Transform $y' = (y_0', \ldots, y_{n-1}') \in K^n$ into $Y' \in A$ by $\phi^{-1}$.

(Step 3) Calculate the set of $X' \in \{Z \in A | f(Z) = Y'\}$ by using Y'. Here, in the case $X' \in \{Z \in A | f(Z) = Y'\}$ is an empty set, an exception value err is output. Additionally, $X' \in \{Z \in A | f(Z) = Y'\}$ is obtained by factoring a polynomial f(X)-Y', for example.

Also, when an element Y' of the codomain is randomly selected, the probability of the preimage $\{Z \in A | f(Z)=Y'\}$ for the element Y' having m elements is approximately $1/(m!e)$ (here, this e is a Napier's constant).

(Step 4) Select one element X' from the set of $X' \in \{Z \in A | f(Z)=Y'\}$.

(Step 5) The one element $X' \in A$ selected in Step 4 is transformed into $x'=(x_0', \ldots, x_{n-1}') \in K^n$ by $\phi$.

(Step 6) Transform $X' \in K^n$ into $x=(x_0, \ldots, x_{n-1}) \in K^n$ by inverse transformation of transformation S.

(Step 7) Output $x \in K^n$.

Note that, in Step 3 above, there is a possibility that the number of elements $\alpha = |\{Z \in A | f(Z)=Y'\}|$ of $X' \in \{Z \in A | f(Z)=Y'\}$ is $\alpha=0$ or $\alpha \geq 2$.

(1-4-2: Algorithm for HFE Digital Signature Scheme)

The HFE function $F_t$ has been described above. Next, a concrete algorithm of a digital signature scheme using the HFE function $F_t$ (hereinafter, HFE signature scheme) will be described. Moreover, a PFDH signature scheme using the HFE function (hereinafter, HFE+PFDH signature scheme) will be described here as an example of the HFE signature scheme.

<<PFDH Signature Scheme>>

First, a key generation algorithm Gen, a signature generation algorithm Sig, and a signature verification algorithm Ver of the PFDH signature scheme will be described. These algorithms of the PFDH signature scheme use a trapdoor one-way function $F_t: A \to B$ and a hash function H: $\{0, 1\}^* \to B$.

(Key Generation Algorithm Gen)

The key generation algorithm Gen takes a security parameter $1^\lambda$ as an input, a signature key sk as a trapdoor t of $F_t$ and a verification key pk as $F_t$, and calculates (sk, pk)((sk, pk)←Gen($1^\lambda$)).

(Signature Generation Algorithm Sig)

The signature generation algorithm Sig takes a message M and the signature key sk as inputs, and calculates a digital signature $\sigma$ by Step 1 to Step 4 below ($\sigma$←Sig(sk, M)).

(Step 1) Generate a random number r.

(Step 2) Calculate $y=H(M, r) \in B$.

(Step 3) Perform a backward calculation algorithm of $F_t$ by using the trapdoor t, and calculate x that satisfies $y=F_t(x)$. Additionally, when there is no x that satisfies $y=F_t(x)$, return to Step 1.

(Step 4) Output digital signature $\sigma=(x, r)$.

(Signature Verification Algorithm Ver)

The signature verification algorithm Ver takes a verification key $pk=F_t$, the message M and the digital signature $\sigma=(x, r)$ as inputs, and verifies the validity of the digital signature $\sigma$ of the message M by Step 1 and Step 2 below (0/1←Ver(pk, M, $\sigma$)).

(Step 1) Determine whether $F_t(x)=H(M, r)$ or not.

(Step 2) In the case $F_t(x)=H(M, r)$, output 1; in the case of $F_t(x) \neq H(M, r)$, output 0.

<<HFE+PFDH Signature Scheme>>

Next, a signature generation algorithm Sig and a signature verification algorithm Ver of the HFE+PFDH signature scheme will be described. The HFE+PFDH signature scheme is the PFDH signature scheme that uses the HFE function $F_t$. Additionally, in the HFE+PFDH signature scheme, a signature key sk, trapdoors S. T, $a_{ij}$, $b_i$ and c of the HFE function $F_t$, and a verification key pk are set as $F_t$.

(Signature Generation Algorithm Sig)

A signature generation algorithm Sig takes a message M and a signature key sk as inputs, and calculates a digital signature $\sigma$ by Step 1 to Step 9 below ($\sigma$←Sig(sk, M)).

(Step 1) Generate a random number r.

(Step 2) Calculate a hash value $y \in K'' \leftarrow H(M, r)$ by using the random number r and a message M.

(Step 3) Obtain $y'=(y_0', \ldots, y_{n-1}') \in K^n$ by applying $y=(y_0, \ldots, y_{n-1}) \in K^n$ to inverse transformation $T^{-1}$ of transformation T.

(Step 4) Transform $y'=(y_0', \ldots, y_{n-1}') \in K^n$ into $Y' \in A$ by $\phi^{-1}$.

(Step 5) Calculate the set of $X' \in \{Z \in A | f(Z)=Y'\}$.

(Step 6) Select one element X' from the set $\{Z \in A | f(Z)=Y'\}$. Here, in the case the set $\{Z \in A | f(2)=Y'\}$ is an empty set, return to process of Step 1.

(Step 7) Transform $X' \in A$ into $x'=(x_0', \ldots, x_{n-1}') \in K^n$ by $\phi$.

(Step 8) Transform $x' \in K^n$ into $x=(x_0, \ldots, x_{n-1}) \in K^n$ by transformation S.

(Step 9) Output a digital signature $\sigma=(x, r)$.

(Signature Verification Algorithm Ver)

A signature verification algorithm Ver takes a verification key $pk=F_1$, a message M, and a digital signature $\sigma=(x, r)$ as inputs, and verifies the validity of the digital signature $\sigma$ of the message M by Step 1 to Step 3 below (0/1←Ver(pk, M, $\sigma$)).

(Step 1) Calculate a hash value $y \leftarrow H(M, r)$ by using the r included in the digital signature $\sigma$ and the message M.

(Step 2) Calculate $y''=F_t(x) \in K^n$ by substituting $x \in K^n$ included in the digital signature $\sigma$ into a HFE function $F_t(x)$.

(Step 3) Output 1 when $y=y''$, and output 0 when $y \neq y'''$.

In the foregoing, the structure of each algorithm of the HFE digital signature scheme (the HFE+PFDH signature scheme has been illustrated here) has been described. As can be presumed from the algorithm structures described above, according to the HFE digital signature scheme, if the preimage of $F_t=T*F*S$ related to $H(M, r)$ is calculated, the digital signature $\sigma$ is forged. That is, the HFE digital signature scheme is a scheme dependent on the difficulty of solving a special multi-order multivariate simultaneous equation represented by $H(M, r)=F_t(x)$. It is difficult to evaluate the difficulty of solving such special multi-order multivariate simultaneous equation. In reality, it is said that the multi-order multivariate simultaneous equation used in the HFE digital signature scheme can be solved in quasi-polynomial time or less.

<2: First Embodiment>

Here, a first embodiment of the present invention will be described. As with the HFE digital signature scheme, the present embodiment relates to a public key authentication scheme and a digital signature scheme that take, as a basis for security, the difficulty of solving a multi-order multivariate simultaneous equation. However, unlike the HFE digital signature scheme and the like, the present embodiment provides a public key authentication scheme and a digital signature scheme that enable use of a multi-order multivariate simultaneous equation for which there is no means (trapdoor) for efficient solution to ensure sufficient security.

[2-1: Algorithm for Public Key Authentication Scheme]

First, an algorithm of a public key authentication scheme of the present embodiment (hereinafter, the present scheme) will be described with reference to FIG. 4. FIG. 4 is an explanatory diagram for describing an algorithm of the present scheme. Additionally, the present scheme is configured from a key generation algorithm Gen, a prover algorithm P, and a verifier algorithm V. In the following, contents of each algorithm will be described.

(Key Generation Algorithm Gen)

The key generation algorithm Gen generates in multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Prover Algorithm P, Verifier Algorithm V)

Next, processes by the prover algorithm P and the verifier algorithm V in an interactive protocol will be described with reference to FIG. 4. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates a vector $r \in K^n$ and a number w' by applying the number w to a pseudo random number generator $G_1$. That is, the prover algorithm P calculates $(r, w') \leftarrow G_1(w)$. Next, the prover algorithm P generates a polynomial of n variables $F'(x)=(f'_1(x), \ldots, f'_m(x))$ by applying the number w' to a pseudo random number generator $G_2$. That is, the prover algorithm P calculates $F' \leftarrow G_2(w')$.

Step 1 (Continued):

Next, the prover algorithm P calculates $z \leftarrow s-r$. This calculation corresponds to an operation of masking the secret key s by the vector r. Furthermore, the prover algorithm P calculates $F''(x) \leftarrow F(x+r)+F'(x)$. This calculation corresponds to an operation of masking a set of polynomials $F(x+r)$ for x by the set of polynomials $F'(x)$.

Step 1 (Continued):

Next, the prover algorithm P generates a hash value $c_1$ of $F''(z)$ and z. That is, the prover algorithm P calculates $c_1 \leftarrow H_1(F''(z), z)$. Also, the prover algorithm P generates a hash value $c_2$ of the number w'. That is, the prover algorithm P calculates $c_2 \leftarrow H_2(w')$. Furthermore, the prover algorithm P generates a hash value $c_3$ of the set of polynomials F''. That is, the prover algorithm P calculates $c_3 \leftarrow H_3(F'')$. Additionally, $H_1(\ldots)$, $H_2(\ldots)$, and $H_3(\ldots)$ described are hash functions. Also, the hash values $(c_1, c_2, c_3)$ are messages.

The messages $(c_1, c_2, c_3)$ generated in Step 1 are sent to a verifier.

Step 2:

The verifier algorithm V selects a verification pattern to be used from three verification patterns. Then, the verifier algorithm V sends to the prover a demand $d \in \{0, 1, 2\}$ indicating the selected verification pattern.

Step 3:

The prover algorithm P generates information σ to be sent back to the verifier in response to the demand d received from the verifier. If d=0, the prover algorithm P generates information σ=w. Also, if d=1, the prover algorithm P generates information σ=(w', z). Furthermore, if d=2, the prover algorithm P generates information σ=(F''(x), z). The information σ generated in this manner is sent to the verifier by the prover algorithm P.

Step 4:

The verifier algorithm V performs the following verification process by using the information σ received from the prover.

If d=0, the verifier algorithm V calculates $(r', w'') \leftarrow G_1(\sigma)$. Furthermore, the verifier algorithm V calculates $F''' \leftarrow G_2(w'')$. Then, the verifier algorithm V verifies whether the equality $c_2 = H_2(w'')$ holds true or not. Also, the verifier algorithm V verifies whether the equality $c_3 = H_3(F(x+r')+F'''(x))$ holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates $(w'', z') \leftarrow \sigma$. Furthermore, the verifier algorithm V calculates $F''' \leftarrow G_2(w'')$. Then, the verifier algorithm V verifies whether the equality $c_1 = H_1(F'''(z'), z')$ holds true or not. Also, the verifier algorithm V verifies whether the equality $c_2 = H_2(w'')$ holds true or not. The verifier algorithm V outputs a value 1 indicating authentication success in the case all the verifications have succeeded, and outputs a value 0 indicating authentication failure in the case a failure has occurred in the verification.

If d=2, the verifier algorithm V calculates $(F'''', z') \leftarrow \sigma$. Then, the verifier algorithm V verifies whether the equality $c_1 = H_1(F''''(z')-y, z'))$ holds true or not. Also, the verifier algorithm V verifies whether the equality $C_3 = H_3(F'''')$ holds true or not. The verifier algorithm V outputs a value 1 indicating authentication success in the case all the verifications have succeeded, and outputs a value 0 indicating authentication failure in the case a failure has occurred in the verification.

(Supplement)

Moreover, note that, at the time of sending the messages $(c_1, c_2, c_3)$ generated in Step 1 described above to the verifier, information related to the secret key sk, information related to r and information related to z are not at all leaked to the verifier. Note also that, at the time of sending the information σ generated in Step 3 described above to the verifier, information related to z is not at al leaked to the verifier in the case of d=0, and information related to r is not at all leaked to the verifier in the case of d=1, 2.

(Soundness in Present Scheme)

The soundness of the present scheme is guaranteed by that, if the prover responded, to all the demands d=0, 1, 2 from the verifier, with correct information σ for the messages $(c_1, c_2, c_2)$, then F'''', F''', r' and z' that satisfy formulae (8) and (9) below can be calculated from the responses.

[Expression 7]

$$F''''(x)=F(x+r')+F'''(x) \qquad (8).$$

$$F''''(z')-y=F'''(z') \qquad (9)$$

With such logic guaranteed, it is guaranteed that, as long as the multi-order multivariate simultaneous equation is not solved, it is not possible to perform falsification with a probability higher than 2/3. That is, to correctly respond to all the demands d=0, 1, 2 of the verifier, the falsifier has to be able to calculate F'''', F''', r' and z' that satisfy formulae (8) and (9) above. In other words, the falsifier has to be able to calculate s that satisfies F(s)=y. Moreover, the falsifier may possibly correctly respond to two, at most, of the demands d=0, 1, 2 of the verifier. Accordingly, the probability of success of falsification will be 2/3. The interactive protocol described above is performed a sufficient number of times. Therefore, the probability of success of falsification can be reduced to a negligible level.

(Modification)

The key generation algorithm Gen described above calculates $y \leftarrow F(s)$, and sets the public key to (F, y). However, the key generation algorithm Gen may be configured to take $(y_1, \ldots, y_m) \leftarrow F(s)$ and calculate $(f_1^*(x), \ldots, f_m^*(x)) \leftarrow (f_1(x)-y_1, \ldots, f_m(x)-y_m)$ and set the public key to $(f_1^*, \ldots, f_m^*)$.

With this modification, the interactive protocol is enabled to be performed between the prover and the verifier taking y=0.

Furthermore, the prover algorithm P described above generates the message $c_1$ from F"(z) and z, but because of the relationship F"(z)=F'(z), a similar interactive protocol can be configured also when the message $c_1$ is generated from F'(z) and z. Furthermore, the prover algorithm P may separately calculate the hash value of F"(z) and the hash value of z, and may send each to the verifier as a message.

Furthermore, the prover algorithm P described above generates the vector r and the number w' by applying the pseudo random number generator $G_1$ to the number w. Then, the prover algorithm P generates the polynomial of n variables F'(x) by applying the number w' to the pseudo random number generator $G_2$. However, the prover algorithm P may calculate, from the start, w=(r, F'), and the $G_1$ may be made identity mapping. Furthermore, in this case, the number w does not have to be applied to the $G_1$. Additionally, the same can be said for the $G_2$.

Furthermore, the interactive protocol described above takes (F, y) as the public key. This F is a parameter not dependent on the secret key sk. Accordingly, this parameter F may also be made a parameter common to the entire system instead of being provided for each prover. In this case, the public keys set for respective provers will be y only, and the size of the public key can be reduced.

Furthermore, the interactive protocol described above takes $(f_1, \ldots, f_m, y)$ as the public key, but $F=(f_1, \ldots, f_m)$ is a parameter that can be appropriately selected. Accordingly, the prover and the verifier may, instead of holding $(f_1, \ldots, f_m)$ as it is, prepare a seed $w_{pk}$ of a random number and may calculate $F \leftarrow G^*(w_{pk})$ by using a pseudo random number generator $G^*$. In this case, the public key will be $(w_{pk}, y)$, and the size of the public key can be made smaller than when publishing (F, y) as the public key.

In the scheme described above, $c_1$, $c_2$, and $c_3$ are calculated by using the hash functions $H_1$, $H_2$, and $H_3$, but a commitment scheme COM may also be used instead of the hash function. A commitment function COM is a function that takes as arguments a character string S and a random number $\rho$. Examples of the commitment function include a scheme presented by Shai Halevi and Silvio Micali at the International Conference CRYPTO 1996, and the like.

In the case of using this commitment function, random numbers $\rho_1$, $\rho_2$, and $\rho_3$ are prepared before calculating $c_1$, $c_2$, and $c_3$, and $c_1$, $c_2$, and $c_3$ are generated by applying commitment functions COM(•, $\rho_1$), COM(•, $\rho_2$), and COM(•, $\rho_3$) instead of hash functions $H_1(•)$, $H_2(•)$, and $H_3(•)$. Also, in this modification, $\rho_1$ that is necessary for generating $C_i$ to be calculated by a verification unit is included in response information. Additionally, this modified scheme is applicable to all the schemes described below.

In the foregoing, a basic algorithm structure according to the present scheme has been described.

[2-2: Extended Algorithm]

Figure 5:
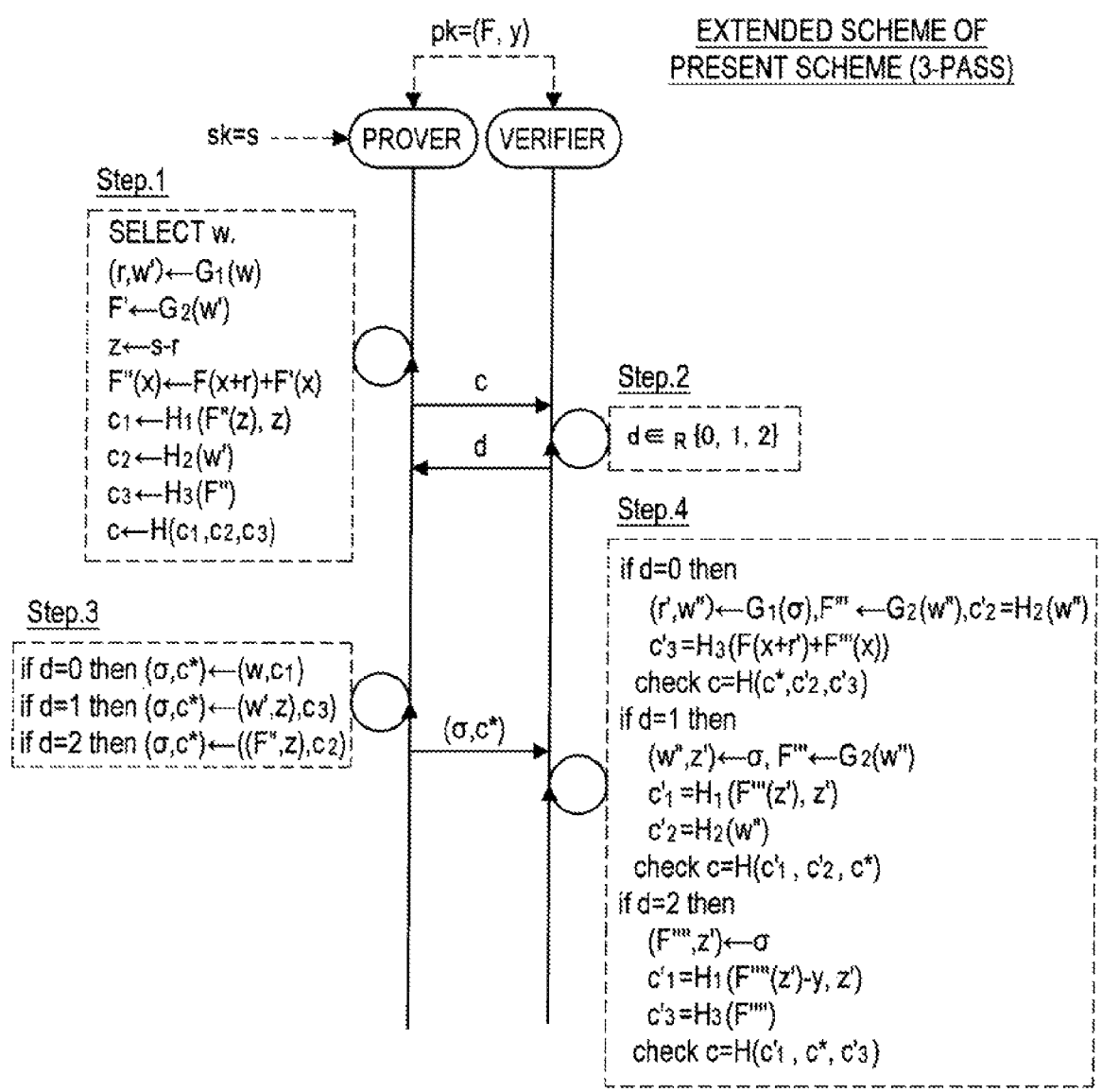
FIG. 5 is an explanatory diagram for describing an extended algorithm for the public key authentication scheme according to the embodiment.

Next, an algorithm of a public key authentication scheme which is an extension of the present scheme (hereinafter, extended scheme) will be described with reference to FIG. 5. FIG. 5 is an explanatory diagram for describing a flow of an interactive protocol based on the extended scheme. This extended scheme is a scheme of transforming messages ($c_1$, $c_2$ and $c_3$) to be sent in the first pass to one hash value c and sending the same to a verifier. Also, according to this extended scheme, the interactive protocol is configured to send the hash value c in the first pass, and thus a message that is not restored from information σ that is sent in the third pass is sent to the verifier together with the information σ. With such extension, the number of hash values to be sent to the verifier in the interactive protocol can be reduced, and the size of data to be communicated can be reduced. In the following, the contents of each algorithm of the extended scheme will be described in detail.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Prover Algorithm P, Verifier Algorithm V)

Next, processes by the prover algorithm P and the verifier algorithm V in the interactive protocol will be described with reference to FIG. 5. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates a vector $r \in K^n$ and a number w' by applying the number w to a pseudo random number generator $G_1$. That is, the prover algorithm P calculates $(r, w') \leftarrow G_1(w)$. Next, the prover algorithm P generates a polynomial of n variables $F'(x)=(f'_1(x), \ldots, f'_m(x))$ by applying the number w' to a pseudo random number generator $G_2$. That is, the prover algorithm P calculates $F' \leftarrow G_2(w')$.

Step 1 (Continued):

Next, the prover algorithm P calculates $z \leftarrow s-r$. This calculation corresponds to an operation of masking the secret key s by the vector r. Furthermore, the prover algorithm P calculates $F''(x) \leftarrow F(x+r)+F'(x)$. This calculation corresponds to an operation of masking a set of polynomials F(x+r) for x by the set of polynomials F'(x).

Step 1 (Continued):

Next, the prover algorithm P generates a hash value $c_1$ of F"(z) and z. That is, the prover algorithm P calculates $c_1 \leftarrow H_1(F"(z), z)$. Also, the prover algorithm P generates a hash value $c_2$ of the number w'. That is, the prover algorithm P calculates $c_2 \leftarrow H_2(w')$. Furthermore, the prover algorithm P generates a hash value $c_3$ of the set of polynomials F". That is, the prover algorithm P calculates $c_3 \leftarrow H_3(F")$. Additionally, $H_1(\ldots)$, $H_2(\ldots)$, and $H_3(\ldots)$ described are hash functions. Also, the hash values ($c_1$, $c_2$, $c_3$) are messages.

Step 1 (Continued):

In the case of the extended scheme, the prover algorithm P generates a hash value c by applying the messages ($c_1$, $c_2$, $c_3$) to a hash function H. Then, the prover algorithm P sends the generated hash value c to a verifier.

Step 2:

The verifier algorithm V selects a verification pattern to be used from three verification patterns. Then, the verifier algorithm V sends to the prover a demand $d \in \{0, 1, 2\}$ indicating the selected verification pattern.

Step 3:

The prover algorithm P generates information σ to be sent back to the verifier in response to the demand d received from the verifier. If d=0, the prover algorithm P generates information $(\sigma, c^*)=(w, c_1)$. Also, if d=1, the prover algorithm P generates information $(\sigma, c^*)=((w', z), c_3)$. Furthermore, if d=2, the prover algorithm P generates information $(\sigma, c^*)=((F''', z), c_2)$. The information $(\sigma, c^*)$ generated in this manner is sent to the verifier by the prover algorithm P.

Step 4:

The verifier algorithm V performs the following verification process by using the information $(\sigma, c^*)$ received from the prover.

If d=0, the verifier algorithm V calculates $(r', w'') \leftarrow G_1(\sigma)$. Next, the verifier algorithm V calculates $F''' \leftarrow G_2(w'')$. Then, the verifier algorithm V calculates $c'_2 = H_2(w'')$. Then, the verifier algorithm V calculates $c'_3 = H_3(F(x+r')+F'''(x))$. Then, the verifier algorithm V verifies whether the equality $c = H(c^*, c'_2, c'_3)$ holds true or not. The verifier algorithm V outputs a value 1 indicating authentication success in the case the verification has succeeded, and outputs a value 0 indicating authentication failure in the case the verification has failed.

If d=1, the verifier algorithm V calculates $(w'', z') \leftarrow \sigma$. Next, the verifier algorithm V calculates $F''' \leftarrow G_2(w'')$. Then, the verifier algorithm V calculates $c'_1 = H_1(F'''(z'), z')$. Then, the verifier algorithm V calculates $c' = H_2(w'')$. Then, the verifier algorithm V verifies whether the equality $c = H(c'_1, c'_2, c^*)$ holds true or not. The verifier algorithm V outputs a value 1 indicating authentication success in the case the verification has succeeded, and outputs a value 0 indicating authentication failure in the case the verification has failed.

If d=2, the verifier algorithm V calculates $(F'''', z') \leftarrow \sigma$. Then, the verifier algorithm V calculates $c'_1 = H_1(F''''(z')-y, z')$. Then, the verifier algorithm V calculates $c'_3 = H_3(F'''')$. Then, the verifier algorithm V verifies whether the equality $c = H(c'_1, c^*, c'_3)$ holds true or not. The verifier algorithm V outputs a value 1 indicating authentication success in the case the verification has succeeded, and outputs a value 0 indicating authentication failure in the case the verification has failed.

In the foregoing, the process of each algorithm in the interactive protocol of the extended scheme has been described. With such extension, the number of hash) values to be sent to the verifier in the interactive protocol can be reduced, and the size of data to be communicated can be reduced.

[2-3: Parallel Algorithm]

Figure 6:
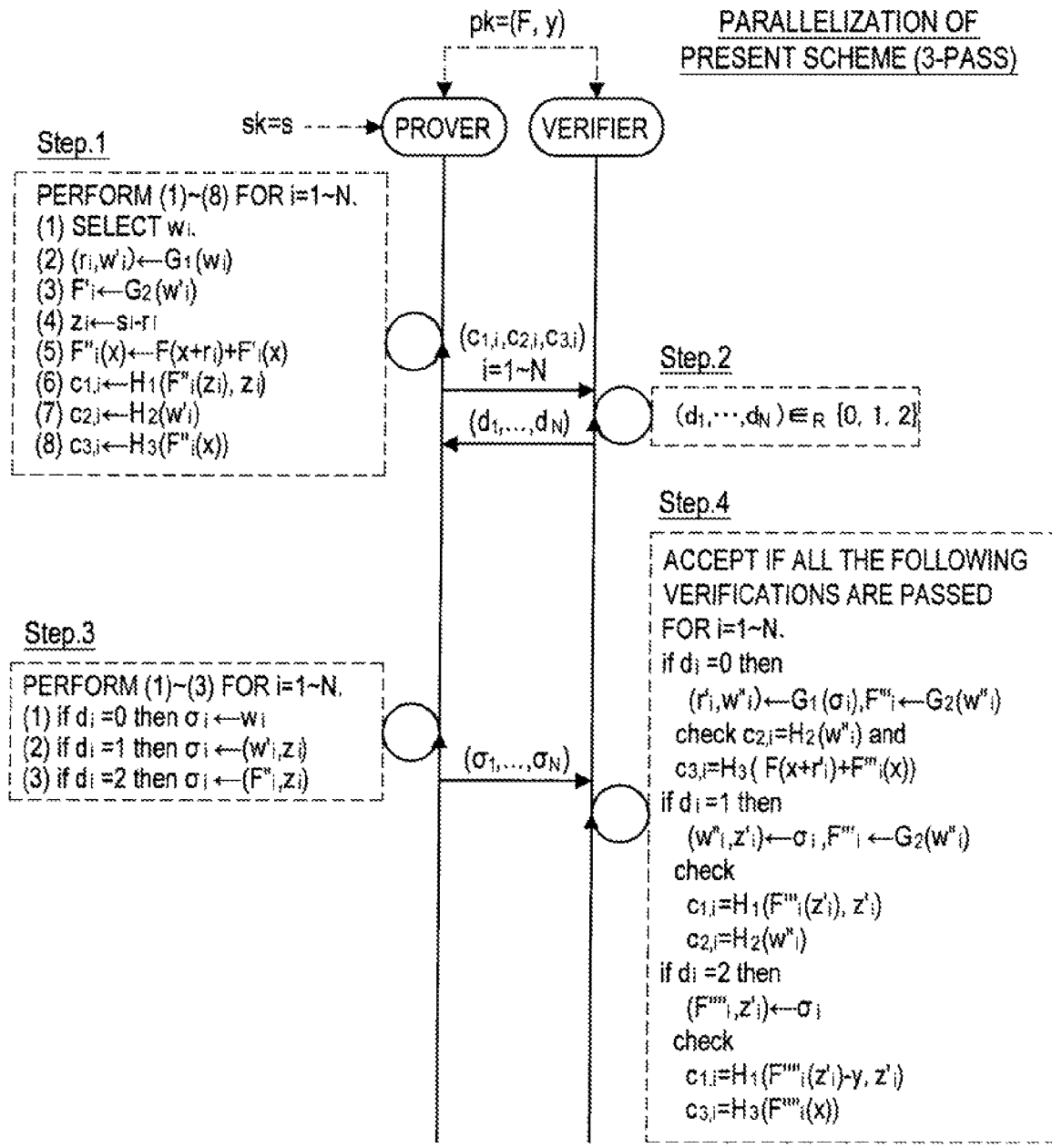
FIG. 6 is an explanatory diagram for describing a parallel algorithm for the public key authentication scheme according to the embodiment.

Now, as has been described, when adopting the interactive protocol according to the present scheme or the extended scheme, the probability of falsification succeeding can be reduced to 2/3 or less. Accordingly, if this interactive protocol is performed twice, the probability of falsification succeeding can be reduced to $(2/3)^2$ or less. In the same manner, if this interactive protocol is performed N times, the probability of falsification succeeding becomes $(2/3)^N$, and if N is a sufficiently large number (for example, N=140), the probability of falsification succeeding is reduced to a negligible level. For example, an algorithm of performing the interactive protocol according to the present scheme N times in parallel is shown in FIG. 6. In the following, the contents of each algorithm performing the interactive protocol N times in parallel will be described with reference to FIG. 6.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Prover Algorithm P, Verifier Algorithm V)

Next, processes by the prover algorithm P and the verifier algorithm V in an interactive protocol will be described with reference to FIG. 6. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (8) below for i=1 to N. (Process 1) The prover algorithm P arbitrarily selects a number $w_i$. (Process 2) The prover algorithm P generates a vector $r_i \in K^n$ and a number $w'_i$ by applying the number $w_i$ to a pseudo random number generator $G_1$. That is, the prover algorithm P calculates $(r_i, w'_i) \leftarrow G_1(w_i)$. (Process 3) The prover algorithm P generates a set of polynomials of n variables $F'_i(x)$ by applying the number $w'_i$ to a pseudo random number generator $G_2$. That is, the prover algorithm P calculates $F'_i \leftarrow G_2(w'_i)$.

Step 1 (Continued):

(Process 4) The prover algorithm P calculates $z_i \leftarrow s - r_i$. This calculation corresponds to an operation of masking the secret key s by the vector $r_i$. (Process 5) The prover algorithm P calculates $F''_i(x) \leftarrow F(x+r_i) + F'_i(x)$. This calculation corresponds to an operation of masking a set of polynomials $F(x+r_i)$ for x by the set of polynomials $F'_i(x)$.

Step 1 (Continued):

(Process 6) The prover algorithm P generates a hash value $c_{1,i}$ of $F''_i(z_i)$ and $z_i$. That is, the prover algorithm P calculates $c_{1,i} \leftarrow H_1(F''_i(z_i), z_i)$. (Process 7) The prover algorithm P generates a hash value $c_{2,i}$ of the number $w'_i$. That is, the prover algorithm P calculates $c_{2,i} \leftarrow H_2(w'_i)$. (Process 8) The prover algorithm P generates a hash value $c_{3,i}$ of the set of polynomials $F''_i$. That is, the prover algorithm P calculates $c_{3,i} \leftarrow H_3(F''_i)$. Additionally, $H_1(\ldots), H_2(\ldots),$ and $H_3(\ldots)$ described are hash functions. Also, the hash values $(c_{1,i}, c_{2,i}, c_{3,i})$ are messages.

After (Process 1) to (Process 8) described above are performed for i=1 to N, the messages $(c_{1,i}, c_{2,i}, c_{3,i})$ (i=1 to N) generated in Step 1 are sent to a verifier.

Step 2:

The verifier algorithm V selects, for each of i=1 to N, a verification pattern to be used from three verification patterns. Then, the verifier algorithm V sends to the prover a demand $d_i \in \{0, 1, 2\}$ (i=1 to N) indicating the selected verification pattern.

Step 3:

The prover algorithm P generates information $\sigma_i$ to be sent back to the verifier in response to the demand $d_i$ received from the verifier. Here, the prover algorithm P performs (Process 1) to (Process 3) below for i=1 to N. (Process 1) If $d_i=0$, the prover algorithm P generates information $\sigma_i = w_i$. (Process 2) If $d_i=1$, the prover algorithm P generates information $\sigma_i = (w'_i, z_i)$. (Process 3) If $d_i=2$, 1, the prover algorithm P generates information $\sigma_i = (F''_i, z_i)$. After decision and processes of (Process 1) to (Process 3) above have been performed, the information $\sigma$(i=1 to N) is sent to the verifier by the prover algorithm P.

Step 4:

The verifier algorithm V performs the following verification process by using the information $\sigma_i$ (i=1 to N) received from the prover. Additionally, the following process is performed for i=1 to N.

If $d_i=0$, the verifier algorithm V calculates $(r'_i, w''_i) \leftarrow G_1(\sigma_i)$. Furthermore, the verifier algorithm V calculates $F'''_i \leftarrow G_2(w''_i)$. Then, the verifier algorithm V verifies whether the equality $c_{2,i}=H_2(w''_i)$ holds true or not. Also, the verifier algorithm V verifies whether the equality $c_{3,i}=H_3(F(x+r'_i)+F'''_i(x))$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(w''_i, z'_i) \leftarrow \sigma_i$. Furthermore, the verifier algorithm V calculates $F'''_i \leftarrow G_2(w'_i)$. Then, the verifier algorithm V verifies whether the equality $c_{1,i}=H_1(F'''_i(z'_i), z'_i)$ holds true or not. Also, the verifier algorithm V verifies whether the equality $c_{2,i}=H_2(w''_i)$ holds true or not. The verifier algorithm V outputs a value 1 indicating authentication success in the case all the verifications have succeeded, and outputs a value 0 indicating authentication failure in the case a failure has occurred in the verification.

If $d_i=2$, the verifier algorithm V calculates $(F''''_i, z'_i) \leftarrow \sigma_i$. Then, the verifier algorithm V verifies whether the equality $c_{1,i}=H_1(F''''_i(z'_i)-y, z'_i)$ holds true or not. Also, the verifier algorithm V verifies whether the equality $c_{3,i}=H_3(F''''_i(x))$ holds true or not. The verifier algorithm V outputs a value 1 indicating authentication success in the case all the verifications have succeeded, and outputs a value 0 indicating authentication failure in the case a failure has occurred in the verification.

In the foregoing, the method of performing, in parallel, the interactive protocol of the present scheme has been described. As described above, by repeatedly performing the interactive protocol of the present scheme, the probability of falsification succeeding can be reduced to a negligible level.

Additionally, after Step 1 described above, instead of transmitting $(c_{1,1}, c_{1,2}, c_{1,3}, \ldots, c_{N,1}, c_{N,2}, c_{N,3})$ to the verifier, their hash values $H(c_{1,1}, c_{1,2}, c_{1,3}, \ldots, c_{N,1}, c_{N,2}, c_{N,3})$ may be collectively transmitted. When adopting this configuration, the messages to be sent in the first pass will be only one hash value, and the amount of communication can be greatly reduced. Moreover, this hash value and a hash value that is not restored from a response to a challenge sent from the prover are to be sent from the prover together with the response. According to this configuration, in the case of parallel repetition of N times, the number of pieces of information to be sent can be reduced by 2N−1.

(Suitable Method of Parameter Setting)

Now, the interactive protocol according to the present embodiment guarantees security against a passive attack. However, in the case of adopting the above method of repeatedly performing this interactive protocol in parallel, in order to guarantee that security against an active attack is absolutely guaranteed, a condition described as below has to be satisfied.

The interactive protocol described above is a scheme where a prover proves to a verifier that "the prover knows the s that satisfies y=F(s) for y" by using one to key pair (public key y, secret key s). Accordingly, if interaction that will be accepted by verification is performed, a possibility is not denied that information that "the prover used the s at the time of interaction" will become known to the verifier. Furthermore, collision resistance is not guaranteed for the above F.

Thus, it is difficult to prove with regard to a case of repeatedly performing the interactive protocol described above in parallel, with no conditions, that security against an active attack is absolutely guaranteed.

Accordingly, the inventors of the present application have investigated a method of preventing information that "the prover used the s at the time of interaction" from being made known to the verifier even when interaction that will be accepted by verification is performed. Then, the inventors of the present application have devised a method that enables, even in the case of repeatedly performing the interactive protocol described above in parallel, to guarantee security against an active attack. This method is for setting the number m of multi-order polynomials of n variables $f_1, \ldots, f_m$ used as a public key to a value sufficiently smaller than the number n of variables. For example, m and n are set such that $2^{m-n} \ll 1$ (for example, $2^{-80} \ll 1$ when n=160 and m=80).

With the scheme as described above that takes the difficulty of solving a multi-order multivariate equation as a basis for security, even if a secret key $s_1$ and a public key pk corresponding to such secret key are given, it is difficult to generate another secret key $s_2$ corresponding to the public key pk. Thus, if it is guaranteed that there are two or more secret keys s for a public key pk, it is possible to prevent information that "the prover used the s at the time of interaction" from being made known to the verifier even when interaction that will be accepted by verification is performed. That is, if this guarantee holds true, security against an active attack can be guaranteed even in a case of repeatedly performing the interactive protocol in parallel.

Figure 28:
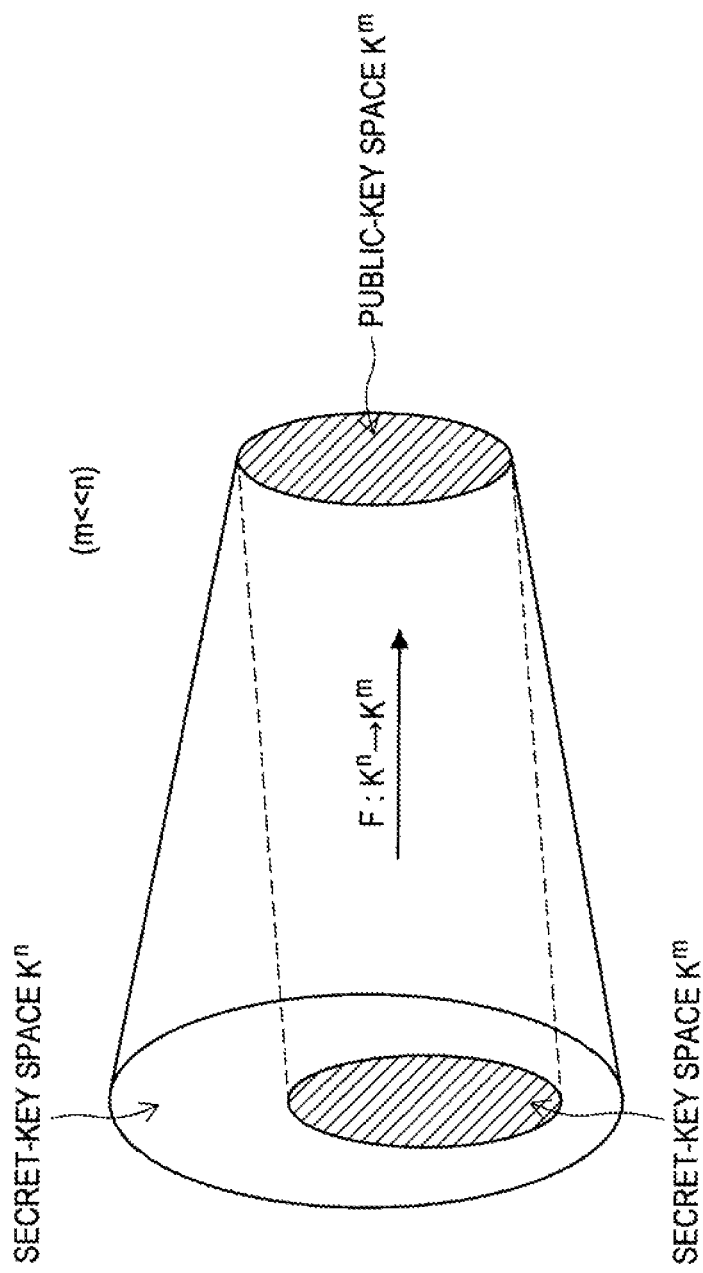
FIG. 28 is an explanatory diagram for describing a suitable method of setting a parameter, the method being used by the public key authentication schemes according to the first and second embodiments of the present invention, and an effect thereof.

Considering, with reference to FIG. 28, function $F: K^n \to K^m$ formed from m multi-order polynomials of n variables (where n>m), the number of elements of a domain not having a second preimage is only $|K|^m - 1$ at the maximum. Accordingly, if $|K|^{m-n}$ is made sufficiently small, a possibility of an element of a domain not having a second preimage being selected can be reduced to a negligible level. That is, if the number m of multi-order polynomials of n variables $f_1, \ldots, f_m$ is set to a value sufficiently smaller than the number n of variables, existence of two or more secret keys s for a public key pk can be guaranteed. As a result, also in the case where interaction that will be accepted by verification is performed, it is possible to prevent the information that "the prover used the s at the time of interaction" from being made known to the verifier, and security against an active attack is guaranteed even in the case of repeatedly performing the interactive protocol in parallel.

As described above, by adopting the method of setting the number m of multi-order polynomials of n variables $f_1, \ldots, f_m$ to a value smaller than the number n of variables (n>m: preferably, $2^{m-n} \ll 1$), security for the case of repeatedly performing the interactive protocol in parallel can be improved.

[2-4: Non-Interactive Algorithm]

Figure 7:
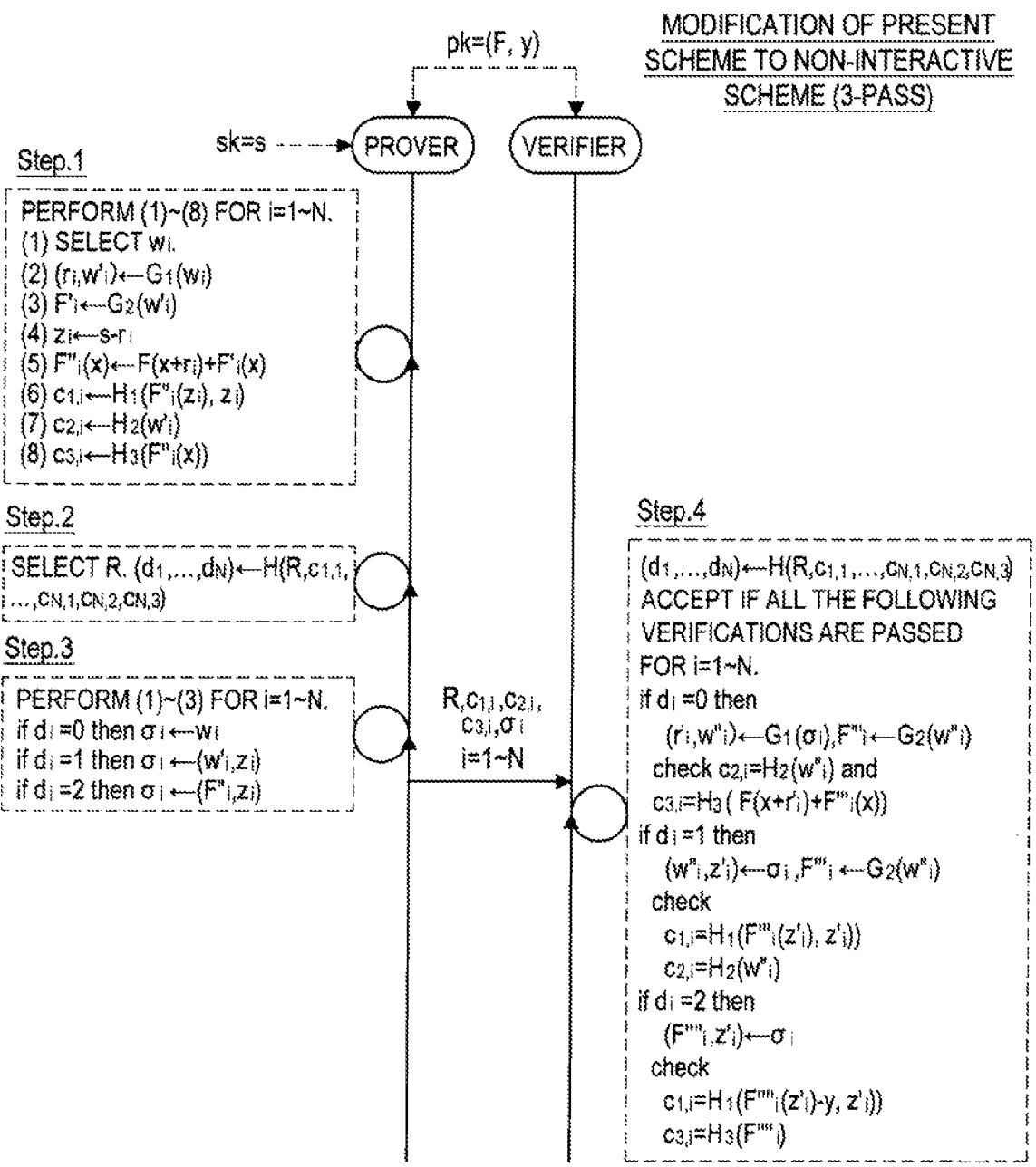
FIG. 7 is an explanatory diagram for describing a non-interactive algorithm for the public key authentication scheme according to the embodiment.

In the foregoing, the 3-pass public key authentication scheme has been described. However, since, according to the present scheme, information sent from the verifier to the prover in the second pass is only the demand d (in reality, a mere random number is used in many cases) indicating the verification pattern, modifying to a 1-pass public key authentication scheme (hereinafter, non-interactive scheme) is possible. Additionally, the contents of each algorithm according to the non-interactive scheme are shown in FIG. 7. In the following, the contents of each algorithm according to the non-interactive scheme will be described with reference to FIG. 7.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Prover Algorithm P. Verifier Algorithm V)

Next, processes by the prover algorithm P and the verifier algorithm V in an interactive protocol will be described with reference to FIG. 7. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (8) below for i=1 to N. (Process 1) The prover algorithm P arbitrarily selects a number $w_i$. (Process 2) The prover algorithm P generates a vector $r_i \in K^n$ and a number $w'_i$ by applying the number $w_i$ to a pseudo random number generator $G_1$. That is, the prover algorithm P calculates $(r_i, w'_i) \leftarrow G_1(w_i)$. (Process 3) The prover algorithm P generates a set of polynomials of n variables $F'_i(x)$ by applying the number $w'_i$ to a pseudo random number generator $G_2$. That is, the prover algorithm P calculates $F'_i \leftarrow G_2(w'_i)$.

Step 1 (Continued):

(Process 4) The prover algorithm P calculates $z_i \leftarrow s-r_i$. This calculation corresponds to an operation of masking the secret key s by the vector $r_i$. (Process 5) The prover algorithm P calculates $F''_i(x) \leftarrow F(x+r_i)+F'_i(x)$. This calculation corresponds to an operation of masking a set of polynomials $F(x+r_i)$ for x by the set of polynomials $F'_i(x)$.

Step 1 (Continued):

(Process 6) The prover algorithm P generates a hash value $c_{1,i}$ of $F''_i(z_i)$ and $z_i$. That is, the prover algorithm P calculates $c_{1,i} \leftarrow H_1(F''_i(z_i), z_i)$. (Process 7) The prover algorithm P generates a hash value $c_{2,i}$ of the number $w'_i$. That is, the prover algorithm P calculates $c_{2,i} \leftarrow H_2(w'_i)$. (Process 8) The prover algorithm P generates a hash value $c_{3,i}$ of the set of polynomials $F''_i$. That is, the prover algorithm P calculates $c_{3,i} \leftarrow H_3(F''_i)$. Additionally, $H_1(\ldots)$, $H_2(\ldots)$, and $H_3(\ldots)$ described are hash functions. Also, the hash values $(c_{1,i}, c_{2,i}, c_{3,i})$ are messages.

Step 2:

Next, the prover algorithm P selects a random number R. Then, the prover algorithm P generates, for i=1 to N, $d=(d_1, \ldots, d_N)$ by applying the random number R and the messages $(c_{1,i}, c_{2,i}, c_{3,i})$ generated in Step 1 to the hash function H.

Step 3:

Next, the prover algorithm P generates information $\sigma_i$ to be sent to the verifier according to the generated $d_i$. Here, the prover algorithm P performs (Process 1) to (Process 3) below for i=1 to N. (Process 1) If $d_i=0$, the prover algorithm P generates information $\sigma_i=w_i$. (Process 2) If $d_i=1$, the prover an algorithm P generates information $\sigma_i=(w'_i, z_i)$. (Process 3) If $d_i=2$, the prover algorithm P generates information $\sigma_i=(F''_i, z_i)$. After decision and processes of (Process 1) to (Process 3) above have been performed, the random number R, the messages $(c_{1,i}, c_{2,i}, c_{3,i})$, and the information $\sigma_i$ (i=1 to N) are sent to the verifier by the prover algorithm P.

Step 4:

The verifier algorithm V first generates $d=(d_1, \ldots, d_N)$ by applying the random number R, the messages and the information $\sigma_i$ (i=1 to N) received from the prover to the hash function H. Then, the verifier algorithm V performs the following verification process by using the information $\sigma_i$ (i=1 to N). Additionally, the following process is performed for i=1 to N.

If $d_i=0$, the verifier algorithm V calculates $(r'_i, w''_i) \leftarrow G_1(\sigma_i)$. Furthermore, the verifier algorithm V calculates $F'''_i \leftarrow G_2(w''_i)$. Then, the verifier algorithm V verifies whether the equality $c_{2,i}=H_2(w''_i)$ holds true or not. Also, the verifier algorithm V verifies whether the equality $c_{3,i}=H_3(F(x+r'_i)+F'''_i(x))$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(w''_i, z'_i) \leftarrow \sigma_i$. Furthermore, the verifier algorithm V calculates $F'''_i \leftarrow G_2(w''_i)$. Then, the verifier algorithm V verifies whether the equality $c_{1,i}=H_1(F'''_i(z'_i), z'_i)$ holds true or not. Also, the verifier algorithm V verifies whether the equality $c_{2,i}=H_2(w''_i)$ holds true or not. The verifier algorithm V outputs a value 1 indicating authentication success in the case all the verifications have succeeded, and outputs a value 0 indicating authentication failure in the case a failure has occurred in the verification.

If $d_i=2$, the verifier algorithm V calculates $(F''''_i, z'_i) \leftarrow \sigma_i$. Then, the verifier algorithm V verifies whether the equality $c_{1,i}=H_1(F''''_i(z'_i)-y, z'_i)$ holds true or not. Also, the verifier algorithm V verifies whether the equality $c_{3,i}=H_3(F''''_i)$ holds true or not. The verifier algorithm V outputs a value 1 indicating authentication success in the case all the verifications have succeeded, and outputs a value 0 indicating authentication failure in the case a failure has occurred in the verification.

In the foregoing, the contents of each algorithm according to the non-interactive scheme have been described. As described above, according to the non-interactive scheme, instead of the verifier sending a random number d to the prover to select a verification pattern, the prover algorithm P generates the d by using the messages $(c_{1,i}, c_{2,i}, c_{3,i})$. If an ideal hash function H is assumed, a hash value d will act randomly, and thus a hash value d that is convenient for the prover will not occur. Accordingly, even when the modification as described above is performed, sufficient security is ensured. Additionally, such modification can likewise be applied to the extended scheme and the like.

[2-5: Modification into Digital Signature Scheme]

Here, a method of modifying the present scheme to the digital signature scheme will be described. Additionally, for the sake of simplicity, a method of modifying the non-interactive scheme to the digital signature scheme will be described here. It can be understood that, when the prover and the verifier of the non-interactive scheme described above correspond to the signer and the verifier of the digital signature scheme, there is a similarity to the model of the digital signature scheme in that the prover alone can convince the verifier. With this concept in mind, the algorithm structure of the digital signature scheme based on the non-interactive scheme will be described in detail.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as $F(x)$.

(Signature Generation Algorithm Sig)

The signature generation algorithm Sig performs (Process 1) to (Process 15) below for i=1 to N. Additionally, it is assumed that a signature key $sk=(s_1, \ldots, S_N)$ and a document M are inputted in the signature generation algorithm Sig.

(Process 1) The signature generation algorithm Sig arbitrarily selects a number $w_i$. (Process 2) The signature generation algorithm Sig generates a vector $r_i \in K^n$ and a number $w'_i$ by applying the number $w_i$ to a pseudo random number generator $G_1$. That is, the signature generation algorithm Sig calculates $(r_i, w'_i) \leftarrow G_1(w_i)$. (Process 3) The signature generation algorithm Sig generates m polynomials of n variables $F'_i(x)=(f'_{1,i}(x), \ldots, f'_{m,i}(x))$ by applying the number $w'_i$ to a pseudo random number generator $G_2$. That is, the signature generation algorithm Sig calculates $F'_i \leftarrow G_2(w'_i)$.

(Process 4) The signature generation algorithm Sig calculates $z_i \leftarrow s_i - r_i$. This calculation corresponds to an operation of masking the secret key $s_i$ by the vector $r_i$. (Process 5) The signature generation algorithm Sig calculates $F''_i(x) \leftarrow F(x+r_i) + F'_i(x)$. This calculation corresponds to an operation of masking a set of polynomials $F(x+r_i)$ for x by the set of polynomials $F'_i(x)$.

(Process 6) The signature generation algorithm Sig generates a hash value $c_{1,i}$ of $F''_i(z_i)$ and $z_i$. That is, the signature generation algorithm Sig calculates $c_{1,i} \leftarrow H_1(F''_i(z_i), z_i)$. (Process 7) The signature generation algorithm Sig generates a hash value $c_{2,i}$ of the number $w'_i$. That is, the signature generation algorithm Sig calculates $c_{2,i} \leftarrow H_2(w'_i)$. (Process 8) The signature generation algorithm Sig generates a hash value $c_{3,i}$ of the set of polynomials $F''_i$. That is, the signature generation algorithm Sig calculates $c_{3,i} \leftarrow H_3(F''_i)$. Additionally, $H_1(\ldots)$, $H_2(\ldots)$, and $H_3(\ldots)$ described are hash functions.

(Process 9) The signature generation algorithm Sig selects a random number R. (Process 10) The signature generation algorithm Sig generates, for i=1 to N, $d=(d_1, \ldots, d_N)$ by applying the document M, the random number R and the hash values $(c_{1,i}, c_{2,i}, c_{3,i})$ to the hash function H. That is, the signature generation algorithm Sig calculates $d=(d_1, \ldots, d_N) \leftarrow H(R, M, c_{1,1}, \ldots, c_{3,N})$. (Process 11) The signature generation algorithm Sig generates informational $\sigma_1$ according to the generated $d_i$.

Then, the signature generation algorithm Sig performs (Process 12) to (Process 14) below for i=1 to N. (Process 12) If $d_i=0$, the signature generation algorithm Sig generates information $\sigma_i=w_i$. (Process 13) If $d_i=1$, the signature generation algorithm Sig generates information $\sigma_i=(w'_i, z_i)$. (Process 14) if $d_i=2$, the signature generation algorithm Sig generates information $\sigma_i=(F''_i, z_i)$.

(Process 15) After decision and processes of (Process 12) to (Process 14) above have been performed for i=1 to N, the signature generation algorithm Sig outputs a digital signature $\sigma=(R, c_{1,i}, c_{2,i}, c_{3,i}, \sigma_1, \ldots, \sigma_N)$ including the random number R, the messages $(c_{1,i}, c_{2,i}, c_{3,i})$ and the information $\sigma_i$ (i=1 to N).

(Signature Verification Algorithm Ver)

If all the following verifications are passed for i=1 to N, the signature verification algorithm Ver accepts the digital signature $\sigma$, and if even one verification is not passed, the signature verification algorithm Ver denies the digital signature $\sigma$. Additionally, it is assumed that the digital signature $\sigma$ and the document M are inputted in the signature verification algorithm Ver. First, the signature verification algorithm Ver calculates $d=(d_1, \ldots, d_N) \leftarrow H(R, M, c_{1,1}, \ldots, c_{3,N})$. Next, the signature verification algorithm Ver performs (Verification 1) to (Verification 3) below for i=1 to N.

(Verification 1) If $d_i=0$, the signature verification algorithm Ver calculates $(r'_i, w''_i) \leftarrow G_1(\sigma_i)$. Next, the signature verification algorithm Ver calculates $F'''_i \leftarrow G_2(w''_i)$. Then, the signature verification algorithm Ver verifies whether the equality $c_{2,i}=H_2(w''_i)$ holds true or not. Also, the signature verification algorithm Ver verifies whether the equality $c_{3,i}=H_3(F(x+r'_i)+F'''_i(x))$ holds true or not. The signature verification algorithm Ver outputs a value 1 indicating acceptance of the digital signature $\sigma$ in the case all the verifications have succeeded, and outputs a value 0 indicating denial of the digital signature $\sigma$ in the case a failure has occurred in the verification.

(Verification 2) If $d_i=1$, the signature verification algorithm Ver calculates $(w''_i, z'_i) \leftarrow \sigma_i$. Next, the signature verification algorithm Ver calculates $F'''_i \leftarrow G_2(w''_i)$. Then, the signature verification algorithm Ver verifies whether the equality $c_{1,i}=H_1(F'''_i(z'_i), z'_i)$ holds true or not. Also, the signature verification algorithm Ver verifies whether the equality $c_{2,i}=H_2(w''_i)$ holds true or not. The signature verification algorithm Ver outputs a value 1 indicating acceptance of the digital signature $\sigma$ in the case all the verifications have succeeded, and outputs a value 0 indicating denial of the digital signature $\sigma$ in the case a failure has occurred in the verification.

(Verification 3) If $d_i=2$, the signature verification algorithm Ver calculates $(F''''_i, z'_i) \leftarrow \sigma_i$. Then, the signature verification algorithm Ver verifies whether the equality $c_{1,i}=H_1(F''''_i(z'_i)-y, z'_i)$ holds true or not. Also, the signature verification algorithm Ver verifies whether the equality $c_{3,i}=H_3(F''''_i)$ holds true or not. The signature verification algorithm Ver outputs a value 1 indicating acceptance of the digital signature $\sigma$ in the case all the verifications have succeeded, and outputs a value 0 indicating denial of the digital signature $\sigma$ in the case a failure has occurred in the verification.

In the foregoing, each algorithm structure of the digital signature scheme no based on the present scheme has been described. A digital signature scheme based on the extended scheme described above can likewise be structured.

[2-6: Concrete Example]

Figure 8:
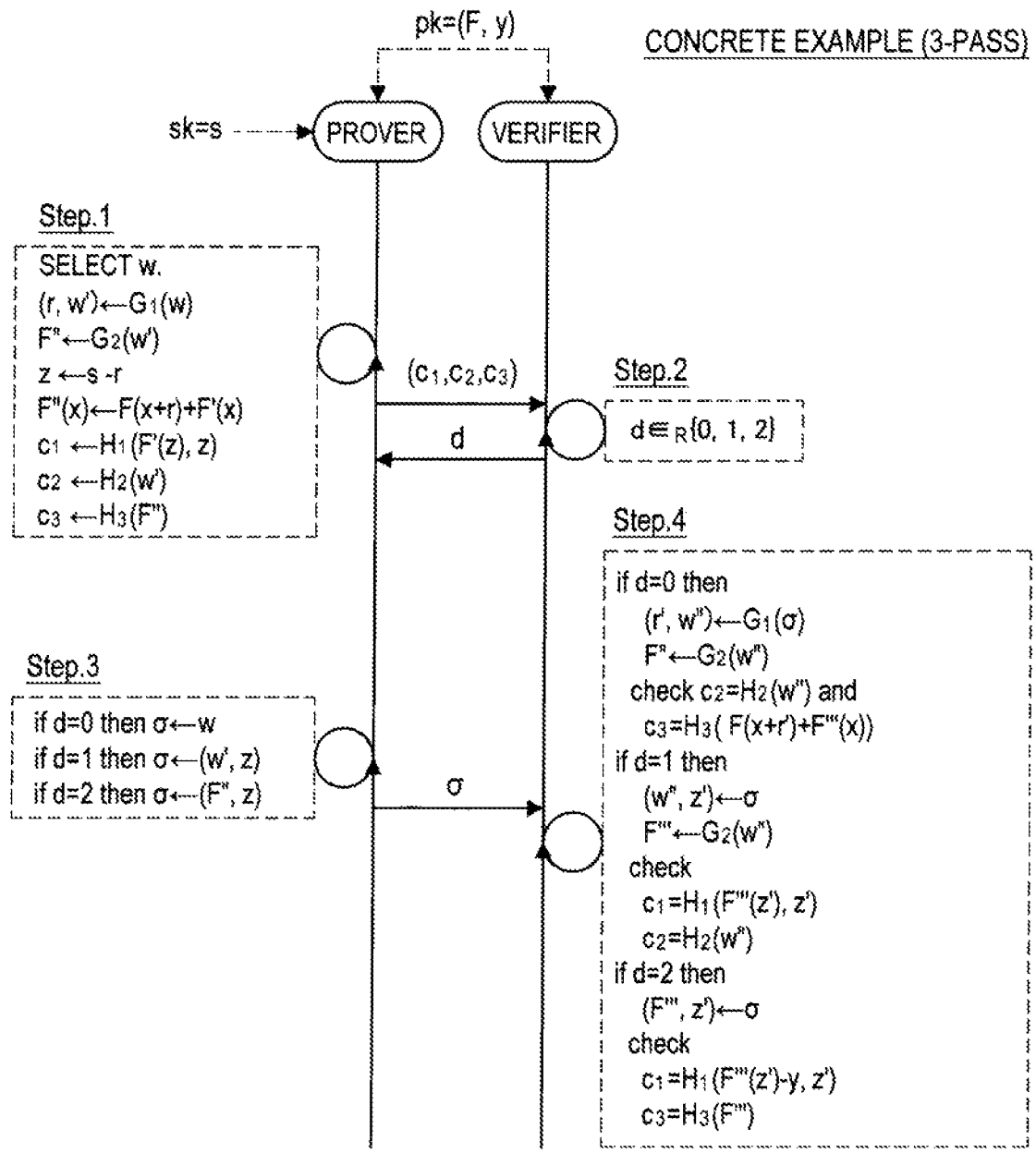
FIG. 8 is an explanatory diagram for describing a concrete algorithm for the public key authentication scheme according to the embodiment.

Next, a concrete algorithm structure that is presumable when performing the present scheme will be described with reference to FIG. 8. FIG. 8 is an explanatory diagram for describing a concrete example of the present scheme.

(Key Generation Algorithm Gen)

The key generation algorithm Gen generates m second-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m second-order polynomials of n variables $(f_1(x), \ldots, f_m(x))$ will be expressed as F(x). Moreover, the second-order polynomial of n variables $f_i(x_1, \ldots, x_n)$ is represented as formula (10) below.

[Expression 8]

$$f_i(x_1, \ldots, x_n) = \sum_{j,k} a_{i,j,k} x_j x_k + \sum_j b_{i,j} x_j + c_i \qquad (10)$$

(Prover Algorithm P, Verifier Algorithm V)

Next, processes by the prover algorithm P and the verifier algorithm V in an interactive protocol will be described with reference to FIG. 8. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates a vector r∈$K^n$ and a number w' by applying the number w to a pseudo random number generator $G_1$. That is, the prover algorithm P calculates (r, w')←$G_1$(w). Next, the prover algorithm P generates a set of m first-order polynomials $f'_1(x_1, \ldots, x_n), \ldots, f'_m(x_1, \ldots, x_n)$ by applying the number w' to a pseudo random number generator $G_2$. That is, the prover algorithm P calculates $(f'_1, \ldots, f'_m)$←$G_2$(w'). Additionally, a first-order polynomial $f'_i(x_1, \ldots, x_n)$ is represented as formula (11) below. Also, the set of m first-order polynomials $(f'_1(x), \ldots, f'_m(x))$ will be expressed as F'(x).

[Expression 9]

$$f'_i(x_1, \ldots, x_n) = \sum_j b'_{i,j} x_j + c'_i \qquad (11)$$

Step 1 (Continued):

Next, the prover algorithm P calculates z←s−r. This calculation corresponds to an operation of masking the secret key s by the vector r. Furthermore, the prover algorithm P calculates F"(x)←F(x+r)+F'(x). This calculation corresponds to an operation of masking a polynomial F(x+r) for x by the polynomial F'(x). It should be noted that, in the F(x+r), information related to r appears only in the first order term of x, and thus all the information related to r are masked by F'(x).

Step 1 (Continued):

Next, the prover algorithm P generates a hash value $c_1$ of F'(z) and z. That is, the prover algorithm P calculates $c_1$←$H_1$(F'(z), z). Furthermore, the prover algorithm P generates a hash value $c_2$ of the number w'. That is, the prover algorithm P calculates $c_2$←$H_2$(w'). Furthermore, the prover algorithm P generates a hash value $c_3$ of the polynomial F". That is, the prover algorithm P calculates $c_3$←$H_3$(F"). Additionally. $H_1(\ldots)$, $H_2(\ldots)$, and $H_3(\ldots)$ described are hash functions. Also, the hash values ($c_1$, $c_2$, $c_s$) are messages.

The messages ($c_1$, $c_2$, $c_3$) generated in Step 1 are sent to a verifier.

Step 2:

The verifier algorithm V selects a verification pattern to be used from three verification patterns. Then, the verifier algorithm V sends to the prover a demand d∈{0, 1, 2} indicating the selected verification pattern.

Step 3:

The prover algorithm P generates information σ to be sent back to the verifier in response to the demand d received from the verifier. If d=0, the prover algorithm P generates information σ=w. Also, if d=1, the prover algorithm P generates information σ=(w', 4. Furthermore, if d=2, the prover algorithm P generates information σ=(F", 4. The information σ generated in this manner is sent to the verifier by the prover algorithm P.

Step 4:

The verifier algorithm V performs the following verification process by using the information σ received from the prover.

If d=0, the verifier algorithm V calculates (r', w")←$G_1$(σ). Furthermore, the verifier algorithm V calculates f'"←$G_2$(w"). Then, the verifier algorithm V verifies whether the equality $c_2$=$H_2$(w") holds true or not. Also, the verifier algorithm V verifies whether the equality $c_3$=$H_3$(F(x+r')+F'"(x)) holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates (w", z')←σ. Furthermore, the verifier algorithm V calculates F'"←$G_2$(w"). Then, the verifier algorithm V verifies whether the equality $c_1$=$H_1$(F'"(z'), z') holds true or not. Also, the verifier algorithm V verifies whether the equality $c_2$=$H_2$(w") holds true or not. The verifier algorithm V outputs a value 1 indicating authentication success in the case all the verifications have succeeded, and outputs a value 0 indicating authentication failure in the case a failure has occurred in the verification.

If d=2, the verifier algorithm V calculates (F'", z')←σ. Then, the verifier algorithm V verifies whether the equality $c_1$=$H_1$(F'"(z')−y, z') holds true or not. Also, the verifier algorithm V verifies whether the equality $c_3$=$H_3$(F'") holds true or not. The verifier algorithm V outputs a value 1 indicating authentication success in the case all the verifications have succeeded, and outputs a value 0 indicating authentication failure in the case a failure has occurred in the verification.

In the foregoing, a concrete algorithm structure that is presumable when performing the present scheme has been described.

[2-7: Efficient Algorithm]

A set of m second-order polynomials of n variables $(f_1(x), \ldots, f_m(x))$ can be represented as formula (12) below. Moreover, $x=(x_1, \ldots, x_n)$ is a vector indicating n variables. Also, $A_1, \ldots, A_m$ are an n×n matrix. Also, $b_1, \ldots, b_m$ are an n×1 vector. Furthermore, c is an m×1 vector.

[Expression 10]

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} + c \qquad (12)$$

Using this representation, a set of polynomials F can be represented as formula (13) and formula (14) below. That this representation holds can be easily confirmed from formula (15) below.

[Expression 11]

$$F(x_1 + x_2) = F(x_1) + F(x_2) + F_b(x_1, x_2) - c \qquad (13)$$

$$F_b(x_1, x_2) = \begin{pmatrix} x_2^T(A_1^T + A_1)x_1 \\ \vdots \\ x_2^T(A_m^T + A_m)x_1 \end{pmatrix} \qquad (14)$$

$$\begin{aligned} f_l(x_1 + x_2) &= (x_1 + x_2)^T A_l(x_1 + x_2) + b_l^T(x_1 + x_2) + c_l \qquad (15) \\ &= x_1^T A_l x_1 + x_1^T A_l x_2 + x_2^T A_l x_1 + x_2^T A_l x_2 + \\ &\quad b_l^T x_1 + b_l^T x_2 + c_l \\ &= f_l(x_1) + f_l(x_2) - c_l + x_1^T A_l x_2 + x_2^T A_l x_1 \\ &= f_l(x_1) + f_l(x_2) - c_l + x_1^T (A_l^T)^T x_2 + x_2^T A_l x_1 \\ &= f_l(x_1) + f_l(x_2) - c_l + (A_l^T x_1)^T x_2 + x_2^T A_l x_1 \\ &= f_l(x_1) + f_l(x_2) - c_l + x_2^T (A_l^T x_1) + x_2^T A_l x_1 \\ &= f_l(x_1) + x_2^T (A_l^T + A_l)x_1 + f_l(x_2) - c_l \end{aligned}$$

When dividing $F(x_1+x_2)$ into three parts, i.e. a part dependent on $x_1$, a part dependent on $x_2$, and a part dependent on both $x_1$ and $x_2$, in this manner, the part $F_b(x_1,x_2)$ dependent on both $x_1$ and $x_2$ will be a bilinear map with respect to $x_1$ and $x_2$. When using this property, an efficient scheme can be realised.

For example, let us consider modification, in the present scheme, of a set of polynomials $F'(x)$ used for masking a set of polynomials $F(x+r)$ related to x to $F'(x)=F_b(x, t)+e$ by using vectors $t \in K^n$ and $e \in K^m$. When such modification is performed, the sum of the sets of polynomials $F(x+r)$ and $F'(x)$ related to x can be represented as formula (16) below. Here, when $t'=r+t$ and $e'=F(r)-c+e$, a polynomial $F'''(x)$ related to x can be represented by vectors $t' \in K^n$ and $e' \in K^m$. For these reasons, by setting $F'(x)=F_b(x, t)-e$, $F'$ and $F''$ can be represented by a vector on $K^n$ and a vector on $K^m$, and the size of data necessary for communication can be greatly reduced.

[Expression 12]

$$\begin{aligned} F(x + r) + F'(x) &= F(x) + F(r) + F_b(x, r) - c + F_b(x, t) + e \qquad (16) \\ &= F(x) + F_b(x, r + t) + F(r) - c + e \end{aligned}$$

Furthermore, no information related to r is leaked from $F'''$ (or $F'$) by the above modification. For example, even if $e'$ and $t'$ (or e and t) are given, it is not possible to know any information related to r as long as e and t (or $e'$ and $t'$) are not known. Accordingly, the present scheme modified in the above manner is a public key authentication scheme where the zero knowledge is guaranteed. In the following, the efficient algorithm according to the present scheme modified in the above manner will be described in greater detail with reference to FIGS. 9 to 11. Additionally, the structure of the key generation algorithm Gen is substantially the same as that of the present scheme described above, and detailed explanation thereof will be omitted.

Step 1:

First, the prover algorithm P arbitrarily selects a number w. Then, the prover algorithm P generates a vector $r \in K^n$ and a number $w'$ by applying the number w to a pseudo random number generator $G_1$. That is, the prover algorithm P calculates $(r, w') \leftarrow G_1(w)$. Next, the prover algorithm P generates two vectors $t \in K^n$ and $e \in K^m$ by applying the number $w'$ to a pseudo random number generator G. That is, the prover algorithm P calculates $(t, e) \leftarrow G_2(w')$. Next, the prover algorithm P calculates $z \leftarrow s-r$. This calculation corresponds to an operation of masking a secret key s by the vector r. Furthermore, the prover algorithm P calculates $t' \leftarrow r+t$. Next, the prover algorithm P calculates $e' \leftarrow F(r)-c+e$.

Step 1 (Continued):

Next, the prover algorithm P calculates $F_b(z, t)$ based on formula (16) above, and generates a hash value $c_1$ of $F_b(z, t)+e$ and z. That is, the prover algorithm P calculates $c_1 \leftarrow H_1(F_b(z, t)+e, z)$. Also, the prover algorithm P generates a hash value $c_2$ of the number $w'$. That is, the prover algorithm P calculates $c_2 \leftarrow H_2(w')$. Furthermore, the prover algorithm P generates a hash value $c_3$ of two vectors $t'$ and $e'$. That is, the prover algorithm P calculates $c_3 \leftarrow H_3(t', e')$. Additionally, $H_1(\ldots)$, $H_2(\ldots)$, and $H_3(\ldots)$ described are hash functions. Also, the hash values $(c_1, C_2, c_3)$ are messages.

The messages $(c_1, c_2, c_3)$ generated in Step 1 are sent to a verifier.

Step 2:

The verifier algorithm V selects a verification pattern to be used from three verification patterns. Then, the verifier algorithm V sends to the prover a demand $d \in \{0, 1, 2\}$ indicating the selected verification pattern.

Step 3:

The prover algorithm P generates information σ to be sent back to the verifier in response to the demand d received from the verifier. IF d=0, the prover algorithm P generates information σ=w. Also, if d=1, the prover algorithm P generates information σ=($w'$, z). Furthermore, if d=2, the prover algorithm P generates information σ=($t'$, $e'$, z). The information σ generated in this manner is sent to the verifier by the prover algorithm P.

Step 4:

The verifier algorithm V performs the following verification process by using the information σ received from the prover.

If d=0, the verifier algorithm V calculates $(r', w'') \leftarrow G_1(\sigma)$. Furthermore, the verifier algorithm V calculates $(t'', e'') \leftarrow G_2(w'')$. Then, the verifier algorithm V verifies whether the equality $c_2=H_2(w'')$ holds true or not. Also, the verifier algorithm V verifies whether the equality $c_3=H_3(r'+t'', F(r')-c+e'')$ holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates $(w'', z') \leftarrow \sigma$. Furthermore, the verifier algorithm V calculates $(t'', e'') \leftarrow G_2(w'')$. Then, the verifier algorithm V verifies whether the equality $c_i=H_1(F_b(z', t'')+e'', z')$ holds true or not. Also, the verifier algorithm V verifies whether the equality $c_2=H_2(w'')$ holds true or not. The verifier algorithm V outputs a value 1 indicating authentication success in the case all the verifications have succeeded, and outputs a value 0 indicating authentication failure in the case a failure has occurred in the verification.

If d=2, the verifier algorithm V calculates $(V''', e''', z') \leftarrow \sigma$. Then, the verifier algorithm V verifies whether the equality $c_1=H_1(F(z')+F_b(z', t''')+e'''-y, z')$ holds true or not. Also, the verifier algorithm V verifies whether the equality $c_3\ H_3(t''', e''')$ holds true or not. The verifier algorithm V outputs a value 1 indicating authentication success in the case all the verifications have succeeded, and outputs a value 0 indicating authentication failure in the case a failure has occurred in the verification.

In the foregoing, an efficient algorithm of the present scheme has been described. By using this efficient algorithm, the size of data necessary for communication can be greatly reduced. Also, since calculation of substituting x+r into the polynomial F and reorganising the polynomial F in relation to x (calculation of F(x+r)) becomes unnecessary in the interactive protocol, the calculation efficiency is increased.

(Modification of Efficient Algorithm)

Figure 9:
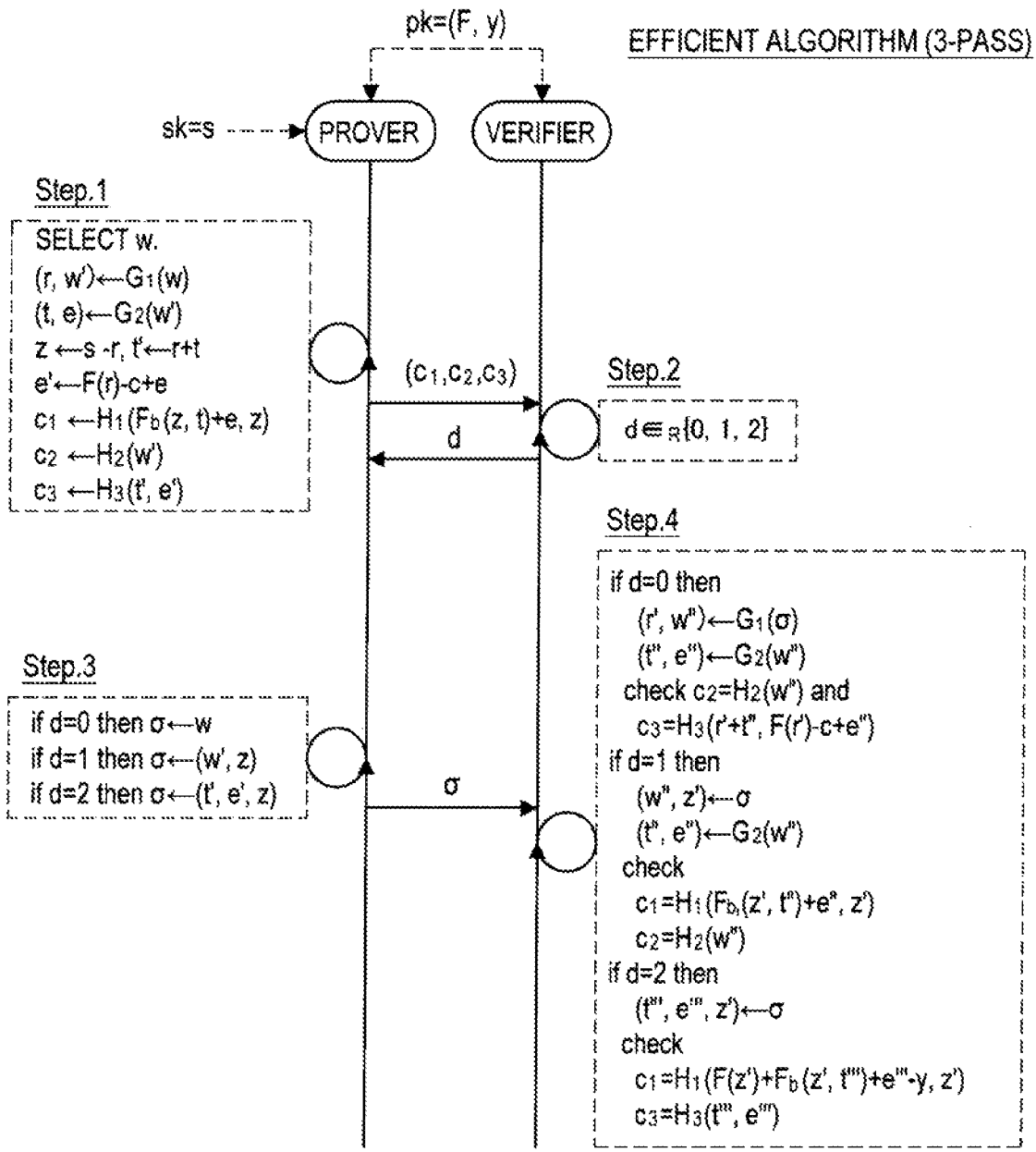
FIG. 9 is an explanatory diagram for describing an efficient algorithm for the public key authentication scheme according to the embodiment.
Figure 10:
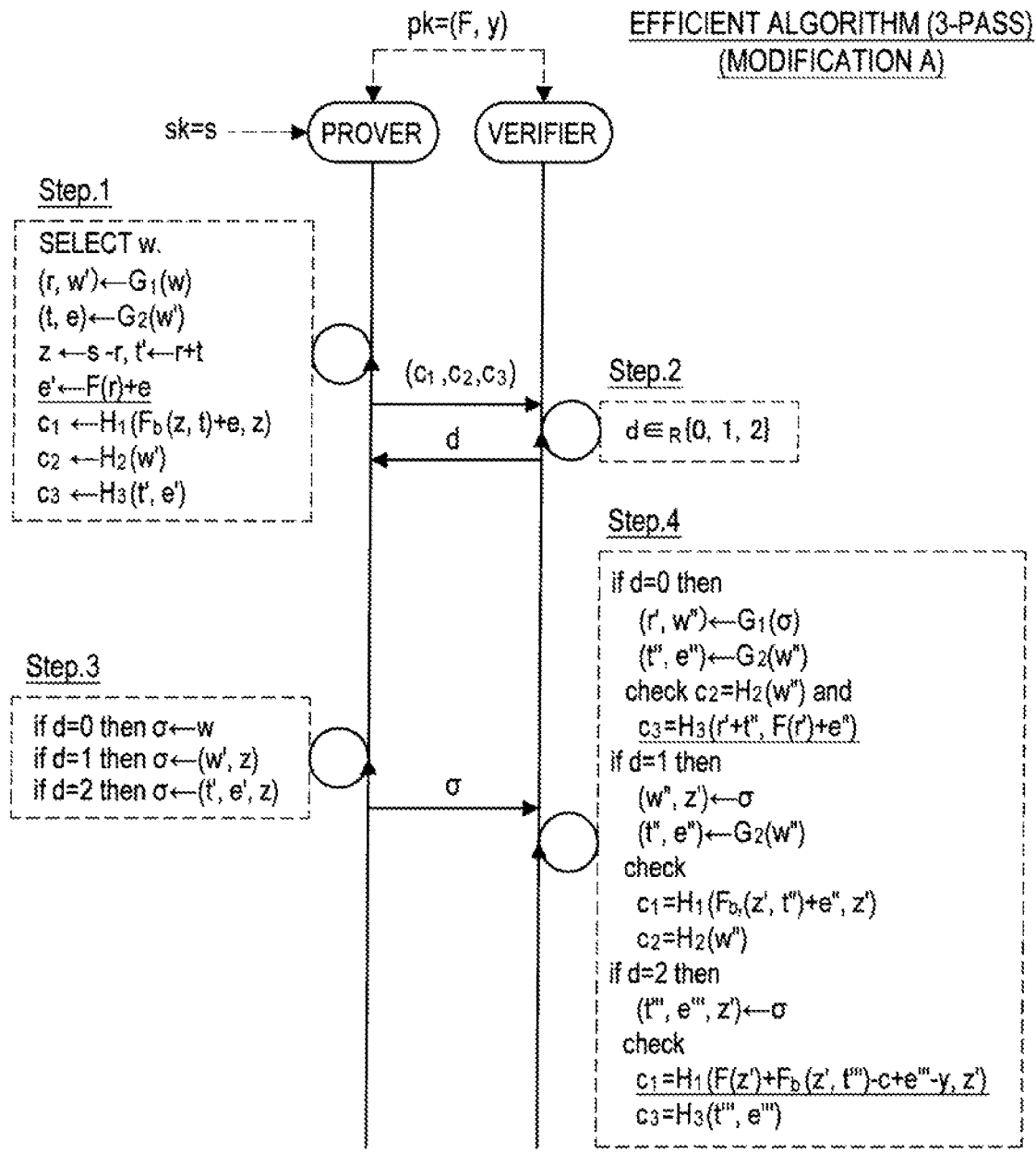
FIG. 10 is an explanatory diagram for describing an efficient algorithm (modification A) for the public key authentication scheme according to the embodiment.
Figure 11:
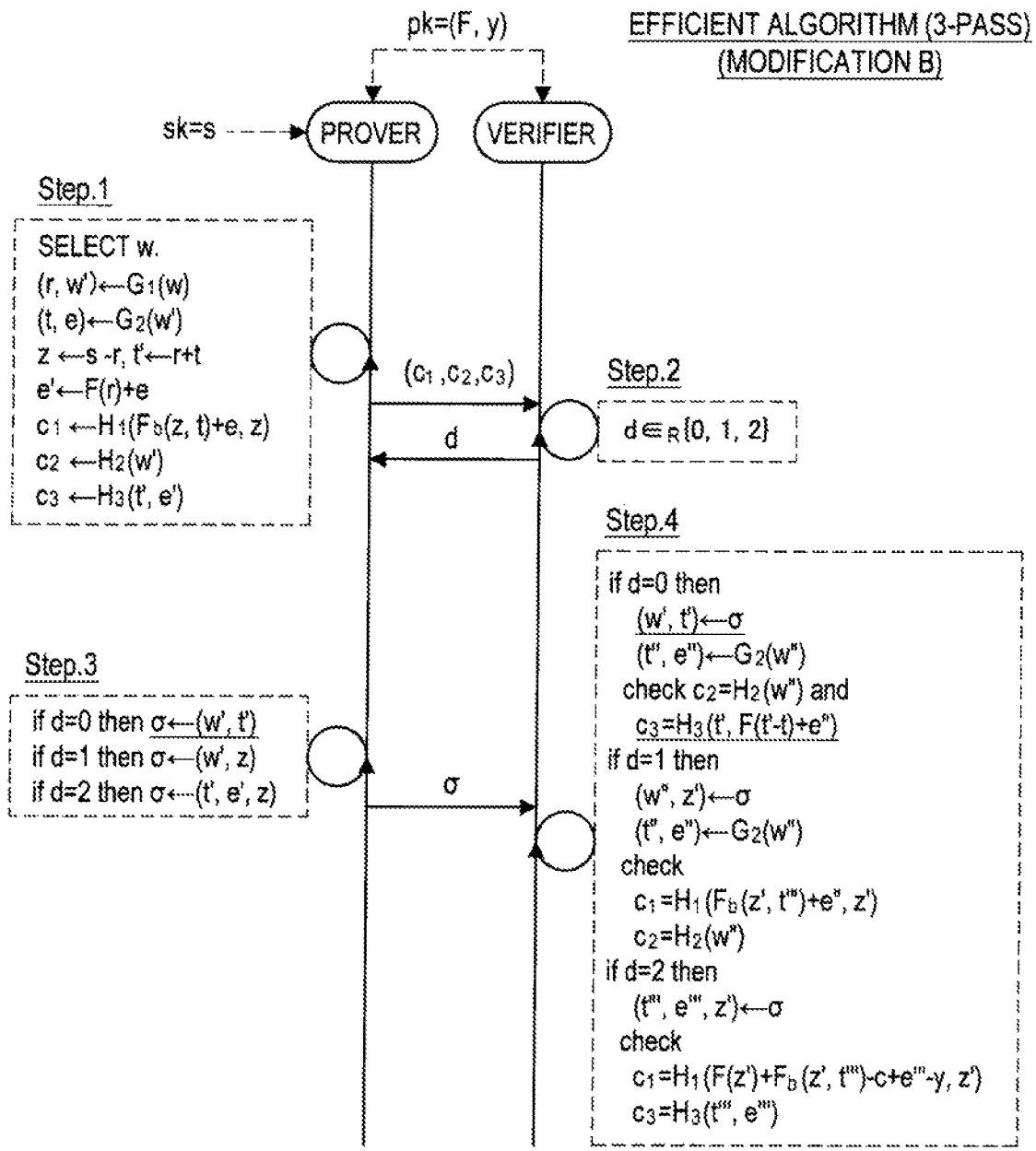
FIG. 11 is an explanatory diagram for describing an efficient algorithm (modification B) for the public key authentication scheme according to the embodiment.

Now, the efficient algorithm of the present scheme shown in FIG. 9 can be modified to algorithms as shown in FIGS. 10 and 11 while maintaining the calculation efficiency.

(Modification A: Algorithm Shown in FIG. 10)

For example, calculation e'←F(r)−c+e is performed in Step 1 of the efficient algorithm shown in FIG. 9, but this calculation can be modified to calculation e'←F(r)+e as shown in FIG. 10. However, in the case of performing such modification, a pan of the contents of verification to be performed by the verifier in Step 4 has to be modified. Specifically, among the contents of verification to be performed by the verifier in Step 4 in the case of d=0, verification of $c_3=H_3(r'+t'', F(r')−c+e'')$ has to be replaced by verification of $c_3=H_3(r'+t'', F(r')+e'')$. Also, among the contents of verification to be performed by the verifier in Step 4 in the case of d=2, verification of $c_1=H_1(F(z')+F_b(z', t''')+e'''−y, z')$ has to be replaced by verification of $c_1=H_1(F(z')+F_b(z', t''')−c+e'''−y, z')$.

(Modification B: Algorithm Shown in FIG. 11)

Furthermore, in Step 3 of the algorithm shown in FIG. 10, σ is set to w in the case of d=0, but the σ to be set in the case of d=0 may be any information as long as it is information from which (r, t, e) can be restored. For example, as shown in FIG. 11, the contents of σ to be set in Step 3 in the case of d=0 may be (w', t'). However, in the case of performing such modification, a part of the contents of verification to be performed by the verifier in Step 4 has to be modified. Specifically, among the contents of verification to be performed by the verifier in Step 4 in the case of d=0, verification of $c_3=H_3(r'+f'', F(r')+e'')$ has to be replaced by verification of $c_3=H_3(t', F(t'−t)+e'')$.

As described above, calculation e'←F(r)−c+e to be performed by the prover in Step 1 can be changed to calculation e'←F(r)+e (Modification A). Also, the contents of a to be set by the prover in Step 3 in the case of d=0 can be changed to (w', t') or the like (Modification B). FIG. 11 shows the efficient algorithm of FIG. 9 to which the modification according to modification A and the modification according to modification B have both been applied, but it is also possible to apply only the modification according to modification B to the efficient algorithm of FIG. 9. That is, the modification contents of modification A and the modification contents of modification B may be separately applied to the algorithm of FIG. 9, or both may be applied to the algorithm of FIG. 9 in combination.

[2-8: Form of Multi-Order Multivariate Simultaneous Equation]

As has been described, the present scheme is a scheme that takes the difficulty of solving a multi-order multivariate simultaneous equation as a basis for security. Also, the present scheme has its feature in that a complicated multi-order multivariate simultaneous equation can be used. In the above explanation, no special limitation has been place on the form of the multi-order multivariate simultaneous equation, but a multi-order multivariate simultaneous equation that represents an elemental cryptographic technology whose difficulty is sufficiently guaranteed is preferably used, for example. In the following, a concrete example of the multi-order multivariate simultaneous equation that can be applied to the present scheme will be introduced.

(2-8-1: Form Related to Common Key Block Cipher)

Common key block cipher technologies such as AES, DES, and KATAN are element technologies that are well analysed and that are highly secure and reliable. These common key block ciphers can be represented by a multi-order multivariate simultaneous equation that takes the key, the plaintext, and the ciphertext of a common key block cipher as variables. When values are given to the variables representing the plaintext and the ciphertext in this multi-order multivariate simultaneous equation, this multi-order multivariate simultaneous equation will be an equation having, as the variable, only the variable representing the key.

Solving such multi-order multivariate simultaneous equation representing such common key block cipher corresponds to restoration of the key of the common key block cipher from the plaintext and the ciphertext. That is, as long as the security of the common key block cipher is maintained, the difficulty of solving the multi-order multivariate simultaneous equation representing the common key block cipher is guaranteed. Accordingly, if a multi-order multivariate simultaneous equation representing a common key block cipher is applied to the present scheme, a public key authentication scheme having security equal to the security of the common key block cipher scheme is realised.

However, if the common key block cipher is represented by a multi-order multivariate simultaneous equation that takes the key, the plaintext, and the ciphertext as the variables, the order of the polynomial will be high, and thus the size of data for representing the simultaneous equation will be increased. Accordingly, in addition to the key, the plaintext, and the ciphertext, a variable for representing the internal state of each round will be introduced. By introducing this variable, the order of the multi-order multivariate simultaneous equation representing the common key block cipher can be made low. For example, appropriate values are substituted into the variables representing the plaintext and the ciphertext, and a simultaneous equation related to variables for representing the key and the internal state is introduced. By adopting such method, the number of variables will increase but the orders will be lower, and thus the representation of the simultaneous equation will be compact.

(2-8-2: Form Related to Hash Function)

Similarly, a multi-order multivariate simultaneous equation related to hash functions such as SHA-1, SHA-256, and the like can be applied to the present scheme. These hash functions can be represented by multi-order multivariate simultaneous equations that take, as variables, a message which is an input of a hash function and a hash value which is an output. With this multi-order multivariate simultaneous equation, when an appropriate value is given to the variable representing the hash value, a multi-order multivariate simultaneous equation related to a variable representing the corresponding input is obtained.

Solving such multi-order multivariate simultaneous equation corresponds to restoration of the value of the original message from the hash value. That is, as long as the security (one-wayness) of the hash function is maintained, the difficulty of solving the multi-order multivariate simultaneous equation representing the hash function is guaranteed. Accordingly, if a multi-order multivariate simultaneous equation representing a hash function is applied to the present scheme, a public key authentication scheme based on the security of the hash function is realised.

However, if the hash function is represented by a multi-order multivariate simultaneous equation that takes the input message and the hash value as the variables, the order of the polynomial will be high, and thus the size of data for representing the simultaneous equation will increase. Accordingly, in addition to the input message and the hash value, a variable for representing the internal state will be introduced. By introducing this variable, the order of the multi-order multivariate simultaneous equation representing the hash function can be made low. For example, an appropriate value is substituted into the variable representing the hash value, and a simultaneous equation related to variables for representing the key and the internal state is introduced. By adopting such method, the number of variables will increase but the orders will be lower, and thus the representation of the simultaneous equation will be compact.

(2-8-3: Form Related to Stream Cipher)

Similarly, a multi-order multivariate simultaneous equation related to stream ciphers such as Trivium can be applied to the present scheme. These stream ciphers can be represented by a multi-order multivariate simultaneous equation related to a variable representing an initial internal state of a stream cipher and a variable representing a stream that is output. In this case, when an appropriate value is given to the variable representing the output stream, a multi-order multivariate simultaneous equation related to a variable for representing a corresponding initial internal state is obtained.

Solving such multi-order multivariate simultaneous equation corresponds to restoration of the variable representing the original initial internal state from the value of the output stream. That is, as long as the security of the stream cipher is ensured, the difficulty of solving the multi-order multivariate simultaneous equation representing the stream cipher is guaranteed. Accordingly, if a multi-order multivariate simultaneous equation representing a stream cipher is applied to the present scheme, a public key authentication scheme based on the security of the stream cipher is realised.

However, if the stream cipher is represented by a multi-order multivariate simultaneous equation that takes the initial internal state and the output stream as the variables, the order of the polynomial will be high, and thus the size of data for representing the simultaneous equation will increase. Accordingly, in addition to the initial internal state and the output stream, a variable for representing the internal state of each round will be introduced. By introducing this variable, the order of the multi-order multivariate simultaneous equation representing the stream cipher can be made low. For example, an appropriate value is substituted into the variable representing the output stream, and a multi-order multivariate simultaneous equation related to variables for representing the initial internal state and the internal state of a round is introduced. By adopting such method, the number of variables will increase but the orders will be lower, and thus the representation of the simultaneous equation will be compact.

In the foregoing, the first embodiment of the present invention has been described.

<3: Second Embodiment>

Next, the second embodiment of the present invention will be described. In the foregoing, a 3-pass public key authentication scheme has been described. In the present embodiment, a 5-pass public key authentication scheme (hereinafter, present scheme) will be described. The present scheme is a scheme for ensuring the soundness of a public key authentication scheme by making the number of verification patterns of a verifier 2q.

Additionally, in the 3-pass public key authentication scheme according to the first embodiment described above, the probability of falsification per interactive protocol was 2/3. However, in the present scheme, the probability of falsification per interactive protocol will be $1/2+1/q$ as will be described later. Moreover, q is an order of a ring to be used. Accordingly, as shown in FIG. 27, if the order of the ring is sufficiently large, the present scheme is more capable of reducing the probability of falsification per interactive protocol, and the probability of falsification can be sufficiently reduced by small number of execution times of the interactive protocol.

The interactive protocol according to the 5-pass public key authentication scheme may seem less efficient than the interactive protocol according to the 3-pass public key authentication scheme. However, according to the 5-pass public key authentication scheme, if the order of the ring is made sufficiently large, the probability of falsification per interactive protocol will be nearly 1/2, and thus the number of execution times of the interactive protocol necessary for achieving the same security level can be less.

For example, in the 3-pass public key authentication scheme, to make the probability of falsification $1/2^n$ or less, the interactive protocol has to be performed $n/(\log 3-1)=1.701$ n times or more. On the other hand, in the 5-pass public key authentication scheme, the interactive protocol has to be performed $n/(1-\log(1+1/q))$ times or more. As shown in FIG. 27, for example, when q=24, the amount of communication necessary to realise the same security level will be less for the 5-pass public key authentication scheme than the 3-pass public key authentication scheme.

[3-1: Algorithm for Public Key Authentication Scheme]

In the following, an algorithm structure according to the 5-pass public key authentication scheme (present scheme) will be described with reference to FIG. 12. FIG. 12 is an explanatory diagram for describing the contents of the algorithm according to the present scheme.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow f_1(s), \ldots, f_m(s)$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Prover Algorithm P, Verifier Algorithm V)

Next, processes by the prover algorithm P and the verifier algorithm V in an interactive protocol will be described with reference to FIG. 12. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates a vector $r \in K^n$ and a set of polynomials of n variables $F'(x)=(f'_1(x), \ldots, f'_m(x))$ by applying the number w to a pseudo random number generator G. That is, the prover algorithm P calculates $(r, F') \leftarrow G(w)$. Next, the prover algorithm P calculates $z \leftarrow s-r$. This calculation corresponds to an operation of masking the secret key s by the vector r.

Step 1 (Continued):

Next, the prover algorithm P generates a hash value $c_1$ of F'(z) and z. That is, the prover algorithm P calculates $c_1 \leftarrow H_1(F'(z), z)$. Also, the prover algorithm P generates a hash value $c_2$ of the number w. That is, the prover algorithm P calculates $c_2 \leftarrow H_2(w)$. Additionally, $H_1(\ldots)$, and $H_2(\ldots)$ described are hash functions. Also, the hash values $(c_1, c_2)$ are messages.

The messages ($c_1$, $c_2$) generated in Step 1 are sent to a verifier.

Step 2:

The verifier algorithm V selects one random number $\alpha$ from q types of elements of a ring K. Then, the verifier algorithm V sends the selected random number $\alpha$ to the prover.

Step 3:

The prover algorithm P calculates $F''(x) \leftarrow \alpha F(x+r) + F'(x)$. This calculation corresponds to an operation of masking a set of polynomials $F(x+r)$ for x by the set of polynomials $F'(x)$.

The polynomial F" generated in Step 3 is sent to the verifier.

Step 4:

The verifier algorithm V selects a verification pattern to be used from two verification patterns. Then, the verifier algorithm V sends to the prover a demand $d \in \{10, 1\}$ indicating the selected verification pattern.

Step 5:

The prover algorithm P generates information $\sigma$ to be sent back to the verifier in response to the demand d received from the verifier. If d=0, the prover algorithm P generates information $\sigma=w$. Also, if d=1, the prover algorithm P generates information $\sigma=z$. The information $\sigma$ generated in this manner is sent to the verifier by the prover algorithm P.

Step 6:

The verifier algorithm V performs the following verification process by using the information $\sigma$ received from the prover.

If d=0, the verifier algorithm V calculates $(r', F''') \leftarrow G(\sigma)$. Then, the verifier algorithm V verifies whether the equality $c_2 = H_2(\sigma)$ holds true or not. Also, the verifier algorithm V verifies whether the equality $F''(x) = \alpha F(x+r') + F'''(x)$ holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates $z' \leftarrow \sigma$. Then, the verifier algorithm V verifies whether the equality $c_1 = H_1(F'''(z') - \alpha y, z')$ holds true or not. The verifier algorithm V outputs a value 1 indicating authentication success in the case the verification has succeeded, and outputs a value 0 indicating authentication failure in the case a failure has occurred in the verification.

(Supplement)

Moreover, note that, at the time of sending the messages ($c_1$, $c_2$) and the set of polynomials F" generated in Step 1 and Step 3 described above to the verifier, information related to the secret key sk, information related to r and information related to z are not at all leaked to the verifier. Note also that, at the time of sending the information $\sigma$ generated in Step 5 described above to the verifier, information related to z is not at al leaked to the verifier in the case of d=0, and information related to r is not at all leaked to the verifier in the case of d=1.

(Soundness in Present Scheme)

The soundness of the present scheme is guaranteed by that, if the prover algorithm P responded correctly to the demands d=0, 1 with respect to a set of ($c_1$, $c_2$) and two types of ($\alpha_1$, $\alpha_2$) selected by the verifier algorithm V, then $F''''_1$, $F''''_2$, $F'''$, $r'$ and $z'$ that satisfy formulae (17) to (19) below can be calculated from the responses.

[Expression 13]

$$F''''_1(x) = \alpha_1 F(x+r') + F'''(x) \quad (17)$$

$$F''''_2(x) = \alpha_2 F(x+r') + F'''(x) \quad (18)$$

$$F''''_1(z') - \alpha_1 y = F''''_2(z') - \alpha_2 y \quad (19)$$

With such logic guaranteed, it is guaranteed that, as long as the multi-order multivariate simultaneous equation is not solved, it is not possible to perform falsification with a probability higher than $1/2+1/q$. That is, to correctly respond to all the demands d=0, 1 of the verifier, the falsifier has to be able to calculate $F''''_1$, $F''''_2$, $F'''$, $r'$ and $z'$ that satisfy formulae (17) and (19) above. In other words, the falsifier has to be able to calculate s that satisfies F(s)=y. Accordingly, as long as the multi-order multivariate simultaneous equation is not solved, the falsifier is not able to successfully perform falsification with a probability higher than $1/2+1/q$. Additionally, by performing the interactive protocol described above a sufficient number of times, the probability of success of falsification can be reduced to a negligible level.

(Modification)

The key generation algorithm Gen described above calculates $y \leftarrow F(s)$, and sets the public key to (F, y). However, the key generation algorithm Gen may be configured to take (y and calculate $(f_1^*(x), \ldots, f_m^*(x)) \leftarrow (f_1(x)-y_1, \ldots, f_m(x)-y_m)$, and set the public key to $(f_1^*, \ldots, f_m^*)$. With this modification, the interactive protocol is enabled to be performed between the prover and the verifier taking y=0.

Furthermore, the prover algorithm P may separately calculate the hash value of F"(z) and the hash value of z, and may separately send each to the verifier as a message.

Furthermore, the prover algorithm P described above generates the vector r and a number w' by applying the pseudo random number generator $G_1$ to the number w. Then, the prover algorithm P generates the polynomial of n variables F'(x) by applying the number w' to the pseudo random number generator $G_2$. However, the prover algorithm P may calculate, from the start, w=(r, F'), and the $G_1$ may be made identity mapping. Furthermore, in this case, the number w does not have to be applied to the $G_1$. Additionally, the same can be said for the $G_2$.

In the foregoing, a basic algorithm structure according to the present scheme has been described.

[3-2: Extended Algorithm]

Figure 13:
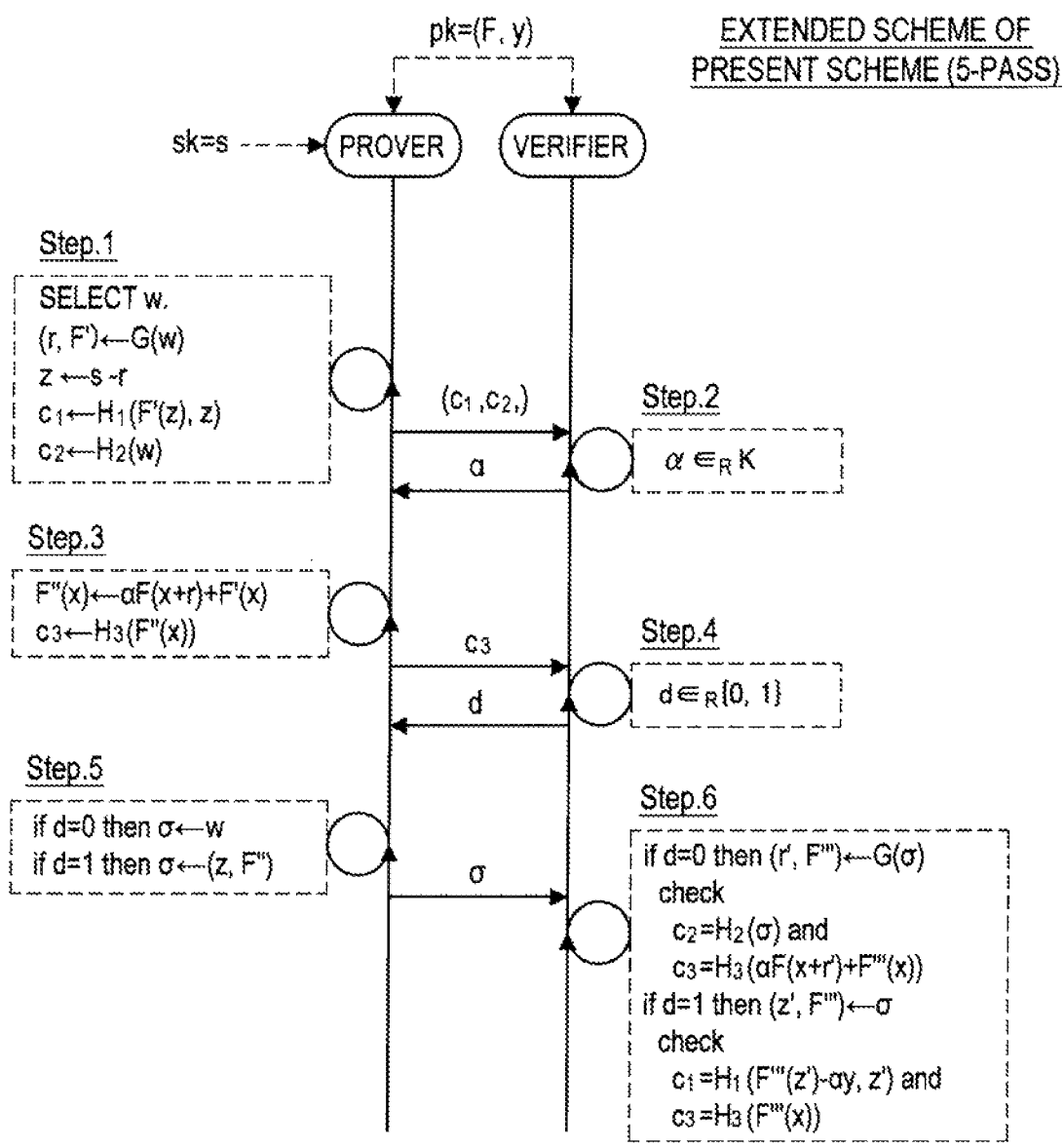
FIG. 13 is an explanatory diagram for describing an extended algorithm for the public key authentication scheme according to the embodiment.

Next, an algorithm of a public key authentication scheme which is an extension of the present scheme (hereinafter, extended scheme) will be described with reference to FIG. 13. FIG. 13 is an explanatory diagram for describing a flow of an interactive protocol based on the extended scheme. This extended scheme is a scheme of transforming a set of polynomials F" to be transmitted in the third pass to one hash value $c_3$ and sending the same to a verifier. With such extension, the probability of sending to the verifier, in the interactive protocol, the set of polynomials F"' whose representation sire is large can be reduced to half, and the average size of data to be communicated can be reduced. In the following, the contents of each algorithm of the extended scheme will be described in detail.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key.

Additionally, in the following, a vector of n variables $(x_1, \ldots, x_n)$ will be expressed as x, and m multi-order polynomials an variables $(f_1(x), \ldots, f_m(x))$ will be expressed as F(x).

(Prover Algorithm P, Verifier Algorithm V)

Next, processes by the prover algorithm P and the verifier algorithm V in the interactive protocol will be described with reference to FIG. 13. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates a vector r∈K$^n$ and a set of polynomials of n variables F'(x) by applying the number w to a pseudo random number generator G. That is, the prover algorithm P calculates (r, F')←G(w). Next, the prover algorithm P calculates z←s−r. This calculation corresponds to an operation of masking the secret key s by the vector r.

Step 1 (Continued):

Next, the prover algorithm P generates a hash value $c_1$ of F'(z) and z. That is, the prover algorithm P calculates $c_1$←$H_1$(F'(z), z). Also, the prover algorithm P generates a hash value $c_2$ of the number w. That is, the prover algorithm P calculates $c_2$←$H_2$(w). Additionally, $H_1$( . . . ), and $H_2$( . . . ) described are hash functions. Also, the hash values ($c_1$, $c_2$) are messages.

The messages ($c_1$, $c_2$) generated in Step 1 are sent to a verifier.

Step 2:

The verifier algorithm V selects one random number α from q types of elements of a ring K. Then, the verifier algorithm V sends the selected random number α to the prover.

Step 3:

The prover algorithm P calculates F"(x)←αF(x+r)+F'(x). This calculation corresponds to an operation of masking a set of polynomials F(x+r) for x by the set of polynomials F'(x). Furthermore, the prover algorithm P generates a hash value $c_3$ of the set of polynomials F". That is, the prover algorithm calculates $c_3$=$H_3$(F"(x)). Additionally, the $H_3$( . . . ) described is a hash function. Also, the hash value $c_3$ is a message.

The message $c_3$ generated in Step 3 is sent to the verifier.

Step 4:

The verifier algorithm V selects a verification pattern to be used from two verification patterns. Then, the verifier algorithm V sends to the prover a demand d∈{0,1} indicating the selected verification pattern.

Step 5:

The prover algorithm P generates information σ to be sent back to the verifier in response to the demand d received from the verifier. If d=0, the prover algorithm P generates information σ=w. Also, if d=1, the prover algorithm P generates information σ=(z, F"). The information σ generated in this manner is sent to the verifier by the prover algorithm P.

Step 6:

The verifier algorithm V performs the following verification process by using the information σ received from the prover.

If d=0, the verifier algorithm V calculates (r', F''')←G(σ). Then, the verifier algorithm V verifies whether the equality $c_2$=$H_2$(σ) holds true or not. Also, the verifier algorithm V verifies whether the equality $c_3$=$H_3$(αF(x+r')+F'''(x)) holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates (z', F''')←σ. Then, the verifier algorithm V verifies whether the equality $c_1$=$H_1$(F'''(z')−αy, z') holds true or not. Furthermore, the verifier algorithm V verifies whether the equality $c_2$=$H_2$(F'''(x)) holds true or not. The verifier algorithm V outputs a value 1 indicating authentication success in the case all the verifications have succeeded, and outputs a value 0 indicating authentication failure in the case a failure has occurred in the verification.

In the foregoing, the process of each algorithm in the interactive protocol of the extended scheme has been described. With such extension, the probability of sending to the verifier, in the interactive protocol, the set of polynomials F" whose representation size is large can be reduced to half, and the average size of data to be communicated can be reduced.

[3-3: Parallel Algorithm]

Figure 14:
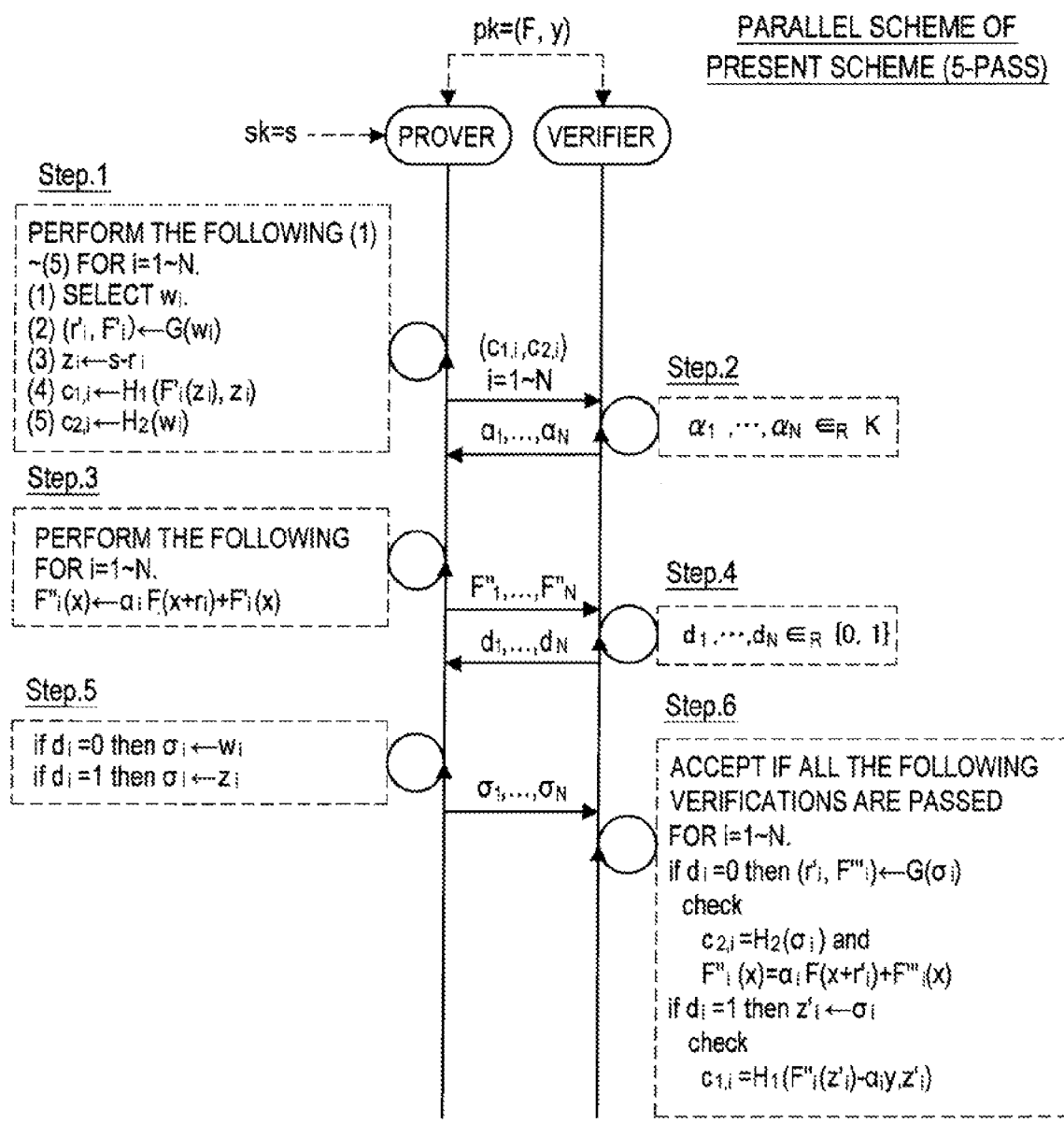
FIG. 14 is an explanatory diagram for describing a parallel algorithm for the public key authentication scheme according to the embodiment.

Now, as has been described, when adopting the interactive protocol according to the present scheme or the extended scheme, the probability of falsification succeeding can be reduced to (1/2+1/q) or less. Accordingly, if this interactive protocol is performed twice, the probability of falsification succeeding can be reduced to $(1/2+1/q)^2$ or less. In the same manner, if this interactive protocol is performed N times, the probability of falsification succeeding becomes $(1/2+1/q)^N$, and if N is a sufficiently large number (for example, N=80), the probability of falsification succeeding is reduced to a negligible level. For example, an algorithm of performing the interactive protocol according to the present scheme N times in parallel is shown in FIG. 14. In the following, the contents of each algorithm performing the interactive protocol N times in parallel will be described with reference to FIG. 14.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector s=$(s_1, \ldots, s_n)$∈K$^n$. Next, the key generation algorithm Gen calculates y=$(y_1, \ldots, y_m)$←$(f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Prover Algorithm P, Verifier Algorithm V)

Next, processes by the prover algorithm P and the verifier algorithm V in an interactive protocol will be described with reference to FIG. 14. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (5) below for i=1 to N. (Process 1) The prover algorithm P arbitrarily selects a number $w_i$. (Process 2) The prover algorithm P generates a vector $r_i$∈K$^n$ and a set of polynomials $F'_i(x)$ by applying the number $w_i$ to a pseudo random number generator G. That is, the prover algorithm P calculates ($r_i$, $F'_i$)←G($w_i$). (Process 3) The prover algorithm P calculates $z_i$←s−$r_i$. This calculation corresponds to an operation of masking the secret key s by the vector $r_i$.

Step 1 (Continued):

(Process 4) The prover algorithm. P generates a hash value $c_{1,i}$ of $F'_i(z_i)$ and $z_i$. That is, the prover algorithm P calculates $c_{1,i} \leftarrow H_1(F'_i(z_i), z_i)$. (Process 5) The prover algorithm P generates a hash value $c_{2,i}$ of the number $w'_i$. That is, the prover algorithm P calculates $c_{2,i} \leftarrow H_2(w'_i)$.

After (Process 1) to (Process 5) described above are performed for i=1 to N, the messages $(c_{1,i}, c_{2,i})$ (i=1 to N) generated in Step 1 are sent to a verifier.

Step 2:

The verifier algorithm V selects N random numbers $\alpha_1, \ldots, \alpha_N$ from q types of elements of a ring K. Then, the verifier algorithm V sends the selected random numbers $\alpha_1, \ldots, \alpha_N$ to the prover.

Step 3:

The prover algorithm P calculates $F''_i(x) \leftarrow \alpha_i F(x+r_i) + F'_i(x)$ for i=1 to N. This calculation corresponds to an operation of masking a set of polynomials $F(x+r_i)$ for x by the set of polynomials $F'_i(x)$. Then, the prover algorithm P sends the set of polynomials $F''_1, \ldots, F''_N$ to the verifier.

Step 4:

The verifier algorithm V selects, for each of i=1 to N, a verification pattern to be used from two verification patterns. Then, the verifier algorithm V sends to the prover a demand $d_i \in \{0, 1\}$ (i=1 to N) indicating the selected verification pattern.

Step 5:

The prover algorithm P generates information $\sigma_i$ to be sent back to the verifier in response to the demand $d_i$ received from the verifier. Here, the prover algorithm P performs (Process 1) or (Process 2) below for i=1 to N. (Process 1) If $d_i=0$, the prover algorithm P generates information $\sigma_i=w_i$. (Process 2) if $d_i=1$, the prover algorithm P generates information $\sigma_i=z_i$. After decision and process of (Process 1) or (Process 2) above have been performed, the information $\sigma_i$ (i=1 to N) is sent to the verifier by the prover algorithm P.

Step 6:

The verifier algorithm V performs the following verification process by using the information $\sigma_i$ (i=1 to N) received from the prover. Additionally, the following process is performed for i=1 to N.

If $d_i=0$, the verifier algorithm V calculates $(r'_i, F'''_i) \leftarrow G(\sigma_i)$. Then, the verifier algorithm V verifies whether the equality $c_{2,i}=H_2(\sigma_i)$ holds true or not. Also, the verifier algorithm V verifies whether the equality $F''_i(x)=\alpha_i F(x+r'_i)+F'''_i(x)$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $z'i \leftarrow \sigma_i$. Then, the verifier algorithm V verifies whether the equality $c_{1,i}=H_1(F'''_i(z'_i) - \alpha_i y, z_i)$ holds true or not. The verifier algorithm V outputs a value 1 indicating authentication success in the case the verification has succeeded, and outputs a value 0 indicating authentication failure in the case a failure has occurred in the verification.

Figure 15:
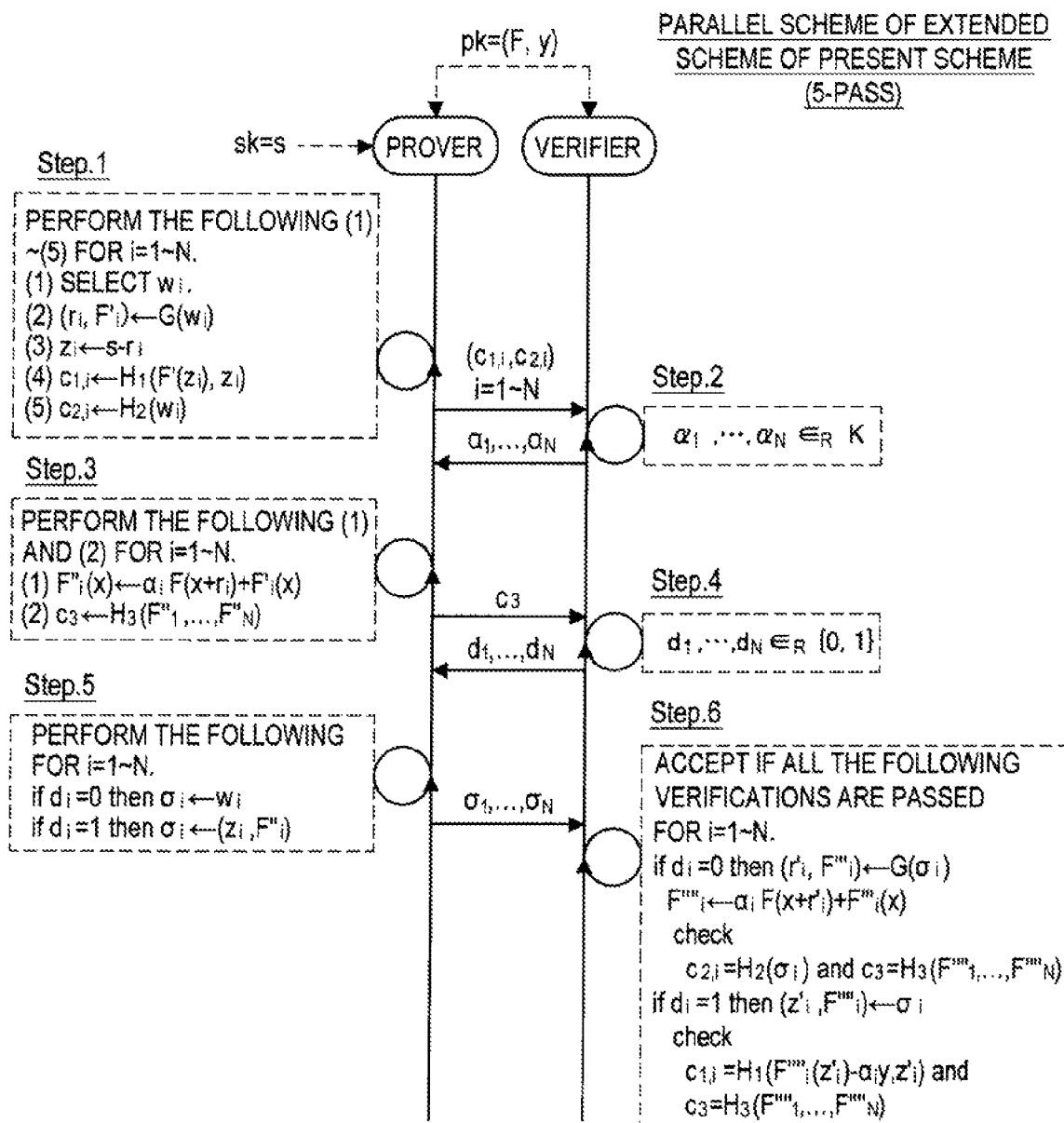
FIG. 15 is an explanatory diagram for describing parallelisation of the extended algorithm for the public key authentication scheme according to the embodiment.

In the foregoing, the method of performing, in parallel, the interactive protocol of the present scheme has been described. As described above, by repeatedly performing the interactive protocol of the present scheme, the probability of falsification succeeding can be reduced to a negligible level. Additionally, parallelisation is likewise possible for the extended scheme. An algorithm structure of a parallel interactive protocol for the extended scheme is shown in FIG. 15.

Additionally, after Step 1 described above, instead of transmitting $(c_{1,1}, c_{1,2}, \ldots, c_{N,1}, c_{N,2})$ to the verifier, their hash values $H(c_{1,1}, c_{1,2}, \ldots, c_{N,1}, c_{N,2})$ may be collectively transmitted. When adopting this configuration, the messages to be sent in the first pass will be only one hash value, and the amount of communication can be greatly reduced. Moreover, this hash value and a hash value that is not restored from a response to a challenge sent from the prover are to be sent from the prover together with the response. According to this configuration, in the case of parallel repetition of N times, the number of pieces of information to be sent can be reduced by N−1.

(Parallel Algorithm According to Extended Scheme)

Next, contents of a parallel algorithm according to the extended scheme will be described with reference to FIG. 15. Additionally, the structure of the key generation algorithm Gen is substantially the same as that of the parallel algorithm according to the present scheme described above, and detailed explanation thereof will be omitted.

Step 1:

First, the prover algorithm P performs process (1) to process (5) below for i=1 to N. (Process 1) The prover algorithm P arbitrarily selects a number $w_i$. (Process 2) The prover algorithm P generates a vector $r_i \in K^n$ and a set of polynomials $F'_i(x)$ by applying the number $w_i$ to a pseudo random number generator G. That is, the prover algorithm P calculates $(r_i, F'_i) \leftarrow G(w_i)$. (Process 3) The prover algorithm P calculates $z_i \leftarrow s - r_i$. This calculation corresponds to an operation of masking the secret key s by the vector $r_i$.

Step 1 (Continued):

(Process 4) The prover algorithm P generates a hash value $c_{1,i}$ of $F'_i(z_i)$ and $z_i$. That is, the prover algorithm P calculates $c_{1,i} \leftarrow H_1(F'_i(z_i), z_i)$. (Process 5) The prover algorithm P generates a hash value $c_{2,i}$ of the number $w_i$. That is, the prover algorithm P calculates $c_{2,i} \leftarrow H_2(w_i)$.

After (Process 1) to (Process 5) described above are performed for i=1 to N, the messages $(c_{1,i}, c_{2,i})$ (i=1 to N) generated in Step 1 are sent to a verifier.

Step 2:

The verifier algorithm V selects N random numbers $\alpha_1, \ldots, \alpha_N$ from q types of elements of a ring K. Then, the verifier algorithm V sends the selected random numbers $\alpha_1, \ldots, \alpha_N$ to the prover.

Step 3:

The prover algorithm P calculates $F''_i(x) \leftarrow \alpha_i F(x+r_i) + F'_i(x)$ for i=1 to N. This calculation corresponds to an operation of masking a set of polynomials $F(x+r_i)$ for x by the set of polynomials $F'_i(x)$. Then, the prover algorithm P generates a hash function $c_3$ of the set of polynomials $F''_1, \ldots, F''_N$. That is, the prover algorithm P calculates $c_3 \leftarrow H_3(F''_1, \ldots, F''_N)$. Additionally, $H_3(\ldots)$ described is a hash function. Also, the hash value $c_3$ is a message.

The hash value $c_3$ generated in Step 3 is sent to the verifier.

Step 4:

The verifier algorithm V selects, for each of i=1 to N, a verification pattern to be used from two verification patterns. Then, the verifier algorithm V sends to the prover a demand $d_i \in \{0, 1\}$ (i=1 to N) indicating the selected verification pattern.

Step 5:

The prover algorithm P generates information $\sigma_i$ to be sent back to the verifier in response to the demand $d_i$ received from the verifier. Here, the prover algorithm P performs (Process 1) or (Process 2) below for i=1 to N. (Process 1) If $d_i=0$, the prover algorithm P generates information $\sigma_i=w_i$. (Process 2) If $d_i=1$, the prover algorithm P generates information $\sigma_i=(z_i, F''_i)$. After decision and process of (Process 1) or (Process 2) above have been performed, the information $\sigma_1$ (i=1 to N) is sent to the verifier by the prover algorithm P.

Step 6:

The verifier algorithm V performs the following verification process by using the information $\sigma_i$ (i=1 to N) received from the prover. Additionally, the following process is performed for i=1 to N.

If $d_i=0$, the verifier algorithm V calculates $(r'_i, F'''_i) \leftarrow G(\sigma_i)$. Furthermore, the verifier algorithm V calculates $F''''_i \leftarrow \alpha_i F(x+r'_i) + F'''_i(x)$. Then, the verifier algorithm V verifies whether the equality $c_{2,i} = H_2(\sigma_i)$ holds true or not. Also, the verifier algorithm V verifies whether the equality $c_3 = H_3(F''''_1, \ldots, F''''_N)$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $(z'_i, F''''_i) \leftarrow \sigma_i$. Then, the verifier algorithm V verifies whether the equality $c_{1,i} = H_1(F''''_i(z'_i) - \alpha_i y, z'_i)$ holds true or not. Furthermore, the verifier algorithm V verifies whether the equality $c_3 = H_3(F''''_1, \ldots, F''''_N)$ holds true or not. The verifier algorithm V outputs a value 1 indicating authentication success in the case all the verifications have succeeded, and outputs a value 0 indicating authentication failure in the case a failure has occurred in the verification.

In the foregoing, the contents of the parallel algorithm according to the extended scheme have been described.

(Suitable Method of Parameter Setting)

Now, as with the interactive protocol according to the first embodiment described above, the interactive protocol according to the present embodiment guarantees security against a passive attack. However, in the case of adopting the above method of repeatedly performing this interactive protocol in parallel, in order to guarantee that security against an active attack is absolutely guaranteed, a condition described as below has to be satisfied.

The interactive protocol described above is a scheme where a prover proves to a verifier that "the prover knows the s that satisfies y=F(s) for y" by using one key pair (public key y, secret key s). Accordingly, if interaction that will be accepted by verification is performed, a possibility is not denied that information that "the prover used the s at the time of interaction" will become known to the verifier. Furthermore, collision resistance is not guaranteed for the above F. Thus, it is difficult to prove with regard to a case of repeatedly performing the interactive protocol described above in parallel, with no conditions, that security against an active attack is absolutely guaranteed.

Accordingly, the inventors of the present application have investigated a method of preventing information that "the prover used the s at the time of interaction" from being made known to the verifier even when interaction that will be accepted by verification is performed. Then, the inventors of the present application have devised a method that enables, even in the case of repeatedly performing the interactive protocol described above in parallel, to guarantee security against an active attack. This method is for setting the number in of multi-order polynomials of n variables $f_1, \ldots, f_m$ used as a public key to a value sufficiently smaller than the number n of variables. For example, m and n are set such that $2^{m-n} \ll 1$ (for example, $2^{-80} \ll 1$ when n=160 and m=80).

With the scheme as described above that takes the difficulty of solving a multi-order multivariate equation as a basis for security, even if a secret key s, and a public key pk corresponding to such secret key are given, it is difficult to generate another secret key $s_2$ corresponding to the public key pk. Thus, if it is guaranteed that there are two or more secret keys s for a public key pk, it is possible to prevent information that "the prover used the s at the time of interaction" from being made known to the verifier even when interaction that will be accepted by verification is performed. That is, if this guarantee holds true, security against an active attack can be guaranteed even in a case of repeatedly performing the interactive protocol in parallel.

Considering, with reference to FIG. 28, function $F: K^n \leftarrow K^m$ formed from m multi-order polynomials of n variables (where n>m), the number of elements of a domain not having a second preimage is only $|K|^m - 1$ at the maximum. Accordingly, if $|K|^{m-n}$ is made sufficiently small, a possibility of an element of a domain not having a second preimage being selected can be reduced to a negligible level. That is, if the number m of multi-order polynomials of n variables $f_1, \ldots, f_m$ is set to a value sufficiently smaller than the number n of variables, existence of two or more secret keys s for a public key pk can be guaranteed. As a result, also in the case where interaction that will be accepted by verification is performed, it is possible to prevent the information that "the prover used the s at the time of interaction" from being made known to the verifier, and security against an active attack is guaranteed even in the case of repeatedly performing the interactive protocol in parallel.

As described above, by adopting the method of setting the number m of multi-order polynomials of n variables $f_1, \ldots, f_m$ to a value smaller than the number n of variables (n>m; preferably, $2^{m-n} \ll 1$), security for the case of repeatedly performing the interactive protocol in parallel can be improved.

[3-4: Non-Interactive Algorithm]

Figure 16:
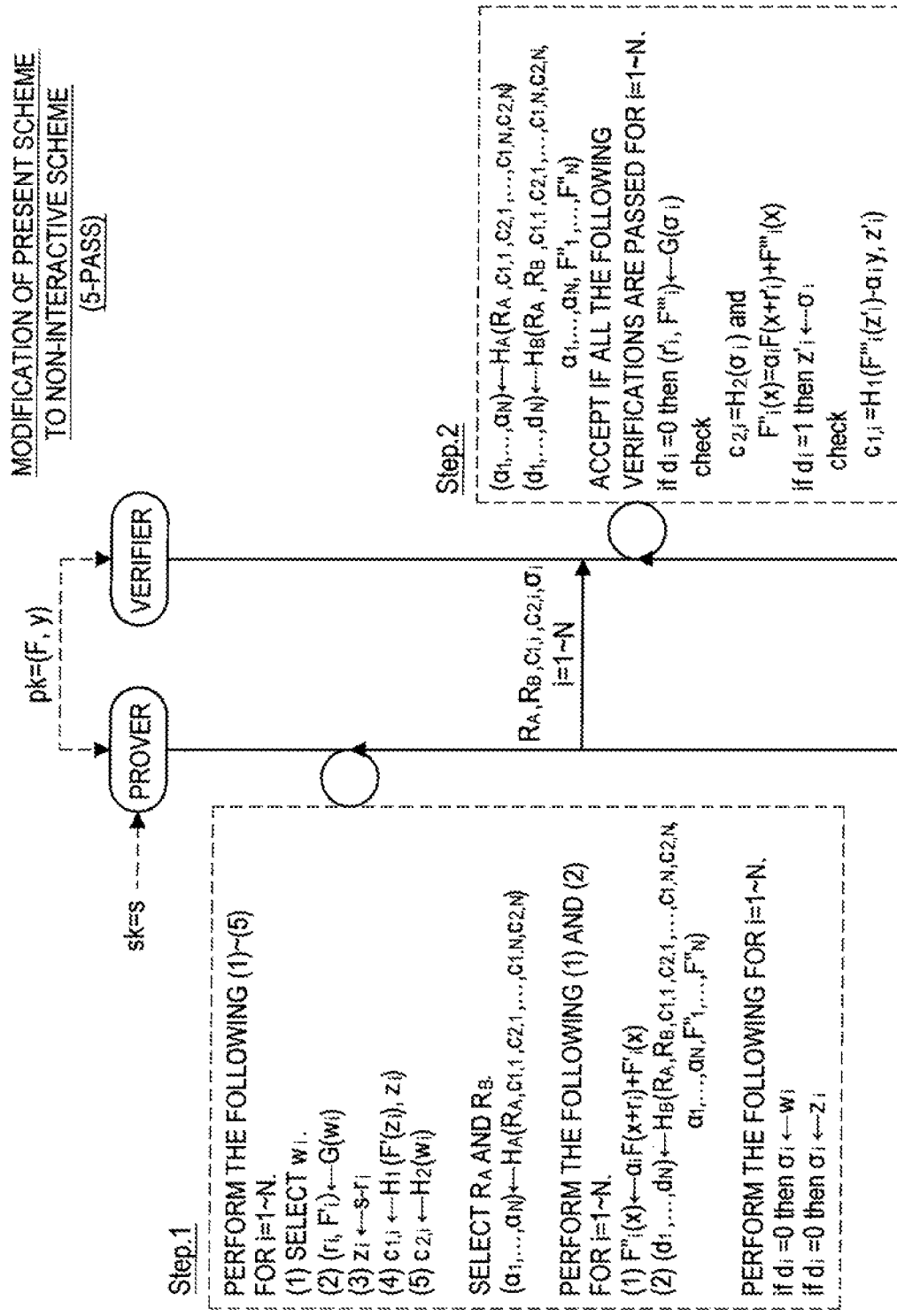
FIG. 16 is an explanatory diagram for describing a non-interactive algorithm for the public key authentication scheme according to the embodiment.

In the foregoing, the 5-pass public key authentication scheme has been described. However, in the present scheme, the information sent from the verifier to the prover is actually merely a random number, and thus modification to a 1-pass public key authentication scheme (hereinafter, non-interactive scheme) is possible. Additionally, the contents of each algorithm according to the non-interactive scheme are shown in FIG. 16. In the following, the contents of each algorithm according to the non-interactive scheme will be described with reference to FIG. 16.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Prover Algorithm P, Verifier Algorithm V)

Next, processes by the prover algorithm P and the verifier algorithm V in an interactive protocol will be described with reference to FIG. 16. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P performs process (1) to process (5) below for i=1 to N. (Process 1) The prover algorithm P arbitrarily selects a number $w_i$. (Process 2) The prover algorithm P generates a vector $r_i \in K^n$ and a set of polynomials $F'_i(x)$ by applying the number $w_i$ to a pseudo random number generator G. That is, the prover algorithm P calculates $(r_i, F'_i) \leftarrow G(w_i)$. (Process 3) The prover algorithm P calculates $z_i \leftarrow s - r_i$. This calculation corresponds to an operation of masking the secret key s by the vector $r_i$.

Step 1 (Continued):

(Process 4) The prover algorithm P generates a hash value $c_{1,i}$ of $F_i(z_i)$ and $z_i$. That is, the prover algorithm P calculates $c_{1,i} \leftarrow H_1(F_i(z_i), z_i)$. (Process 5) The prover algorithm P generates a hash value of the number $w_i$. That is, the prover algorithm P calculates $c_{2,i} \leftarrow H_2(w_i)$.

Step 1 (Continued):

Next, the prover algorithm P selects random numbers $R_A$ and $R_B$. Then, the prover algorithm P generates hash values $\alpha_1, \ldots, \alpha_N$ by applying the random number $R_A$ and the hash values $c_{1,i}$ and $c_{2,i}$ calculated by (Process 4) and (Process 5) above to a hash function $H_A$. That is, the prover algorithm P calculates $(\alpha_1, \ldots, \alpha_N) \leftarrow H_A(R_A, c_{1,1}, \ldots, c_{2,N})$.

Step 1 (Continued):

Next, the prover algorithm P performs (Process 1) and (Process 2) below for i=1 to N. (Process 1) The prover algorithm P calculates $F''_i(x) \leftarrow \alpha_i F(x+r_i) + F'_i(x)$. This calculation corresponds to an operation of masking a set of polynomials $F(x+r_i)$ for x by the set of polynomials $F'_i(x)$. (Process 2) The prover algorithm P generates, for i=1 to N, $d=(d_1, \ldots, d_N)$ by applying the random numbers $R_A$ and $R_B$, the hash values $(c_{1,1}$ and $c_{2,i})$, $\alpha_i$, and $F''_i$ to a hash function $H_B$. That is, the prover algorithm P calculates $(d_1, \ldots, d_N) \leftarrow H_B(R_A, R_B, c_{1,1}, \ldots, c_{2,N}, \alpha_1, \ldots, \alpha_N, F''_1, \ldots, F''_N)$.

Step 1 (Continued):

The prover algorithm P generates information $\sigma_i$ to be sent to the verifier according to the generated $d_i$. Here, the prover algorithm P performs (Process 1) or (Process 2) below for i=1 to N. (Process 1) If $d_i=0$, the prover algorithm P generates information $\sigma_i=w_i$. (Process 2) If $d_i=1$, the prover algorithm P generates information $\sigma_i=z_i$. After decision and process of (Process 1) or (Process 2) above have been performed, $R_A$, $R_B$, $c_{1,i}$, $c_{2,i}$, $\sigma_i$ (i=1~N) are sent to the verifier by the prover algorithm P.

Step 2:

The verifier algorithm V first generates $\alpha_i$ by applying the $R_A$, $c_{1,i}$ and $c_{2,i}$ received from the prover to the hash function $H_A$. That is, the verifier algorithm V calculates $(\alpha_1, \ldots, \alpha_N) \leftarrow H_A(R_A, c_{1,1}, \ldots, c_{2,N})$. Next, the verifier algorithm V calculates $d=(d_1, \ldots, d_N) \leftarrow H_B(R_A, R_B, c_{1,1}, \ldots, c_{2,N}, \alpha_1, \ldots, \alpha_N, F''_1, \ldots, F''_N)$. Then, the verifier algorithm V performs the following verification process by using the information $\sigma_i$ (i=1 to N). Additionally, the following process is performed for i=1 to N.

If $d_i=0$, the verifier algorithm V calculates $(r'_i, F'''_i) \leftarrow G(\sigma_i)$. Then, the verifier algorithm V verifies whether the equality $c_{2,i}=H_2(\sigma_i)$ holds true or not. Also, the verifier algorithm V verifies whether the equality $F''_i(x)=\alpha_i F(x+r'_i)+F'''_i(x)$ holds true or not. The verifier algorithm V outputs a value 1 indicating authentication success in the case all the verifications have succeeded, and outputs a value 0 indicating authentication failure in the case a failure has occurred in the verification.

If $d_i=1$, the verifier algorithm V calculates $z'_i \leftarrow \sigma_i$. Then, the verifier algorithm V verifies whether the equality $c_{1,i}=H_1(F'''_i(z'_i)-\alpha_i y, Z'_i)$ holds true or not. The verifier algorithm V outputs a value 1 indicating authentication success in the case the verification has succeeded, and outputs a value 0 indicating authentication failure in the case a failure has occurred in the verification.

In the foregoing, the contents of each algorithm according to the non-interactive scheme have been described. Additionally, if ideal hash functions $H_A$ and $H_B$ are assumed, hash values $\alpha_i$ and $d_i$ will act randomly, and thus hash values $\alpha_i$ and $d_i$ that are convenient for the prover will not occur. Accordingly, even when the modification as described above is performed, sufficient security is ensured. Additionally, such modification can likewise be applied to the extended scheme and the like.

[3-5: Modification into Digital Signature Scheme]

Here, a method of modifying the present scheme to the digital signature scheme will be described. Additionally, for the sake of simplicity, a method of modifying the non-interactive scheme described above to the digital signature scheme will be described here. It can be understood that, when the prover and the verifier of the non-interactive scheme described above correspond to the signer and the verifier of the digital signature scheme, there is a similarity to the model of the digital signature scheme in that the prover alone can convince the verifier. With this concept in mind, the algorithm structure of the digital signature scheme based on the non-interactive scheme will be described in detail.

(Key Generation Algorithm Gen)

The key generation algorithm Gen generates m multi-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ as a public key pk, and sets s as a secret key. Additionally, in the following, a vector of n variables $(x_1, \ldots, x_n)$ will be expressed as x, and m multi-order polynomials of n variables $(f_1(x), \ldots, f_m(x))$ will be expressed as F(x).

(Signature Generation Algorithm Sig)

The signature generation algorithm Sig performs (Process 1) to (Process 11) below for i=1 to N. Additionally, it is assumed that a signature key sk=s and a document M are inputted in the signature generation algorithm Sig.

(Process 1) The signature generation algorithm Sig arbitrarily selects a number $w_i$. (Process 2) The signature generation algorithm Sig generates a vector $r_i \in K^n$ and a set of polynomials of n variables $F'_i(x)=(f_{1,1}'(x), \ldots, f_{m,i}'(x))$ by applying the number $w_i$ to a pseudo random number generator G. That is, the signature generation algorithm Sig calculates $(r_i, F'_i) \leftarrow G(w_i)$. (Process 2) The signature generation algorithm Sig calculates $z_i \leftarrow s - r_i$. This calculation corresponds to an operation of masking the secret key s by the vector $r_i$.

(Process 3) The signature generation algorithm Sig generates a hash value $c_{1,i}$ of $F''_i(z_i)$ and $z_i$. That is, the signature generation algorithm Sig calculates $c_{1,i} \leftarrow H_1(F''_i(z_i), z_i)$. (Process 4) The signature generation algorithm Sig generates a hash value $c_{2,i}$ of a number $w'_i$. That is, the signature generation algorithm Sig calculates $c_{2,i} \leftarrow H_2(w'_i)$. Additionally, $H_1( \ldots )$, and $H_2( \ldots )$ described are hash functions.

(Process 4) The signature generation algorithm Sig arbitrarily selects a random number $R_A$. (Process 5) The signature generation algorithm Sig calculates $\alpha=(\alpha_1, \ldots, \alpha_N) \leftarrow H_A(R_A, M, c_{1,1}, \ldots, c_{2,N})$. (Process 6) The signature generation algorithm Sig calculates, for i=1 to N, $F''_i(x)=\alpha_i F(x+r'_i)+F'_i(x)$. (Process 7) The signature generation algorithm Sig arbitrarily selects a random number $R_B$. (Process 8) The signature generation algorithm Sig calculates $d=(d_1, \ldots, d_N) \leftarrow H_B(R_B, M, c_{1,1}, \ldots, c_{2,N}, \alpha, F''_1, \ldots, F''_N)$.

Next, the signature generation algorithm Sig performs, i=1 to N, next (Process 9) or (Process 10) below according to $d_i$. (Process 9) If $d_i=0$, the signature generation algorithm Sig calculates $\sigma_i \leftarrow w_i$. (Process 10) If $d_i=1$, the signature generation algorithm Sig calculates $\sigma_i \leftarrow z_i$.

(Process 11) After decision and process of (Process 9) or (Process 10) above have been performed for i=1 to N, the signature generation algorithm Sig outputs a digital signature σ=($R_A$, $R_B$, $c_{1,1}$, . . . , $c_{2,N}$, $α_1$, . . . , $α_N$, $F''_1$, . . . , $F''_N$, $σ_1$, . . . , $σ_N$).

(Signature Verification Algorithm Ver)

If all the following verifications are passed for i=1 to N, the signature verification algorithm Ver accepts the digital signature σ, and if even one verification is not passed, the signature verification algorithm Ver denies the digital signature σ. Additionally, it is assumed that the digital signature σ and the document M are inputted in the signature verification algorithm Ver. First, the signature verification algorithm Ver calculates α=($α_1$, . . . , $α_N$)←$H_A$($R_A$, M, $c_{1,1}$, . . . , $c_{3,N}$). Next, the signature verification algorithm Ver calculates d=($d_1$, . . . , $d_N$)←H(R, M, $c_{1,1}$, . . . , $c_{3,N}$, α, $F''_1$, . . . , $F''_N$) Then, the signature verification algorithm Ver performs (Verification 1) and (Verification 2) below for i=1 to N.

(Verification 1) If $d_i$=0, the signature verification algorithm Ver calculates ($r'_i$, $F''_i$)←G($σ_i$). Then, the signature verification algorithm Ver verifies whether the equality $c_{2,i}$=$H_2$($σ_i$) holds true or not. Also, the signature verification algorithm Ver verifies whether the equality $F''_i$(x)=$α_i$F(x+$r'_i$)+$F'_i$($x_1$, . . . , $x_n$) holds true or not. The signature verification algorithm Ver outputs a value 1 indicating acceptance of the digital signature σ in the case all the verifications have succeeded, and outputs a value 0 indicating denial of the digital signature σ in the case a failure has occurred in the verification.

(Verification 2) If $d_i$=1, the signature verification algorithm Ver calculates ($z'_i$, $F'''_i$)←$_i$. Then, the signature verification algorithm Ver verifies whether the equality $c_{1,i}$=$H_1$($F'''_i$($z'_i$), $z'_i$) holds true or not. The signature verification algorithm Ver outputs a value 1 indicating acceptance of the digital signature σ in the case the verification has succeeded, and outputs a value 0 indicating denial of the digital signature σ in the case a failure has occurred in the verification.

In the foregoing, each algorithm structure of the digital signature scheme based on the present scheme has been described. A digital signature scheme based on the extended scheme described above can likewise be structured.

[3-6: Concrete Example]

Figure 17:
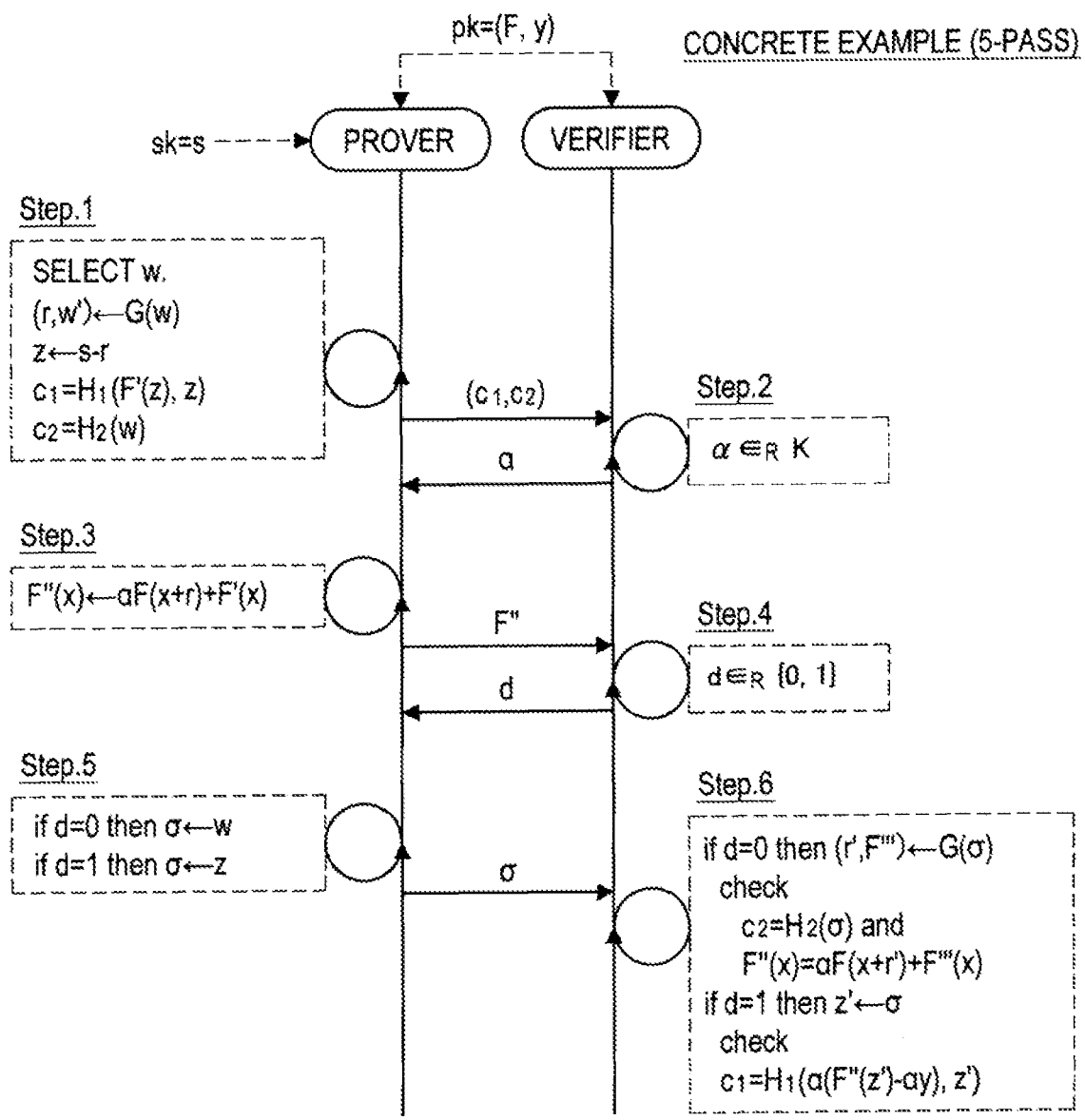
FIG. 17 is an explanatory diagram for describing a concrete algorithm for the public key authentication scheme according to the embodiment.

Next, a concrete algorithm structure that is presumable when performing the present scheme will be described with reference to FIG. 17. FIG. 17 is an explanatory diagram for describing a concrete example of the present scheme.

(Key Generation Algorithm Gen)

The key generation algorithm Gen generates m second-order polynomials of n variables $f_1(x_1, . . . , x_n)$, . . . , $f_m(x_1, . . . , x_n)$ defined on a ring K and a vector s=($s_1$, . . . , $s_n$)∈$K^n$. Next, the key generation algorithm Gen calculates y=($y_1$, . . . $y_m$)←($f_1$(s), . . . , $f_m$(s)). Then, the key generation algorithm Gen sets ($f_1$, . . . , $f_m$, y) as a public key pk, and sets s as a secret key. Additionally, in the following, a vector of n variables ($x_1$, . . . , $x_n$) will be expressed as x, and m second-order polynomials of n variables ($f_1$(x), . . . , $f_m$(x)) will be expressed as F(x).

(Prover Algorithm P, Verifier Algorithm V)

Next, processes by the prover algorithm P and the verifier algorithm V in an interactive protocol will be described with reference to FIG. 17. This interactive protocol is for making a verifier prove that "prover knows the s that satisfies y=F(s)," without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Step 1:

First, the prover algorithm P arbitrarily selects a number w. Then, the prover algorithm P generates a vector r∈$K^n$ and a set of polynomials of n variables F'(x)=($f'_1$, . . . , $f'_m$(x)) by applying the number w to a pseudo random number generator G. That is, the prover algorithm P calculates (r, F')←G(w). Next, the prover algorithm P calculates z←s−r. This calculation corresponds to an operation of masking the secret key s by the vector r. Additionally, the polynomial $f''_1$(x) is represented as formula (20) below.

$$f'_i(x) = \sum_j b'_{i,j} x_j + c'_i \qquad (20)$$

Step 1 (Continued):

Next, the prover algorithm P generates a hash value $c_1$ of F'(z) and z. That is, the prover algorithm P calculates $c_1$←$H_1$(F'(z), z). Furthermore, the prover algorithm P generates a hash value $c_2$ of the number w. That is, the prover algorithm P calculates $c_2$←$H_2$(w). Additionally, $H_1$( . . . ), and $H_2$( . . . ) described are hash functions. Also, the hash values ($c_1$, $c_2$) are messages.

The messages ($c_1$, $c_2$) generated in Step 1 are sent to a verifier.

Step 2:

The verifier algorithm V selects one random number α from q types of elements of a ring K. Then, the verifier algorithm V sends the selected random number α to the prover.

The prover algorithm P calculates F''(x)←αF(x+r)+F'(x). This calculation corresponds to an operation of masking a set of polynomials F(x+r) for x by the set of polynomials F'(x).

The polynomial F'' generated in Step 3 is sent to the verifier.

Step 4:

The verifier algorithm V selects a verification pattern to be used from two verification patterns. Then, the verifier algorithm V sends to the prover a demand d∈{0, 1} indicating the selected verification pattern.

Step 5:

The prover algorithm P generates information σ to be sent back to the verifier in response to the demand d received from the verifier. If d=0, the prover algorithm P generates information σ=w. Also, if d=1, the prover algorithm P generates information σ=z. The information σ generated in this manner is sent to the verifier by the prover algorithm P.

Step 6:

The verifier algorithm V performs the following verification process by using the information σ received from the prover.

If d=0, the verifier algorithm V calculates (r', F''')←G(σ). Then, the verifier algorithm V verifies whether the equality $c_2$=$H_2$(σ) holds true or not. Also, the verifier algorithm V verifies whether the equality F''(x)=αF(x+r')+F'''(x) holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates z'←σ. Then, the verifier algorithm V verifies whether the equality $c_1$=$H_1$(F''(z')−αy, z') holds true or not. The verifier algorithm V outputs a value 1 indicating authentication success in the case the verification has succeeded, and outputs a value 0 indicating authentication failure in the case a failure has occurred in the verification.

In the foregoing, a concrete algorithm structure that is presumable when performing the present scheme has been described

[3-7: Efficient Algorithm]

Here, an efficient algorithm will be considered as with the first embodiment described above. For example, a method of representing a set of polynomials F'(x) used to mask a set of polynomials F(x+r) for x as F'(x)=$F_b$(x, t)+c by using two vectors t∈$K^n$ and ee e∈$K^m$ will be considered. When using this method, the set of polynomials F(x+r) for x is represented as formula (21) below.

[Expression 15]

$$\alpha F(x+r) + F'(x) = \alpha F(x) + \alpha F(r) + \alpha F_b(x, r) - \alpha c + F_b(x, t) + e \quad (21)$$
$$= \alpha F(x) + F_b(x, \alpha r + t) + \alpha(F(r) - c) + e$$

Accordingly, when t'=αr+t and e'=α(F(r)−c)+e, a set of polynomials F''(x) related to x after masking can also be represented by two vectors t'∈$K^n$ and e∈$K^m$. For these reasons, when F' is set as F'(x)=$F_b$(x, t)+e, F' and F'' will be represented by a vector on $K^n$ and a vector on $K^m$, and the size of data necessary for communication can be greatly reduced.

Furthermore, no information related to r is leaked from F''' (or F') by the above modification. For example, even if e' and t' (or e and t) are given, it is not possible to know any information related to r as long as e and t (or e' and t') are not known. Accordingly, the present scheme modified in the above manner is a public key authentication scheme where the zero knowledge is guaranteed. In the following, the efficient algorithm according to the present scheme modified in the above manner will be described in greater detail with reference to FIGS. 18 to 25. Additionally, the structure of the key generation algorithm Gen is substantially the same as that of the present scheme described above, and detailed explanation thereof will be omitted.

Step 1:

First, the prover algorithm P arbitrarily selects a number w. Then, the prover algorithm P generates vectors r∈$K^n$, t∈$K^n$, and e∈$K^m$ by applying the number w to a pseudo random number generator G. That is, the prover algorithm P calculates (r, t, e)←G(w). Next, the prover algorithm P calculates z←s−r. This calculation corresponds to an operation of masking the secret key s by the vector r.

Step 1 (Continued):

Next, the prover algorithm P generates a hash value $c_1$ of $F_b$(z, t)+e and z. That is, the prover algorithm P calculates $c_1$←$H_1$($F_b$(z, t)+e, z). Furthermore, the prover algorithm P generates a hash value $c_2$ of the number w. That is, the prover algorithm P calculates $c_2$←$H_2$(w). Additionally, $H_1$( . . . ), and $H_2$( . . . ) described are hash functions. Also, the hash values ($c_i$, $c_2$) are messages.

The messages ($c_1$, $c_2$) generated in Step 1 are sent to a verifier.

Step 2:

The verifier algorithm V selects one random number α from q types of elements of a ring K. Then, the verifier algorithm V sends the selected random number α to the prover.

The prover algorithm P calculates t'←αr+t. Furthermore, the prover algorithm P calculates e'←α(F(r)−c)+e. Then, the prover algorithm P sends t' and e' to the verifier.

Step 4:

The verifier algorithm V selects a verification pattern to be used from two verification patterns. Then, the verifier algorithm V sends to the prover a demand d∈{0, 1} indicating the selected verification pattern.

Step 5:

The prover algorithm P generates information σ to be sent back to the verifier in response to the demand d received from the verifier. IF d=0, the prover algorithm P generates information σ=w. Also, if d=1, the prover algorithm P generates information σ=z. The information σ generated in this manner is sent to the verifier by the prover algorithm P.

Step 6:

The verifier algorithm V performs the following verification process by using the information σ received from the prover.

If d=0, the verifier algorithm V calculates (r', t'', e'')←G(σ). Then, the verifier algorithm V verifies whether the equality $c_2$=$H_2$(σ) holds true or not. Also, the verifier algorithm V verifies whether the equality t'=αr'+t'' holds true or not. Furthermore, the verifier algorithm V verifies whether the equality e'=α(F(r')−c)+e'' holds true or not. The verifier algorithm V outputs a value 1 indicating authentication success in the case all the verifications have succeeded, and outputs a value 0 indicating authentication failure in the case a failure has occurred in the verification.

If d=1, the verifier algorithm V calculates z'←σ. Then, the verifier algorithm V verifies whether the equality $c_1$=$H_1$(αF(z')−y+$F_b$(z', t')+e', z') holds true or not. The verifier algorithm V outputs a value 1 indicating authentication success in the case the verification has succeeded, and outputs a value 0 indicating authentication failure in the case a failure has occurred in the verification.

In the foregoing, the structure of an efficient algorithm of the present scheme has been described. By using this efficient algorithm, the size of data necessary for communication can be greatly reduced. Also, since calculation of substituting x+r into the polynomial F and reorganising the polynomial F in relation to x (calculation of F(x+r)) becomes unnecessary in the interactive protocol, the calculation efficiency is increased.

(Modification of Efficient Algorithm)

Figure 18:
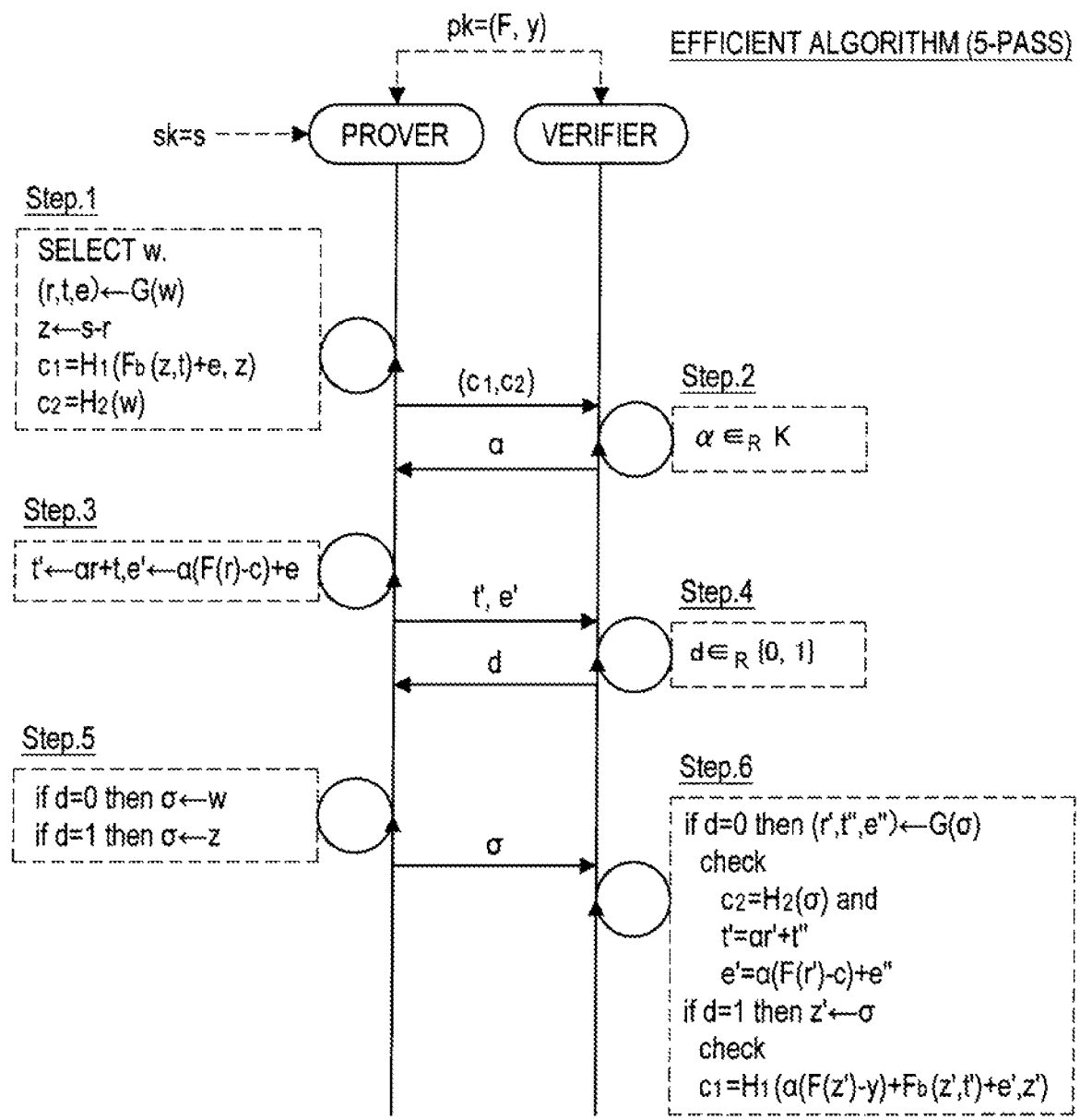
FIG. 18 is an explanatory diagram for describing an efficient algorithm for the public key authentication scheme according to the embodiment.
Figure 19:
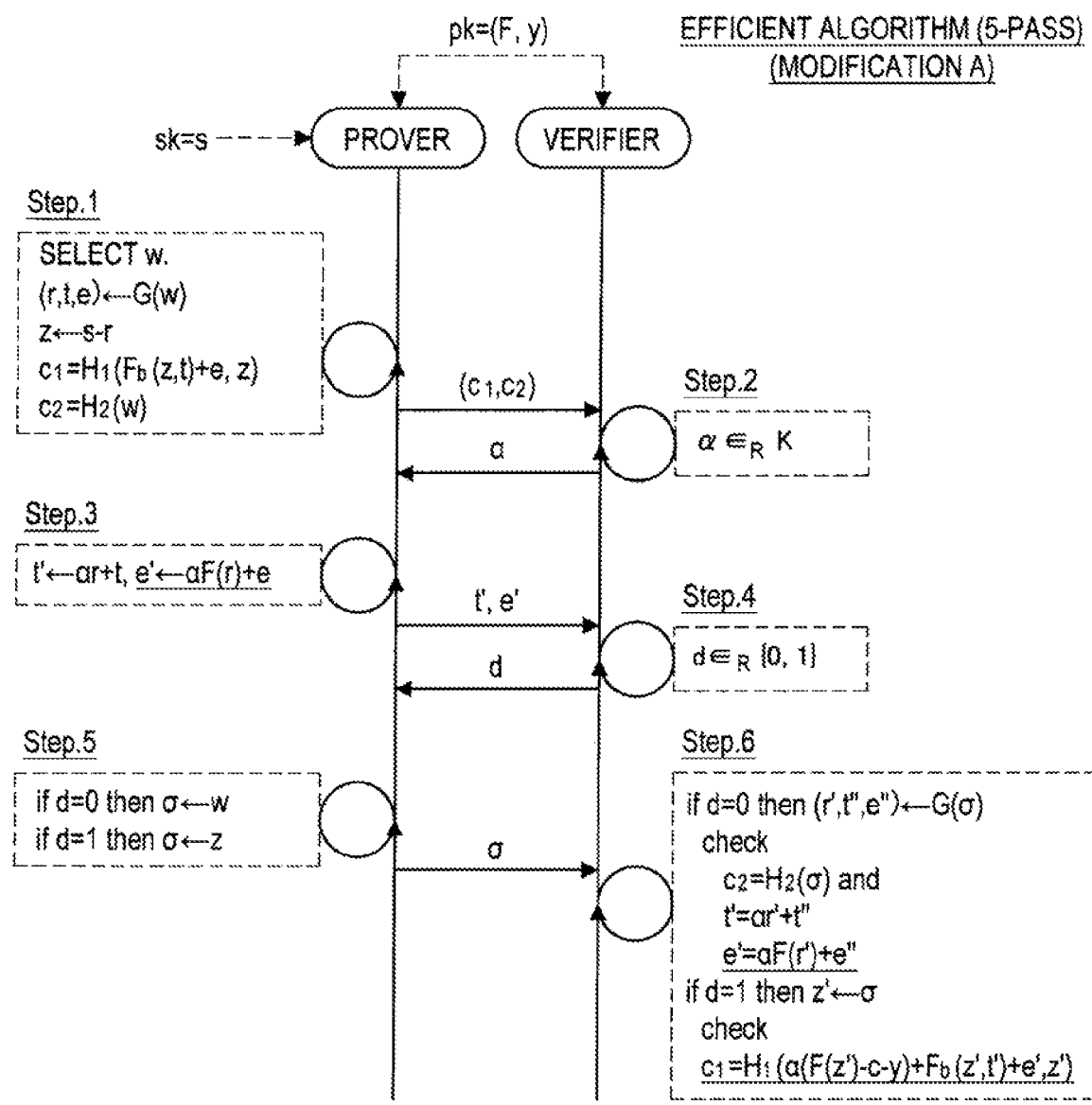
FIG. 19 is an explanatory diagram for describing an efficient algorithm (modification A) for the public key authentication scheme according to the embodiment.
Figure 25:
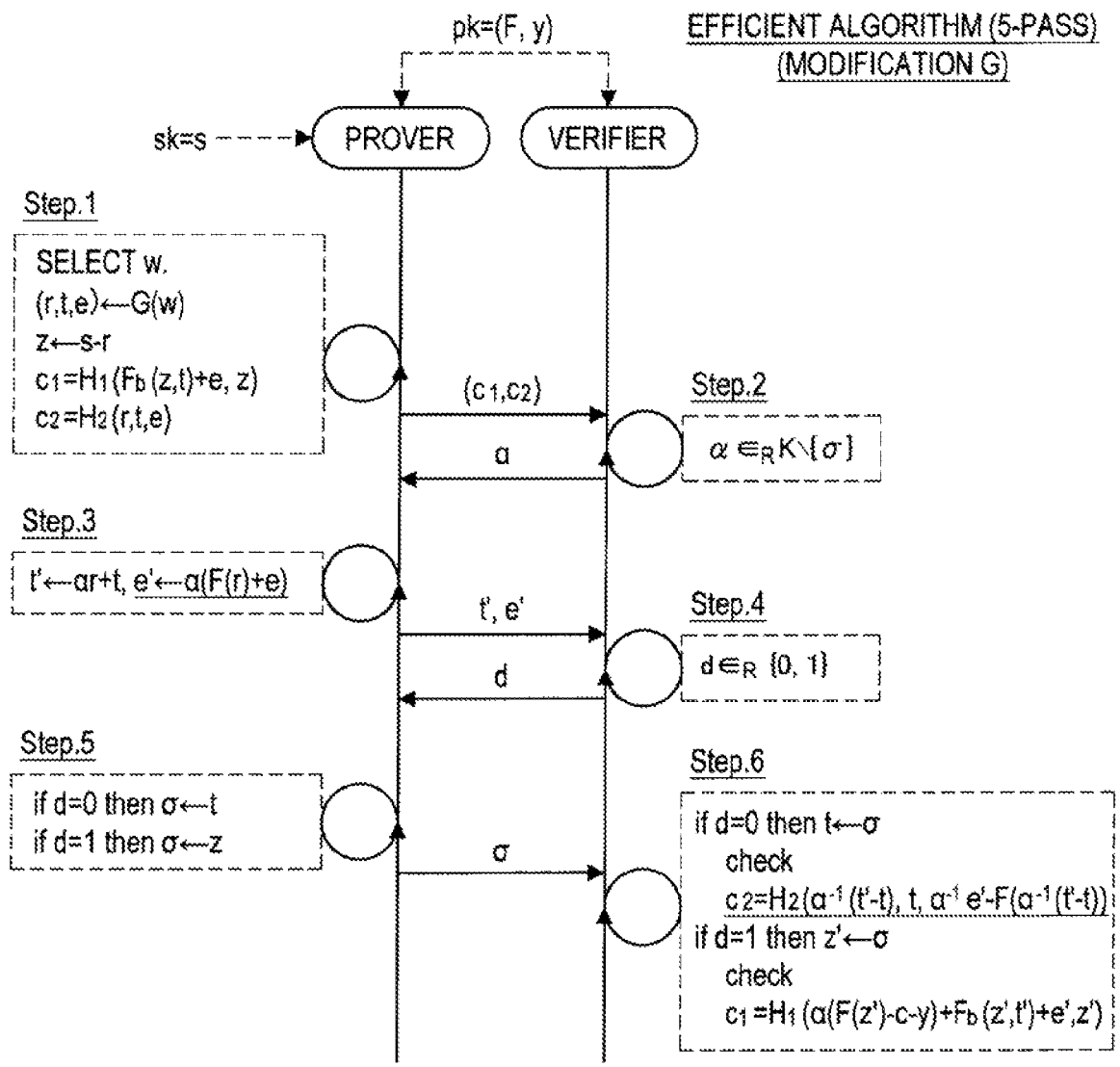
FIG. 25 is an explanatory diagram for describing an efficient algorithm (modification G) for the public key authentication scheme according to the embodiment.

Now, the efficient algorithm of the present scheme shown in FIG. 18 can be modified to algorithms as shown in FIGS. 19 and 25 while maintaining the calculation efficiency.

(Modification A: Algorithm Shown in FIG. 19)

For example, calculation e'←α(F(r)−c)+e is performed in Step 3 of the efficient: algorithm shown in FIG. 18, but this calculation can be modified to calculation e'←αF(r)+e' as shown in FIG. 19. However, in the case of performing such modification, a part of the contents of verification to be performed by the verifier in Step 6 has to be modified. Specifically, among the contents of verification to be performed by the verifier in Step 6 in the case of d=0, verification of e'=α(F(r')−c)+e'' has to be replaced by verification of e'=αF(r')+e''. Also, among the contents of verification to be performed by the verifier in Step 6 in the case of d=1, verification of $c_1$=H·(α(F(z')−y)+$F_b$(z', t''')+e''', z') has to be replaced by verification of $c_1$=$H_1$(α(F(z')−c−y)+$F_b$(z', t''')+e''', z').

(Modification B: Algorithm Shown in FIG. 20)

Figure 20:
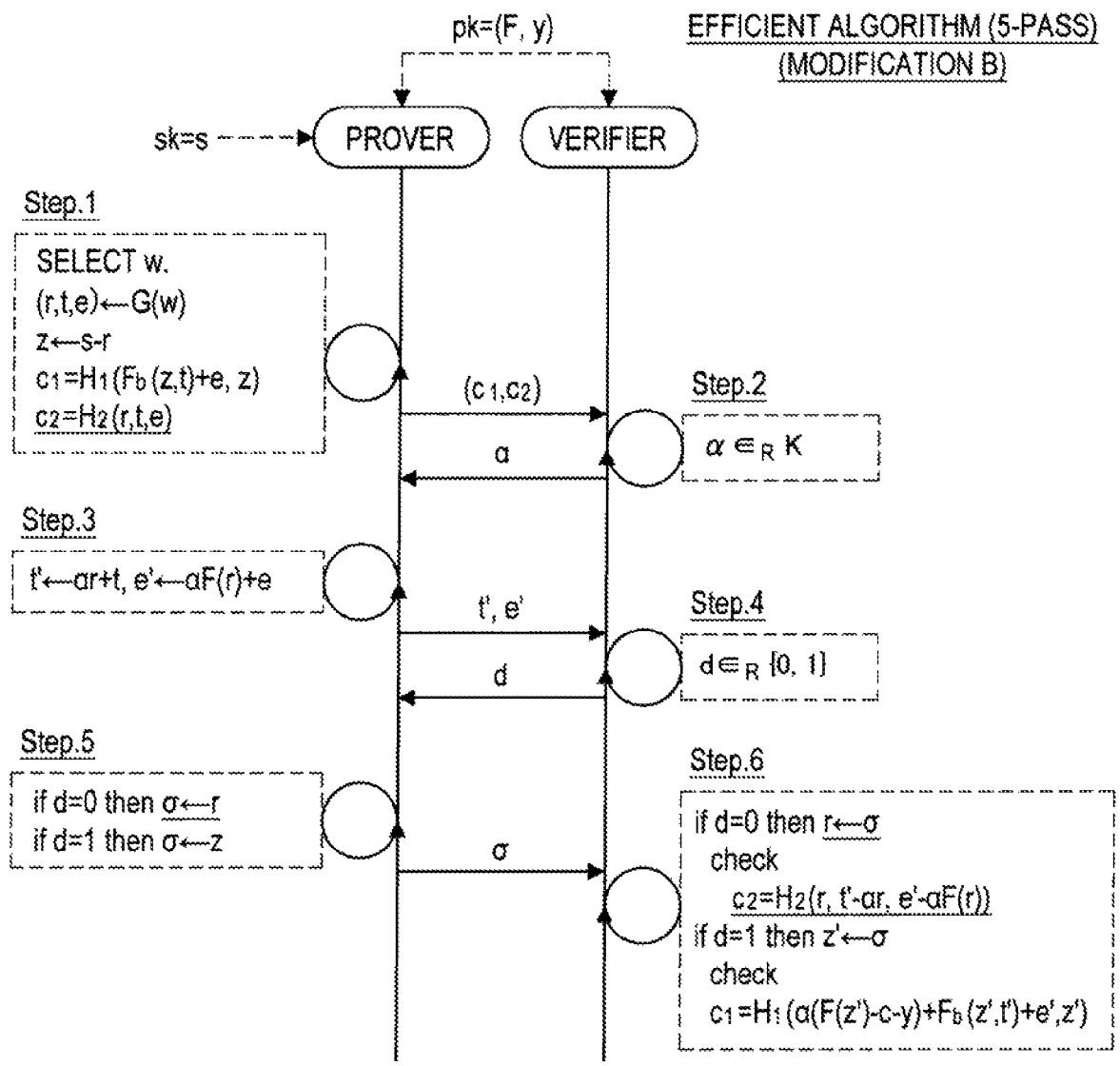
FIG. 20 is an explanatory diagram for describing an efficient algorithm (modification B) for the public key authentication scheme according to the embodiment.

Furthermore, in Step 5 of the algorithm shown in FIG. 19, σ is set to w in the case of d=0, but the σ to be set in the case of d=0 may be any information as long as it is information from which (r, t, e) can be restored when used together with (t', e"). For example, as shown in FIG. 20, the contents of σ to be set in Step 5 in the case of d=0 may be r. However, in the case of performing such modification, calculation $c_2 \leftarrow H_2(w)$ of Step 1 of the algorithm shown in FIG. 19 has to be modified to $c_2 \leftarrow H_2(r, t, e)$. Also, the contents of verification to be performed by the verifier in Step 6 in the case of d=0 has to be replaced by verification of $c_2 = H_2(r, t'-\alpha r, e'-\alpha F(r))$.

(Modification C: Algorithm Shown in FIG. 21)

Figure 21:
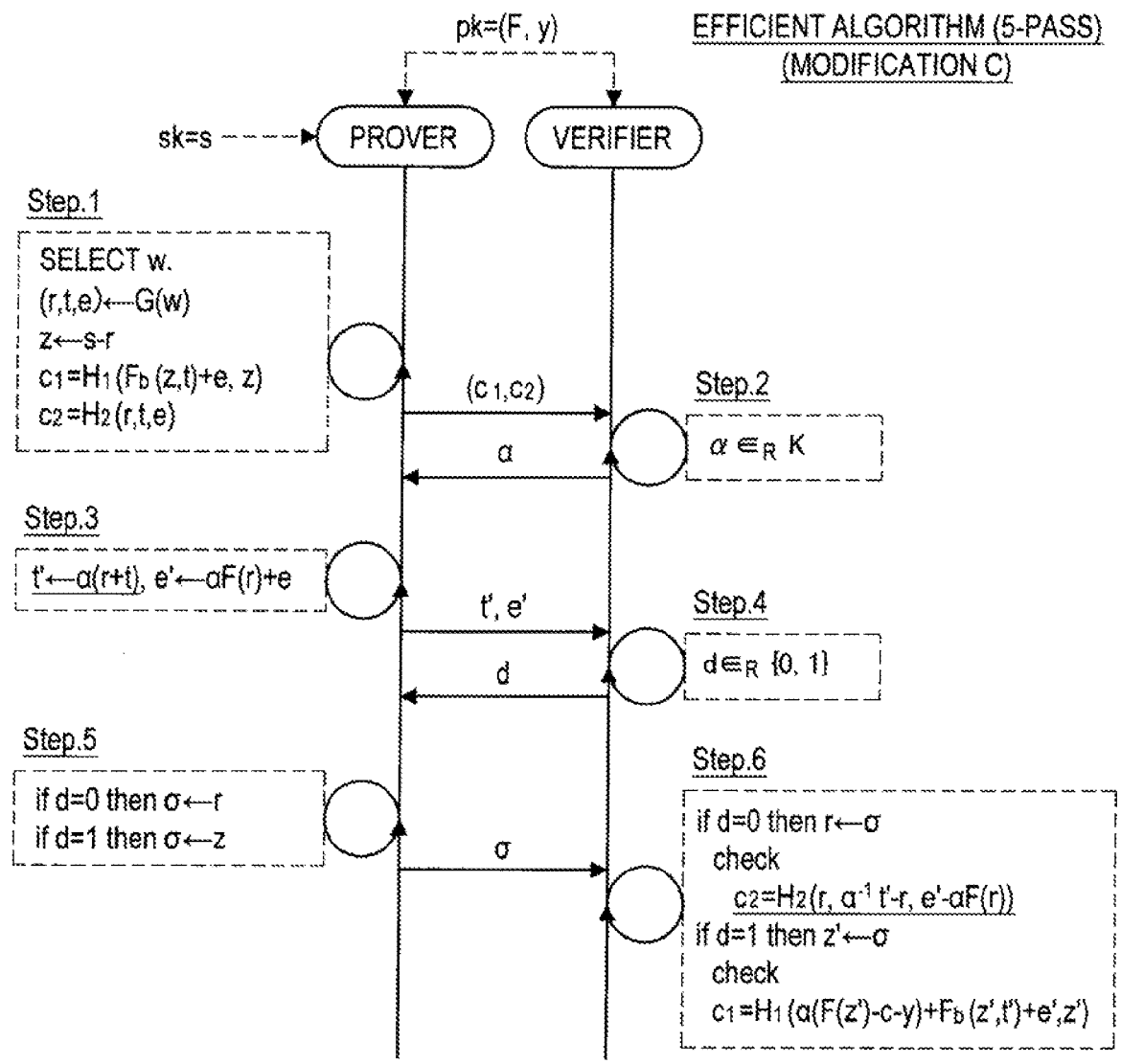
FIG. 21 is an explanatory diagram for describing an efficient algorithm (modification C) for the public key authentication scheme according to the embodiment.

For example, calculation $t' \leftarrow \alpha r+t$ is performed in Step 3 of the algorithm shown in FIG. 20, but this calculation can be modified to calculation $t' \leftarrow \alpha(r+t)$ as shown in FIG. 21. However, in the case of performing such modification, the contents of verification to be performed by the verifier in Step 6 of the algorithm shown in FIG. 20 in the case of d=0 has to be replaced by verification of $c_2 = H_2(r, \alpha^{-1}t'-r, e'-\alpha F(r))$.

(Modification D: Algorithm Shown in FIG. 22)

Figure 22:
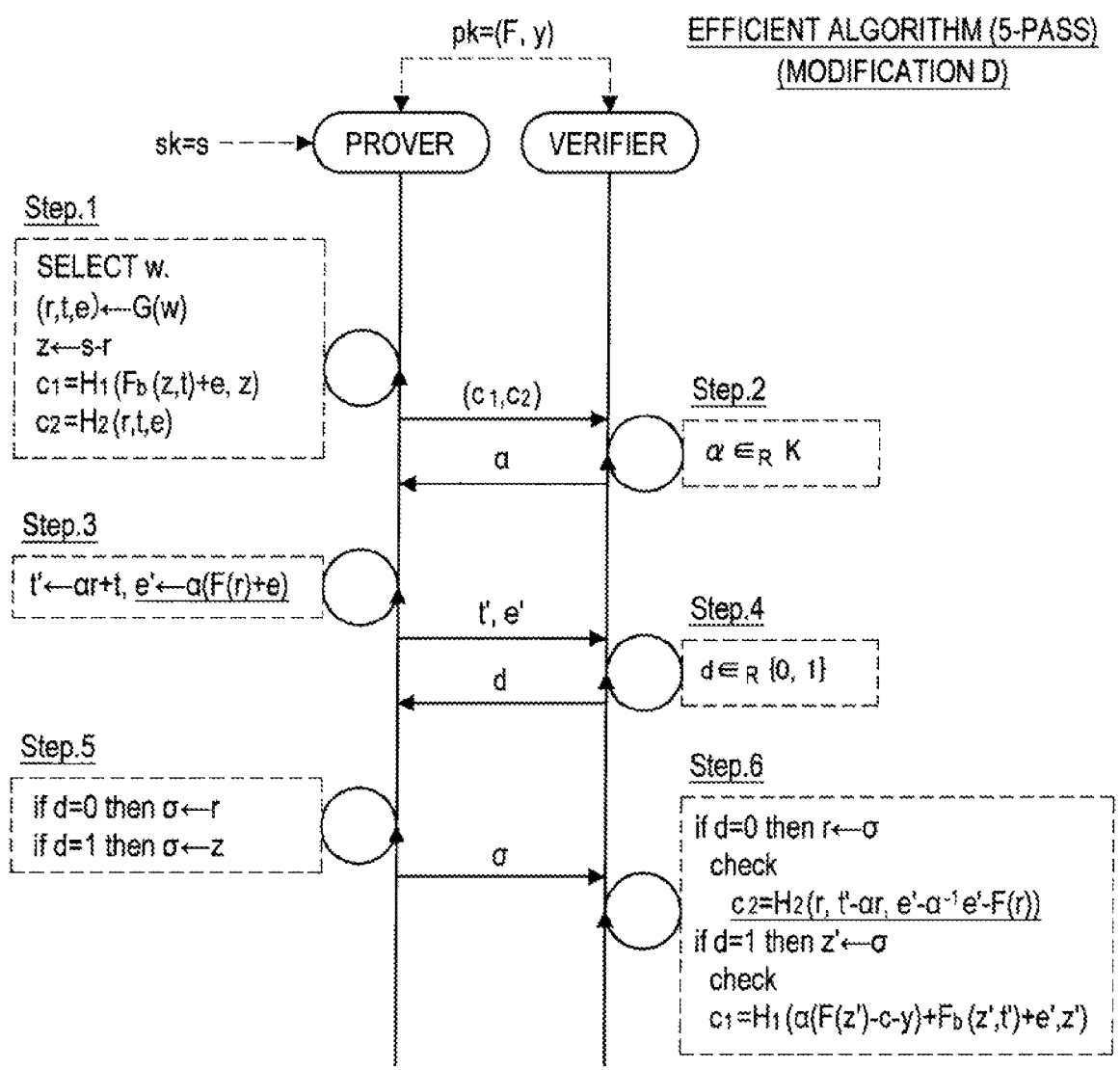
FIG. 22 is an explanatory diagram for describing an efficient algorithm (modification D) for the public key authentication scheme according to the embodiment.

For example, calculation $e' \leftarrow \alpha F(r)+e$ is performed in Step 3 of the algorithm shown in FIG. 20, but this calculation can be modified to calculation $e' \leftarrow \alpha(F(r)+e)$ as shown in FIG. 22. However, in the case of performing such modification, the contents of verification to be performed by the verifier in Step 6 of the algorithm shown in FIG. 20 in the case of d=0 has to be replaced by verification of $c_2 = H_2(r, t'-\alpha r, e'-\alpha^{-1}e'-F(r))$.

(Modification E: Algorithm Shown in FIG. 23)

Figure 23:
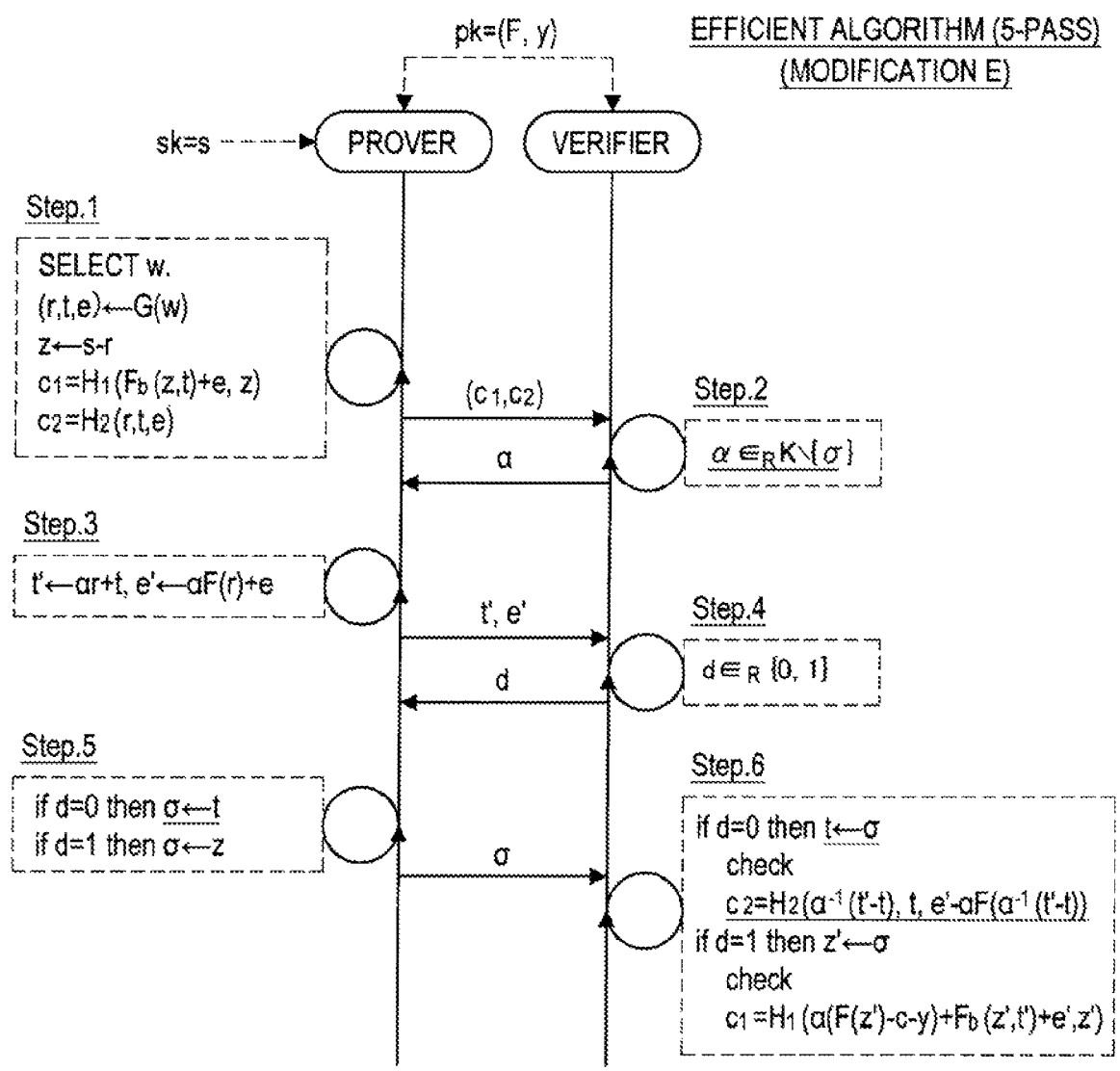
FIG. 23 is an explanatory diagram for describing an efficient algorithm (modification E) for the public key authentication scheme according to the embodiment.

Furthermore, in Step 5 of the algorithm shown in FIG. 20, σ is set to r in the case of d=0, but the σ to be set in the case of d=0 may be any information as long as it is information from which (r, t, e) can be restored when used together with (t', e"). For example, as shown in FIG. 23, the contents of σ to be set in Step 5 in the case of d=0 may be t. However, in the case of performing such modification, α has to be selected from $\alpha \in_R K \setminus \{0\}$ in Step 2, and also, the contents of verification to be performed by the verifier in Step 6 in the case of d=0 has to be replaced by verification of $c_2 = H_2(\alpha^{-1}(t'-t), t, e'-\alpha F(\alpha^{-1}(t'-t)))$.

(Modification F: Algorithm Shown in FIG. 24)

Figure 24:
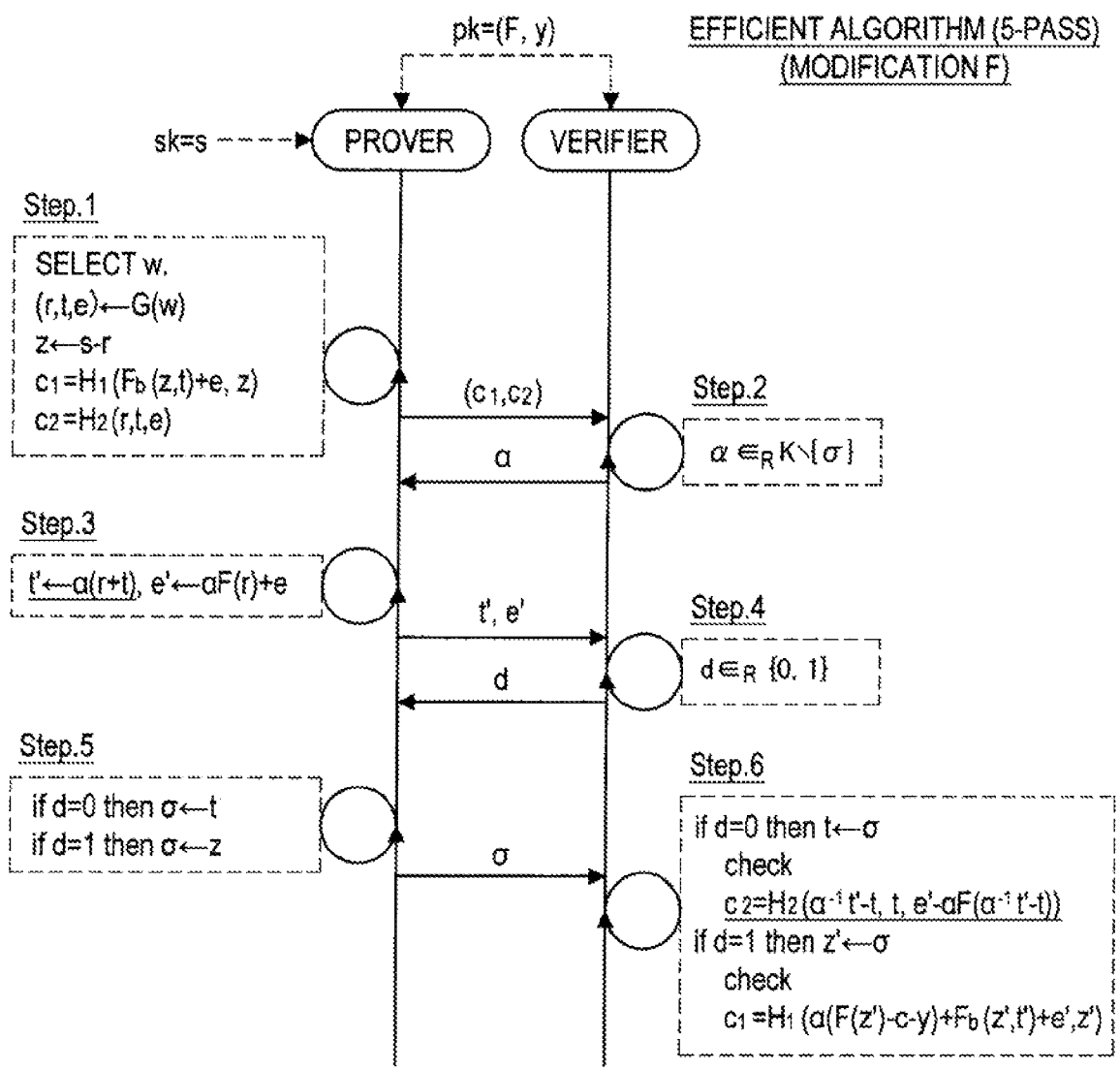
FIG. 24 is an explanatory diagram for describing an efficient algorithm (modification F) for the public key authentication scheme according to the embodiment.

For example, calculation $t' \leftarrow \alpha r+t$ is performed in Step 3 of the algorithm shown in FIG. 23, but this calculation can be modified to calculation $t' \leftarrow \alpha(r+t)$ as shown in FIG. 24. However, in the case of performing such modification, the contents of verification to be performed by the verifier in Step 6 of the algorithm shown in FIG. 23 in the case of d=0 has to be replaced by verification of $c_2$ $H_2(\alpha^{-1}t'-t, t, e'-\alpha F(\alpha^{-1}t'-t))$.

(Modification G: Algorithm Shown in FIG. 25)

For example, calculation $e' \leftarrow \alpha F(r)+e$ is performed in Step 3 of the algorithm shown in FIG. 23, but this calculation can be modified to calculation $e' \leftarrow \alpha(F(r)+e)$ as shown in FIG. 25. However, in the case of performing such modification, the contents of verification to be performed by the verifier in Step 6 of the algorithm shown in FIG. 23 in the case of d=0 has to be replaced by verification of $c_2 = H_2(\alpha^{-1}(t'-t), t, \alpha^{-1}e'-\alpha F(\alpha^{-1}(t'-t)))$.

As described above, the calculation $e' \leftarrow \alpha(F(r)-c)+e$ to be performed by the verifier in Step 3 can be changed to calculation $e' \leftarrow \alpha F(r)+e$ (Modification A). Also, the contents of a to be set by the prover in Step 5 in the case of d=0 can be changed to r, t, or the like (Modifications B, E). Furthermore, the calculation $t' \leftarrow \alpha r+t$ to be performed by the prover in Step 3 can be changed to calculation $t' \leftarrow \alpha(r+t)$ (Modifications C, F). Furthermore, the calculation $e' \leftarrow \alpha F(r)+e$ to be performed by the prover in Step 3 can be changed to calculation $e' \leftarrow \alpha(F(r)+e)$ (Modifications D, G). The modification according to Modification A, the modification according to Modifications R and E., the modification according to Modifications C and F, and the modification according to Modifications D and G can be separately applied to the efficient algorithm shown in FIG. 18, or a plurality of modifications can be applied to the efficient algorithm shown in FIG. 18 in combination.

In the foregoing, the second embodiment of the present invention has been described. Additionally, the form of the multivariate simultaneous equation is the same as that of the first embodiment described above.

<4: Generalisation of Efficient Algorithm>

Now, the efficient algorithms according to the first and second embodiments described above have a structure that uses a second-order multivariate polynomial represented by formula (22) below as the public key (or a system parameter). However, the efficient algorithm described above may be extended to have a structure that uses, as the public key (or a system parameter), a multi-order multivariate polynomial of third order or more defined on a field of order $q=p^k$ (see formula (23) below).

[Expression 16]

$$f_l(x_1, \ldots, x_n) = \sum_{i=1}^{n}\sum_{j=1}^{n} a_{l,i,j} x_i x_j + \sum_{i=1}^{n} b_{l,i} x_i + c_l \quad (22)$$

$$f_l(x_1, \ldots, x_n) = \sum_{i=1}^{n}\sum_{j=1}^{n}\sum_{s=0}^{k-1}\sum_{t=0}^{k-1} a_{l,i,j,s,t} x_i^{p^s} x_j^{p^t} + \sum_{i=1}^{n}\sum_{s=0}^{k-1} b_{l,i,s} x_i^{p^s} + c_l \quad (23)$$

The condition to allow use of a multivariate polynomial $f_1$ as the public key in the efficient algorithms according to the first and second embodiments described above is that formula (24) below will be bilinear with respect to $(x_1, \ldots, x_n)$ and $(y_1, \ldots, y_n)$. In the case of the multivariate polynomial represented by formula (22) above, the bilinearity can be easily confirmed as shown in formula (25) below (the underlined portions are linear for $x_1$ and $y_1$, respectively). Furthermore, the bilinearity can be confirmed as shown in formula (26) below similarly for the case of a multivariate polynomial represented by formula (23) above. Moreover, the underlined portion of formula (26) below shows bilinearity on a field GF(p) of order p. Accordingly, in the case of using the multivariate polynomial represented by formula (23) above as the public key of the efficient algorithm according to the second embodiment described above, a challenge α to be sent by the verifier after Step 2 of the algorithm has to be limited to the element of GF(p).

[Expression 17]

$$f_l(x_1+y_1, \ldots, x_n+y_n) - \quad (24)$$
$$f_l(x_1, \ldots, x_n) - f_l(y_1, \ldots, y_n) + f_l(0, \ldots, 0)$$

$$f_l(x_1+y_1, \ldots, x_n+y_n) = \sum_{i=1}^{n}\sum_{j=1}^{n} a_{l,i,j}(x_i+y_i)(x_j+y_j) + \quad (25)$$
$$\sum_{i=1}^{n} b_{l,i}(x_i+y_i) + c_l$$
$$= \sum_{i=1}^{n}\sum_{j=1}^{n} a_{l,i,j}(x_i x_j + x_i y_j + y_i x_j + y_i y_j) +$$
$$\sum_{i=1}^{n} b_{l,i}(x_i+y_i) + c_l$$
$$= f_l(x_1, \ldots, x_n) + f_l(y_1, \ldots, y_n) +$$
$$\sum_{i=1}^{n}\sum_{j=1}^{n} a_{l,i,j}(\underline{x_i y_j + y_i x_j}) - f_l(0, \ldots, 0)$$

-continued $$f_l(x_1+y_1,\ldots,x_n+y_n) = \sum_{i=1}^{n}\sum_{j=1}^{n}\sum_{s=0}^{k-1}\sum_{t=0}^{k-1} a_{l,i,j,s,t}(x_i+y_i)^{p^s} \quad (26)$$

$$(x_j+y_j)^{p^t} + \sum_{i=1}^{n}\sum_{s=0}^{k-1} b_{l,i,s}(x_i+y_i)^{p^s} + c_l$$

$$= \sum_{i=1}^{n}\sum_{j=1}^{n}\sum_{s=0}^{k-1}\sum_{t=0}^{k-1} a_{l,i,j,s,t}(x_i^{p^s}+y_i^{p^s})$$

$$(x_j^{p^t}+y_j^{p^t}) + \sum_{i=1}^{n}\sum_{s=0}^{k-1} b_{l,i,s}(x_i^{p^s}+y_i^{p^s}) + c_l$$

$$= \sum_{i=1}^{n}\sum_{j=1}^{n}\sum_{s=0}^{k-1}\sum_{t=0}^{k-1} a_{l,i,j,s,t}$$

$$\left(x_i^{p^s}x_j^{p^t}+x_i^{p^s}y_j^{p^t}+y_i^{p^s}x_j^{p^t}+y_i^{p^s}y_j^{p^t}\right)+$$

$$\sum_{i=1}^{n}\sum_{s=0}^{k-1} b_{l,i,s}(x_i^{p^s}+y_i^{p^s}) + c_l$$

$$= f_l(x_1,\ldots,x_n) + f_l(y_1,\ldots,y_n) +$$

$$\sum_{i=1}^{n}\sum_{j=1}^{n}\sum_{s=0}^{k-1}\sum_{t=0}^{k-1} a_{l,i,j,s,t}\left(x_i^{p^s}y_j^{p^t}+y_i^{p^s}x_j^{p^t}\right) -$$

$$f_l(0,\ldots,0)$$

For such reason, it can be said that an algorithm that uses a multivariate polynomial of third order or more as represented by formula (23) above as the public key can be structured by extending the efficient algorithms according to the first and second embodiments described above.

Let us consider here the relationship between the multivariate polynomial represented by formula (22) above (hereinafter, second-order polynomial) and the multivariate polynomial represented by formula (23) above (hereinafter, multi-order polynomial). Consideration will be given here to a second-order polynomial of nk variables defined on a field of order $q=p$ and a multi-order polynomial of n variables defined on a field of order $q=p^k$. In this case, the difficulty of solving a simultaneous equation formed from mk second-order polynomials and the difficulty of solving a simultaneous equation formed from m multi-order polynomials are equivalent. For example, the difficulty of solution is equivalent for a simultaneous equation formed from 80 second-order polynomials of 80 variables defined on a field of order 2 and 10 multi-order polynomials of 10 variables defined on a field of order $2^8$.

That is, if an element of $GF(p^k)$ and an element of $GF(p)^k$ are identified by isomorphism, there will exist a function that is represented by a set of m multi-order polynomials of n variables defined on a field of order $q=p^k$ that is equivalent to a function represented by a set of mk second-order polynomials of nk variables defined on a field of order $q=p$. For example, if an element of $GF(2^8)$ and an element of $GF(2)^8$ are identified by isomorphism, there will exist a function that is represented by a set of 10 multi-order polynomials of 10 variables defined on a field of order $2^8$ that is equivalent to a function represented by a set of 80 second-order polynomials of 80 variables defined on a field of order 2. For this reason, it is possible to arbitrarily select which of the second-order polynomial described above and the multi-order polynomial described above is to be used.

Let us consider here the calculation efficiency in the case of using the second-order polynomial and the calculation efficiency in the case of using the multi-order polynomial described above.

In the case of using a second-order polynomial of nk variables defined on a field of order 2, an operation in the algorithm will be performed for nk 1-bit variables. That is, the unit of the operation will be one bit. On the other hand, in the case of using a multi-order polynomial of n variables defined on a field of order $2^k$, an operation in the algorithm will be performed for n k-bit variables. That is, the unit of the operation will be k bits. This k (k=2, 3, 4, ...) can be set arbitrarily. Thus, in implementation, the calculation efficiency can be increased by setting the k to a convenient value. For example, in the case of implementing an algorithm on a 32-bit architecture, a higher calculation efficiency can be obtained with a configuration of performing the operation on a 32-bit basis than with a configuration of performing the operation on a 1-bit basis.

By extending the efficient algorithms according to the first and second embodiments described above in the above manner such that a multi-order polynomial can be used as a public key, the unit of operation can be made to match at) the implementation architecture. As a result, the calculation efficiency can be increased.

<5: Example Hardware Configuration>

Each algorithm described above can be performed by using, for example, the hardware configuration of the information processing apparatus shown in FIG. 26. That is, processing of each algorithm can be realized by controlling the hardware shown in FIG. 26 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 26, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE 1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<6: Summary>

Lastly, the technical contents according to the embodiment of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus above can be expressed as follows. This information processing apparatus includes a key setting unit, a message transmission unit, a verification pattern reception unit, and a response transmission unit as follows. The key setting unit is for setting $s \in K^n$ to a secret key and setting a multi-order polynomial $f_i(x_1, \ldots, x_n)$ (i=1 to m) on a ring K and $y_i=f_i(s)$ to a public key. The problem of finding $y_i=f_i(s)$ for i=1 to m is nothing other than the problem of solving a multi-order multivariate simultaneous equation. That is, the information processing apparatus described above is for providing a mechanism of authentication that takes the problem of solving a multi-order multivariate simultaneous equation as a basis for security.

Also, the message transmission unit is for transmitting a message c to a verifier. Furthermore, the verification pattern reception unit is for receiving information on one verification pattern selected by the verifier from k ($k \geq 3$) verification patterns for one message c. Furthermore, the response transmission unit is for transmitting, to the verifier*, response information, among k types of response information, corresponding to the information on the verification pattern received by the verification pattern reception unit. Moreover, the response information is information that enables calculation of the secret key s in a case all of the k verification patterns for the message c performed by using the k types of response information have been successful.

The message c includes three messages $c_1$, $c_2$, and $c_3$, for example. Also, verification for any two of $c_1$ $c_2$, and $c_3$ is performed by each verification pattern. Furthermore, the response information is information necessary for performing verification for the two messages according to each verification pattern. Moreover, one condition is that no information on the secret key is leaked even if the message c is handed over to the verifier. Another condition is that no information on the secret key is leaked even if both the message c and the response information are provided. The structure of message c and the structure of response information that satisfy these conditions have already been specifically described with reference to FIG. 4 and the like.

(Notes)

The key generation algorithm Gen is an example of a key setting unit. The prover algorithm P is an example of a message transmission unit, a verification pattern reception unit, a response transmission unit, a reply reception unit, a polynomial generation unit, and a polynomial transmission unit. The information σ is an example of response information. The verifier algorithm V is an example of a message reception unit, a verification pattern selection unit, a verification pattern transmission unit, a response reception unit, a verification unit, a reply transmission unit, and a polynomial reception unit. The signature generation algorithm Sig is an example of a message generation unit, a verification pattern selection unit, and a signature generation unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Applications JP 2010-125026, JP 2010-224753, and JP 2011-026401 filed in the Japan Patent Office on May 31, 2010, Oct. 4, 2010, and Feb. 9, 2011, respectively, the entire content of which is hereby incorporated by reference.

What is claimed is:

1. An authentication device comprising:
a processor;
a key setting unit for setting $s \in K^n$ to a secret key and setting a multi-order multi-variable polynomial $f_i(x_1, \ldots, x_n)$ (i=1 to m) on a ring K and $y_i=f_i(s)$ to a public key by taking $y=f(s)=0$ in a public key authentication scheme between a prover and a verifier;
a message transmission unit for transmitting a message c to the verifier, wherein the prover attempts to prove a legitimacy to the verifier;
a verification pattern reception unit, at the prover, for receiving information on one verification pattern selected by the verifier from k ($k \geq 3$) verification patterns for one message c; and
a response transmission unit for transmitting, to the verifier, response information, among the k verification patterns of response information, corresponding to the information on the verification pattern received by the verification pattern reception unit, wherein the response information is information that enables calculation of the secret key s in a case all of the k verification patterns for the message c performed by using the k verification patterns of response information have been successful.

2. The authentication device according to claim 1, wherein authentication is successful if, when performing a first step of transmitting one or more messages c by the message transmission unit, a second step of receiving, for each message c, the information on the verification pattern from the verifier by the verification pattern reception unit, and a third step of transmitting the response information for each piece of the information on the verification pattern by the response transmission unit, verification is successfully performed by the verifier with all pieces of the response information.

3. The authentication device according to claim 2, wherein processing of performing the first step of transmitting one or more messages c by the message transmission unit, the second step of receiving, for each message c, the information on the verification pattern from the verifier by the verification pattern reception unit, and the third step of transmitting the response information for each piece of the information on the verification pattern by the response transmission unit is repeated, and wherein the authentication is successful if, when performing the first to third steps a predetermined number of times, verification is successfully performed each time by the verifier with all pieces of the response information.

4. The authentication device according to claim 3, wherein, in a case of the message $c=(c_1, \ldots, c_m)$, the message transmission unit calculates a new message $c'=H(c)$ by using a one-way function H and transmits the message c' to the verifier, and the response transmission unit transmits, together with the response information, an element of the message c that the verifier is not capable of restoring even when using the response information.

5. The authentication device according to claim 2, wherein, in a case of the message $c=(c_1, \ldots, c_m)$, the message transmission unit calculates a new message $c'=H(c)$ by using a one-way function H and transmits the message c' to the verifier, and the response transmission unit transmits, together with the response information, an element of the message c that the verifier is not capable of restoring even when using the response information.

6. The authentication device according to claim 1, wherein the m and the n have a relationship of m<n.

7. The authentication device according to claim 6, wherein the m and the n have a relationship of $2^{m-n} \ll 1$.

8. An authentication device comprising:

a processor;

a message reception unit for receiving a message c from a prover, wherein the prover attempts to prove a legitimacy to a verifier;

a verification pattern selection unit, at the verifier, for selecting one verification pattern from k ($k \geq 3$) verification patterns for one message c;

a verification pattern transmission unit for transmitting information on the verification pattern selected by the verification pattern selection unit to the prover;

a response reception unit for receiving, from the prover, response information, among the k verification patterns of response information, corresponding to the information on the verification pattern transmitted by the verification pattern transmission unit; and a verification unit for verifying a legitimacy of the prover by using the message c received by the message reception unit and the response information received by the response reception unit, wherein $s \in K^n$ is set to a secret key and a multi-order polynomial $f_i(x_1, \ldots, x_n)$ (i=1 to m) on a ring K and $y_i = f_i(s)$ are set to a public key by taking $y = f(s) = 0$ in a public key authentication scheme between the prover and the verifier, and wherein the response information is information that enables calculation of the secret key s in a case all of the k verification patterns for the message c performed by using the k verification patterns of response information have been successful.

9. An authentication device comprising:

a processor;

a key setting unit for setting $s \in K^n$ to a secret key and setting a multi-order multi-variable polynomial $f_i(x_1, \ldots, x_n)$ (i=1 to m) on a ring K and $y_i = f_i(s)$ to a public key by taking $y = f(s) = 0$ in a public key authentication scheme between a prover and a verifier;

a message transmission unit for transmitting a message c from the prover to the verifier, wherein the prover attempts to prove a legitimacy to the verifier;

a reply reception unit for receiving a reply α from the verifier;

a polynomial generation unit for generating a polynomial f'' to be used for verification for the message c by using the reply α received by the reply reception unit;

a polynomial transmission unit for transmitting the polynomial f'' generated by the polynomial generation unit to the verifier;

a verification pattern reception unit for receiving information on one verification pattern selected by the verifier from k ($k \geq 2$) verification patterns for one message c; and a response transmission unit for transmitting, to the verifier, response information, among the k verification patterns of response information, corresponding to the information on the verification pattern received by the verification pattern reception unit, wherein the response information is information that enables calculation of the secret key s in a case all of total 2k combinations of reply and verification pattern for the message c performed by using two types of replies α, the polynomial f'', and the k verification patterns of response information have been successful.

10. The authentication device according to claim 9, wherein authentication is successful if, when performing a first step of transmitting one or more messages c by the message transmission unit, a second step of receiving the reply α by the reply reception unit for each message c, a third step of generating the polynomial f'' by the polynomial generation unit by using each reply α received in the second step and transmitting the polynomial f'' by the polynomial transmission unit, a fourth step of receiving, for each message c, the information on the verification pattern from the verifier by the verification pattern reception unit, and a fifth step of transmitting the response information by the response transmission unit for each piece of the information on the verification pattern, verification is successfully performed by the verifier with all pieces of the response information.

11. The authentication device according to claim 10, wherein processing of performing the first step of transmitting one or more messages c by the message transmission unit, the second step of receiving the reply α by the reply reception unit for each message c, the third step of generating the polynomial f" by the polynomial generation unit by using each reply α received in the second step and transmitting the polynomial f" by the polynomial transmission unit, the fourth step of receiving, for each message c, the information on the verification pattern from the verifier by the verification pattern reception unit, and the fifth step of transmitting the response information by the response transmission unit for each piece of the information on the verification pattern is repeated, and wherein the authentication is successful if when performing the first to fifth steps a predetermined number of times, verification is successfully performed each time by the verifier with all pieces of the response information.

12. An authentication device comprising:
a message reception unit for receiving a message c from a prover, wherein the prover attempts to prove a legitimacy to a verifier;
a reply transmission unit for transmitting a reply α to the prover;
a polynomial reception unit for receiving a polynomial f" that is generated by the prover by using the reply α transmitted by the reply transmission unit and that is used for verification for the message c;
a verification pattern selection unit for selecting one verification pattern from k ($k \geq 2$) verification patterns for one message c;
a verification pattern transmission unit for transmitting, to the prover, information on the verification pattern selected by the verification pattern selection unit;
a response reception unit for receiving, from the prover, response information, among the k verification patterns of response information, corresponding to the information on the verification pattern transmitted by the verification pattern transmission unit; and
a verification unit for verifying a legitimacy of the prover by using the message c received by the message reception unit, the polynomial f" received by the polynomial reception unit, and the response information received by the response reception unit,
wherein $s \in K^n$ is set to a secret key and a multi-order multi-variable polynomial $f_i(x_1, \ldots, x_n)$ (i=1 to m) on a ring K and $y_i = f_i(s)$ are set to a public key, by taking $y = f(s) = 0$ in a public key authentication scheme between the prover and the verifier, and
wherein the response information is information that enables calculation of the secret key s in a case all of total 2k combinations of reply and verification pattern for the message c performed by using two types of replies α, the polynomial f", and the k verification patterns of response information have been successful.

13. An authentication method comprising:
setting, by a processor $s \in K^n$ to a secret key and setting a multi-order multi-variable polynomial $f_i(x_1, \ldots, x_n)$ (i=1 to m) on a ring K and $y_i = f_i(s)$ to a public key by taking $y = f(s) = 0$ in a public key authentication scheme between a prover and a verifier;

transmitting a message c from the prover to the verifier, wherein the prover attempts to prove a legitimacy to the verifier;
receiving information on one verification pattern selected by the verifier from k ($k \geq 3$) verification patterns for one message c; and
transmitting, to the verifier, response information, among the k verification patterns of response information, corresponding to the information on the verification pattern received in the step of receiving,
wherein the response information is information that enables calculation of the secret key s in a case all of the k verification patterns for the message c performed by using the k verification patterns of response information have been successful.

14. An authentication method comprising:
receiving a message c from a prover, wherein the prover attempts to prove a legitimacy to a verifier;
selecting, by a processor, one verification pattern from k ($k \geq 3$) verification patterns for one message c;
transmitting information on the verification pattern selected in the step of selecting to the prover;
receiving, from the prover, response information, among the k verification patterns of response information, corresponding to the information on the verification pattern transmitted in the step of transmitting; and
verifying a legitimacy of the prover by using the message c received in the step of receiving the message c and the response information received in the step of receiving the response information,
wherein $s \in K^n$ is set to a secret key and a multi-order multi-variable polynomial $f_i(x_1, \ldots, x_n)$ (i=1 to m) on a ring K and $y_i = f_i(s)$ are set to a public key by taking $y = f(s) = 0$ in a public key authentication scheme between the prover and the verifier, and
wherein the response information is information that enables calculation of the secret key s in a case all of the k verification patterns for the message c performed by using the k types of response information have been successful.

15. An authentication method comprising:
setting, by a processor, $s \in K^n$ to a secret key and setting a multi-order multi-variable polynomial $f_i(x_1, \ldots, x_n)$ (i=1 to m) on a ring K and $y_i = f_i(s)$ to a public key by taking $y = f(s) = 0$ in a public key authentication scheme between a prover and a verifier:
transmitting a message c from the prover to the verifier, wherein the prover attempts to prove a legitimacy to the verifier;
receiving a reply α from the verifier;
generating a polynomial f" to be used for verification for the message c by using the reply α received in the step of receiving the reply α;
transmitting the polynomial f" generated in the step of generating to the verifier;
receiving information on one verification pattern selected by the verifier from k ($k \geq 2$) verification patterns for one message c; and
transmitting, to the verifier, response information, among the k verification patterns of response information, corresponding to the information on the verification pattern received in the step of receiving the information on the verification pattern,
wherein the response information is information that enables calculation of the secret key s in a case all of total 2k combinations of reply and verification pattern for the message c performed by using two types of replies α, the polynomial f", and the k verification patterns of response information have been successful.

16. An authentication method comprising:
receiving a message c from a prover, wherein the prover attempts to prove a legitimacy to a verifier;
transmitting a reply α to the prover;
receiving a polynomial f" that is generated by the prover by using the reply α transmitted in the step of transmitting the reply α and that is used for verification for the message c;
selecting one verification pattern from k (k≧2) verification patterns for one message c;
transmitting, to the prover, information on the verification pattern selected in the step of selecting the verification pattern;
receiving, from the prover, response information, among the k verification patterns of response information, corresponding to the information on the verification pattern transmitted in the step of transmitting the information on the verification pattern; and
verifying, by a processor, a legitimacy of the prover by using the message c received in the step of receiving the message c, the polynomial f" received in the step of receiving the polynomial f", and the response information received in the step of receiving the response information,
wherein s∈$K^n$ is set to a secret key and a multi-order multi-variable polynomial $f_i(x_1, \ldots, x_n)$ (i=1 to m) on a ring K and $y_i=f_i(s)$ are set to a public key by taking y=f(s)=0 in a public key authentication scheme between the prover and the verifier, and
wherein the response information is information that enables calculation of the secret key s in a case all of total 2k combinations of reply and verification pattern for the message c performed by using two types of replies α, the polynomial f", and the k verification patterns of response information have been successful.

17. A computer program product embodied in a non-transitory computer-readable storage medium having a computer program residing thereon, which when executed by a processor, causes a computer to realize:
a key setting function of setting s∈$K^n$ to a secret key and setting a multi-order multi-variable polynomial $f_i(x_1, \ldots, x_n)$ (i=1 to m) on a ring K and $y_i=f_i(s)$ to a public key by taking y=f(s)=0 in a public key authentication scheme between a prover and a verifier;
a message transmission function of transmitting a message c from the prover to the verifier, wherein the prover attempts to prove a legitimacy to the verifier;
a verification pattern reception function, at the prover, of receiving information on one verification pattern selected by the verifier from k (k≧3) verification patterns for one message c; and
a response transmission function of transmitting, to the verifier, response information, among the k verification patterns of response information, corresponding to the information on the verification pattern received by the verification pattern reception function,
wherein the response information is information that enables calculation of the secret key s in a case all of the k verification patterns for the message c performed by using the k verification patterns of response information have been successful.

18. A signature generation device comprising:
a processor;
a key setting unit for setting s∈$K^n$ to a secret key and setting a multi-order multi-variable polynomial $f_i(x_1, \ldots, x_n)$ (i=1 to m) on a ring K and $y_i=f_i(s)$ to a public key by taking y=f(s)=0 in a public key authentication scheme between a prover and a verifier;
a message generation unit for generating N messages c based on the multi-order multi-variable polynomial $f_i(x_1, \ldots, x_n)$ and the secret key s;
a verification pattern selection unit for selecting a verification pattern from $k^N$ (k≧3) verification patterns based on information obtained by applying a document M and the message c to a one-way hash function; and
a signature generation unit for generating, according to the verification pattern selected by the verification pattern selection unit, a digital signature σ that will pass verification that uses the message c and the document M,
wherein the digital signature σ is information that enables calculation of the secret key s in a case verifications performed using the digital signature σ corresponding to $(k-1)^N+1$ verification patterns have all been successful.

\* \* \* \* \*